United States Patent
Sasaki et al.

(10) Patent No.: US 6,865,059 B2
(45) Date of Patent: Mar. 8, 2005

(54) SLIDER OF THIN-FILM MAGNETIC HEAD

(75) Inventors: Yoshitaka Sasaki, Milpitas, CA (US); Takehiro Kamigama, Hong Kong (CN)

(73) Assignees: Headway Technologies, Inc., Milpitas, CA (US); SAE Magnetics (H.K.) Ltd., Hong Kong (CN)

( * ) Notice: Subject to any disclaimer, the term of this patent is extended or adjusted under 35 U.S.C. 154(b) by 0 days.

(21) Appl. No.: 10/807,260

(22) Filed: Mar. 24, 2004

(65) Prior Publication Data

US 2004/0179302 A1 Sep. 16, 2004

Related U.S. Application Data

(62) Division of application No. 10/041,566, filed on Jan. 10, 2002, now Pat. No. 6,731,464.

(51) Int. Cl.[7] ............................. G11B 5/596; G11B 5/60
(52) U.S. Cl. ................................. 360/246.2; 360/237.1
(58) Field of Search ............................ 360/246.2, 237.1

(56) References Cited

U.S. PATENT DOCUMENTS 6,529,346 B2    3/2003  Otsuka ..................... 360/235.8
6,700,727 B1 *  3/2004  Crane et al. ............. 360/237.1

FOREIGN PATENT DOCUMENTS

| JP | A 9-63027    | 3/1997 |
| JP | A 11-185418  | 7/1999 |
| JP | A 2000-3570  | 1/2000 |
| JP | A 2000-215429 | 8/2000 |

OTHER PUBLICATIONS

U.S. Appl. No. 09/988,343, filed Nov. 19, 2001, Sasaki et al.

U.S. Appl. No. 10/011,780, filed Dec. 11, 2001, Sasaki et al.

* cited by examiner

Primary Examiner—Robert S. Tupper
(74) Attorney, Agent, or Firm—Oliff & Berridge, PLC

(57) ABSTRACT

A slider comprises a slider section and an element section. The slider section has a first medium facing surface and an air inflow end. The element section has a second medium facing surface, an air outflow end, and a thin-film magnetic head element. The slider section and the element section are produced separately, and bonded to each other so that the air inflow end and the air outflow end are disposed on opposite sides with the first and second medium facing surfaces in between.

7 Claims, 44 Drawing Sheets

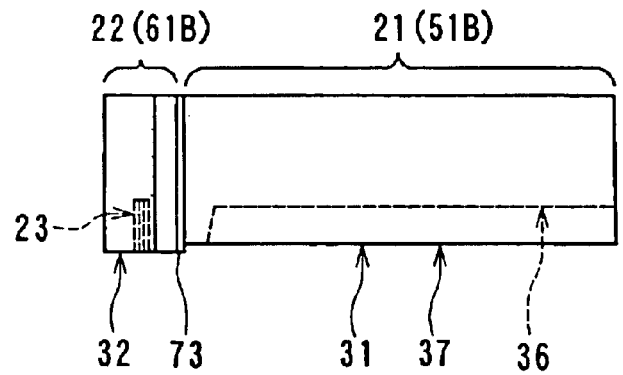
F I G. 42
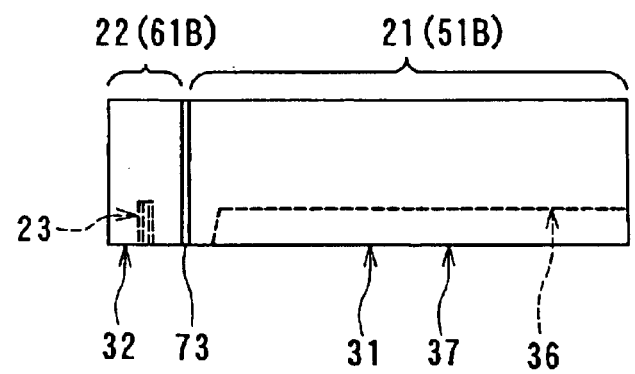
F I G. 43
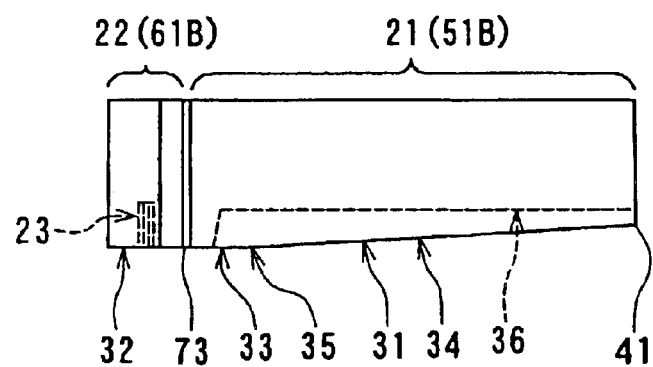
F I G. 44

SLIDER OF THIN-FILM MAGNETIC HEAD

This is a Division of application Ser. No. 10/041,566 filed Jan. 10, 2002 now U.S. Pat. No. 6,731,464. The entire disclosure of the prior application is hereby incorporated by reference herein in its entirety.

BACKGROUND OF THE INVENTION

1. Field of the Invention

The present invention relates to a slider of a thin-film magnetic head which comprises a medium facing surface that faces toward a recording medium and a thin-film magnetic head element located near the medium facing surface, and to a method of manufacturing such a slider.

2. Description of the Related Art

Performance improvements in thin-film magnetic heads have been sought as a real recording density of hard disk drives has increased. Such thin-film magnetic heads include composite thin-film magnetic heads that have been widely used. A composite head is made of a layered structure including a recording head having an induction-type electromagnetic transducer for writing and a reproducing head having a magnetoresistive element (that may be hereinafter called an MR element) for reading. MR elements include an anisotropic magnetoresistive (AMR) element that utilizes the AMR effect and a giant magnetoresistive (GMR) element that utilizes the GMR effect. A reproducing head using an AMR element is called an AMR head or simply an MR head. A reproducing head using a GMR element is called a GMR head. An AMR head is used as a reproducing head where a real recording density is more than 1 gigabit per square inch. A GMR head is used as a reproducing head where a real recording density is more than 3 gigabits per square inch. It is GMR heads that have been most widely used recently.

Performance of the reproducing head is improved by replacing the AMR film with a GMR film and the like having an excellent magnetoresistive sensitivity. Alternatively, a pattern width such as the reproducing track width and the MR height, in particular, may be optimized. The MR height is the length (height) between an end of the MR element located in the air bearing surface and the other end. The air bearing surface is a surface of the thin-film magnetic head facing toward a magnetic recording medium.

Performance improvements in a recording head are also required as the performance of a reproducing head is improved. It is required to increase the recording track density in order to increase the a real recording density among the performance characteristics of the recording head. To achieve this, it is required to implement a recording head of a narrow track structure wherein the width of top and bottom poles sandwiching the recording gap layer on a side of the air bearing surface is reduced down to microns or a submicron order. Semiconductor process techniques are utilized to implement such a structure. A pattern width, such as the throat height in particular is also a factor that determines the recording head performance. The throat height is the length (height) of pole portions, that is, portions of magnetic pole layers facing each other with a recording gap layer in between, between the air-bearing-surface-side end and the other end. To achieve improvement in the recording head performance, it is desirable to reduce the throat height. The throat height is controlled by an amount of lapping when the air bearing surface is processed.

As thus described, it is important to fabricate well-balanced recording and reproducing heads to improve the performance of the thin-film magnetic head.

In order to implement a thin-film magnetic head that achieves high recording density, the requirements for the reproducing head include a reduction in reproducing track width, an increase in reproducing output, and a reduction in noise. The requirements for the recording head include a reduction in recording track width, an improvement in overwrite property that is a parameter indicating one of characteristics when data is written over existing data, and an improvement in nonlinear transition shift.

In general, a flying-type thin-film magnetic head used in a hard disk drive and the like is made up of a slider having a thin-film magnetic head element formed at the trailing edge thereof. The slider slightly flies over a recording medium by means of airflow generated by the rotation of the medium.

Reference is now made to FIGS. 65 to 67 to describe an example of a method of manufacturing a related-art thin-film magnetic head element. FIG. 65 is a cross section orthogonal to the air bearing surface. FIG. 66 is a cross section of the thin-film magnetic head element parallel to the air bearing surface. FIG. 67 is a top view of the thin-film magnetic head element.

According to the manufacturing method, an insulating layer 102 made of alumina ($Al_2O_3$), for example, is first formed on a substrate 101 made of aluminum oxide and titanium carbide ($Al_2O_3$—TiC), for example. On the insulating layer 102, a bottom shield layer 103 of a magnetic material is formed for a reproducing head. Next, a bottom shield gap film 104 of an insulating material such as alumina is formed on the bottom shield layer 103. An MR element 105 for reproduction is then formed on the bottom shield gap film 104. On the bottom shield gap film 104, a pair of electrode layers 106 are formed to be electrically connected to the MR element 105. Next, a top shield gap film 107 of an insulating material such as alumina is formed on the bottom shield gap film 104, the MR element 105 and the electrode layers 106. The MR element 105 is embedded in the shield gap films 104 and 107.

Next, a top-shield-layer-cum-bottom-pole layer (called a bottom pole layer in the following description) 108 is formed on the top shield gap film 107. The bottom pole layer 108 is made of a magnetic material and used for both the reproducing head and the recording head. A recording gap layer 109 of an insulating film such as an alumina film is then formed on the bottom pole layer 108. Next, the recording gap layer 109 is partially etched to form a contact hole for making a magnetic path. A top pole tip 110 of a magnetic material is then formed for the recording head on the recording gap layer 109 in the pole portion. At the same time, a magnetic layer 119 of a magnetic material is formed for making the magnetic path in the contact hole for making the magnetic path.

Next, the recording gap layer 109 and the bottom pole layer 108 are etched through ion milling, using the top pole tip 110 as a mask. As shown in FIG. 66, the structure is called a trim structure wherein the sidewalls of the top pole portion (the top pole tip 110) the recording-gap layer 109, and a part of the bottom pole layer 108 are formed vertically in a self-aligned manner. Next, an insulating layer 111 made of an alumina film, for example, is formed over the entire surface. The insulating layer 111 is then lapped to the surfaces of the top pole tip 110 and the magnetic layer 119 and flattened.

On the flattened insulating layer 111, a first layer 112 of a thin-film coil, made of copper (Cu), for example, is formed for the induction-type recording head. Next, a photoresist layer 113 is formed into a specific shape on the insulating layer 111 and the first layer 112 of the coil. Heat treatment is performed at a specific temperature to flatten the surface of the photoresist layer 113. Next, a second layer 114 of the thin-film coil is formed on the photoresist layer 113. A photoresist layer 115 is then formed into a specific shape on the photoresist layer 113 and the second layer 1.14 of the coil. Heat treatment is performed at a specific temperature to flatten the surface of the photoresist layer 115.

A top pole layer 116 for the recording head is formed on the top pole tip 110, the photoresist layers 113 and 115 and the magnetic layer 119. The top pole layer 116 is made of a magnetic material such as Permalloy (NiFe). Next, an overcoat layer 117 of alumina, for example, is formed to cover the top pole layer 116. Finally, machine processing of the slider including the forgoing layers is performed to form the air bearing surface 118 of the recording head and the reproducing head. The thin-film magnetic head element is thus completed.

In FIG. 67, the overcoat layer 117 and the other insulating layers and films are not shown.

Reference is now made to FIGS. 68 to 73 to describe the configuration and functions of a related-art slider. FIG. 68 is a bottom view showing an example of the configuration of the air bearing surface of the related-art slider. FIG. 69 is a perspective view of the related-art slider. In the example shown in FIGS. 68 and 69, the air bearing surface of the slider 120 is shaped such that the slider 120 slightly flies over the surface of a recording medium such as a magnetic disk by means of an airflow generated by the rotation of the recording medium. In this example, a thin-film magnetic head element 122 is disposed at a position near the air outflow end of the slider 120 (the end on the upper side of FIG. 68) and near the air bearing surface thereof. The configuration of the thin-film magnetic head element 122 is as shown in FIGS. 65 to 67, for example. Portion A of FIG. 68 corresponds to FIG. 66.

In the example shown in FIGS. 68 and 69, the air bearing surface of the slider 120 has first surfaces 121a that are closest to the recording medium, a second surface 121b having a first difference in level from the first surfaces 121a, and a third surface 121c having a second difference in level, greater than the first difference in level, from the first surfaces 121a. The first surfaces 121a are provided close to both sides along the width of the slider 120 (the lateral direction in FIG. 68) and around the thin-film magnetic head element 122. The second surface 121b is provided close to the air inflow end (the end on the lower side of FIG. 68). The-remaining part of the air bearing surface, i.e., the part other than the first and second surfaces 121a and 121b, constitutes the third surface 121c. The first difference in level between the first and second surfaces 121a and 121b is about 1 μm. The second difference in level between the first and third surfaces 121a and 121c is about 2 to 3 μm.

While the recording medium is rotating, a pressure is created between the recording medium and the first surfaces 121a of the air bearing surface of the slider 120 shown in FIGS. 68 and 69, the pressure moving the slider 120 away from the recording medium. In the air bearing surface of the slider 120 shown in FIGS. 68 and 69, the second surface 121b is disposed near the air inflow end, and the third surface 121c is disposed closer to the air outflow end than the second surface 121b is. Here, while the recording medium is rotating, the air passing through between the second surface 121b and the recording medium increases in volume when it reaches the space between the third surface 121c and the recording medium. Accordingly, a negative pressure which draws the slider 120 toward the recording medium is generated between the third surface 121c and the recording medium. As a result, while the recording medium is rotating, the slider 120 flies over the recording medium, being inclined such that the air outflow end is closer to the recording medium than the air inflow end is. The inclination of the air bearing surface of the slider 120 with respect to the surface of the recording medium is designed to fall within 10, for example. The amount of flying of the slider 120 can be reduced by appropriately designing the shape of the air bearing surface.

The slider 120 is fabricated as follows. First, a wafer that includes a plurality of rows of portions to be sliders (hereinafter called slider portions), each of the slider portions including the thin-film magnetic head element 122, is cut in one direction to form blocks called bars each of which includes a row of slider portions. The surface of this bar to be the air bearing surface is then lapped into a lapped surface. Then, first photoresist masks are formed by photolithography on a portion of this lapped surface, the portion being to be the first surfaces 121a. Using the first photoresist masks, the lapped surface is selectively etched to form a stepped surface that has the first difference in level from the lapped surface. The first photoresist masks are then removed. Then, a second photoresist mask is formed by photolithography on the portion of the lapped surface that is to be the first surfaces 121a and on a portion of the stepped surface that is to be the second surface 121b. Using this second photoresist mask, the stepped surface is selectively etched to form the third surface 121c having the second difference in level from the lapped surface. In this way, the first surfaces 121a, the second surface 121b, and the third surface 121c are formed. Then, the bar is cut into the individual sliders 120.

FIG. 70 is a sectional view illustrating the slider 120 and a recording medium 140 in a state in which the recording medium 140 is at rest. In FIG. 70, the slider 120 is shown as sectioned along line 70—70 of FIG. 68. FIG. 71 shows the slider 120 as viewed from the upper side of FIG. 68.

As shown in FIG. 70, the greater part of the slider 120 is made up of the substrate 101 made of aluminum oxide and titanium carbide, for example. The rest of the slider 120 is made up of an insulating portion 127 of alumina, for example, and the thin-film magnetic head element 122 and so on formed-in the insulating portion 127. The greater part of the insulating portion 127 is the overcoat layer 117.

In the slider 120 shown in FIGS. 70 and 71, a protection layer 128 of a material such as diamond-like carbon (DLC) is formed on the air bearing surface so as to protect the bottom shield layer 103, the bottom pole layer 108, the top pole tip 110, the top pole layer 116 and others from corrosion.

FIG. 72 is a sectional view illustrating the slider 120 and the recording medium 140 in a state in which the recording medium 140 has just started rotation from a resting state. FIG. 73 shows a state in which the recording medium 140 is rotating and the slider 120 is flying over the surface of the recording medium 140 to perform reading and writing with the thin-film magnetic head element 122. While the slider 120 is flying, the minimum distance H11 between the slider 120 and the recording medium 140 is about 8 to 10 nm, and the distance H12 between the air outflow end of the slider 120 and the recording medium 140 is about 100 to 500 nm.

Measures for improving the performance of a hard disk drive, such as a real recording density in particular, include increasing a linear recording density and increasing a track density. To design a high-performance hard disk drive, specific measures to be taken for implementing the recording head, the reproducing head or the thin-film magnetic head as a whole differ depending on whether linear recording density or track density is emphasized. That is, if priority is given to track density, a reduction in track width is required for both the recording head and the reproducing head, for example.

If priority is given to linear recording density, it is required for the reproducing head, for example, to improve the reproducing output and to reduce a shield gap length, that is, the distance between the bottom shield layer and the top shield layer. Furthermore, it is required to reduce the distance between the recording medium and the thin-film magnetic head element (hereinafter called a magnetic space).

A reduction in magnetic space is achieved by reducing the amount of flying of the slider. A reduction in magnetic space contributes not only to an improvement in the reproducing output of the reproducing head but also to an improvement in the overwrite property of the recording head.

The amount of flying of the slider can be reduced, for example, by forming the first, second, and third surfaces having differences in level from one another in the air bearing surface of the slider as shown in FIGS. 68 and 69.

According to the conventional method of manufacturing a slider, a wafer is cut in one direction to form a plurality of bars, and the bars are lapped to have a lapped surface, followed by formation of the first to third surfaces in the lapped surface of each bar. The step of forming the first to third surfaces in the lapped surface can be performed for a plurality of bars at a time. To this end, however, it is necessary that the plurality of bars be placed in a prescribed arrangement and then subjected to mask-forming and etching processes. Thus, the conventional method involves a large number of steps for manufacturing a slider, which increases the manufacturing cost of the slider.

On the other hand, as the magnetic space is reduced, the slider is likely to collide with the recording medium, which can result in damage to the recording medium and the thin-film magnetic head element. To avoid this, it is required to enhance the smoothness of the surface of the medium. However, the slider easily sticks to the medium if the smoothness of the surface of the medium is enhanced. This results in a problem that the slider is harder to take off from the recording medium when the recording medium starts rotation from a resting state where the slider is in contact with the recording medium.

Conventionally, a crown or a camber is formed on the air bearing surface of the slider in order to prevent the slider from sticking to the recording medium. A crown refers to a convex surface which gently curves along the length of the slider 120 as shown in FIG. 70. A camber refers to a convex surface which gently curves along the width of the slider 120 as shown in FIG. 71. The crown has a difference of elevation C1 on the order of 10 to 50 nm. The camber has a difference of elevation C2, on the order of 5 to 20 nm.

Crowns are conventionally formed, for example, by changing the orientation of the bar with respect to the surface plate when lapping the air bearing surface of the bar.

Cambers are conventionally formed by the following method, for example. That is, after lapping the air bearing surface of the bar to adjust MR height, slits are made in the bar, using a diamond grinder or the like, at positions at which the slider portions are to be separated. Then, the air bearing surface of the bar is re-lapped lightly on a concave surface plate.

In the above-described method for forming cambers, after the MR height is precisely adjusted by lapping the air bearing surface of the bar, the air bearing surface of the bar is lapped again by about 10 to 20 nm in order to form the camber. This results in a problem that the MR height can deviate from its desired value. Further, according to this method, when the air bearing surface of the bar is lapped on the concave surface plate, the bar can be scratched by stain and dust on the surface plate, which results in a problem of a lower yield of the thin-film magnetic heads. Further, according to this method, when the air bearing surface of the bar is lapped on the concave surface plate, chippings of the electrode layer connected to the MR element may be jammed and spread between the air bearing surface and the surface plate, producing a defect called a smear. The smear sometimes causes an electric short circuit between the MR element and the shield layers. The short circuit can lower the sensitivity of the reproducing head and produce noise in the reproducing output, thereby deteriorating the performance of the reproducing head.

Further, if crowns/cambers are to be formed on the air bearing surfaces of the sliders, the manufacturing costs of the sliders are raised because of the steps of forming the crowns/cambers.

OBJECTS AND SUMMARY OF THE INVENTION

A first object of the invention is to provide a slider of a thin-film magnetic head which can be manufactured in a smaller number of steps, and a method of manufacturing such a slider.

A second object of the invention is, in addition to the aforementioned first object, to provide a slider of a thin-film magnetic head and a method of manufacturing same, which make it possible to reduce the magnetic space, prevent the slider from sticking to the recording medium, and prevent damages to a recording medium or a thin-film magnetic head element due to a collision between the slider and the recording medium.

A slider of a thin-film magnetic head according to the invention comprises:

a slider section having a first medium facing surface that faces toward a rotating recording medium and an air inflow end; and an element section having a second medium facing surface that faces toward the recording medium, an air outflow end, and a thin-film magnetic head element, wherein the first medium facing surface has concavities and convexities for controlling the orientation of the slider section while the recording medium is rotating, and the slider section and the element section are bonded to each other such that the air inflow end and the air outflow end are disposed on opposite sides with the first and second medium facing surfaces in between.

The slider of a thin-film magnetic head of the invention comprises the slider section and the element section that are bonded to each other. It is therefore possible to mass-produce the slider section and the element section separately at a time.

In the slider of a thin-film magnetic head of the invention, the slider section may have a substrate portion and a medium facing layer placed on the substrate portion, the first medium facing surface may be formed on the medium facing layer, the element section may have an insulating portion surrounding the thin-film magnetic head element, the substrate portion may have a hardness greater than that of the insulating portion, and, as the substrate portion and the medium facing layer are compared in hardness, the hardness of the medium facing layer may be closer to the hardness of the insulating portion.

In the slider of a thin-film magnetic head of the invention, the first medium facing surface may have a first surface closer to the element section, a second surface closer to the air inflow end, and a border portion located between the first and second surfaces. The second surface may be slanted against the first surface such that the first and second surfaces make a convex shape bent at the border portion.

While the recording medium is rotating, the second surface may slant against the surface of the recording medium such that the air inflow end is farther from the recording medium than the border portion is. In this case, the second surface and the surface of the recording medium may form an angle of 30° or smaller while the recording medium is rotating.

In the slider of a thin-film magnetic head of the invention, where the first medium facing surface has the first surface, the second surface and the border portion, the slider section may be in contact with the surface of the recording medium while the recording medium is at rest, and may stay away from the surface of the recording medium while the recording medium is rotating. In this case, when the slider section comes into contact with the surface of the recording medium, the border portion may be the first to make contact with the surface of the recording medium. When the slider section takes off from the surface of the recording medium, the border portion may be the last to depart from the surface of the recording medium.

Regardless of whether the recording medium is rotating or at rest, the slider section may be in contact with the surface of the recording medium at the border portion, and the first surface and the second surface may slant against the surface of the recording medium such that the element section and the air inflow end are off the recording medium.

The first surface and the second surface may form an angle of 30° or smaller.

The first medium facing-surface may have a recess formed in a region including the border portion.

The second medium facing surface may be disposed farther from the recording medium than the first surface of the first medium facing surface is.

In the slider of a thin-film magnetic head of the invention the thin-film magnetic head element may comprise a magnetoresistive element for reproduction and an induction-type electromagnetic transducer for recording, the electromagnetic transducer being disposed farther from the slider section than the magnetoresistive element is.

A method of the invention is provided for manufacturing a slider of a thin-film magnetic head, the slider comprising: a slider section having a first medium facing surface that faces toward a rotating recording medium and an air inflow end; and an element section having a second medium facing surface that faces toward the recording medium, an air outflow end, and a thin-film magnetic head element, wherein the first medium facing surface has concavities and convexities for controlling the orientation of the slider section while the recording medium is rotating, and the slider section and the element section are bonded to each other such that the air inflow end and the air outflow end are disposed on opposite sides with the first and second medium facing surfaces in between.

The method comprises the steps of: producing the slider section; producing the element section separately from the slider section; and bonding the slider section and the element section to each other.

According to the method of manufacturing the slider of the invention, the slider section and the element section are produced separately, and they are bonded to each other to complete the slider. Therefore, it is possible to mass-produce the slider section and the element section separately at a time.

In the method of manufacturing the slider of the invention, the step of producing the slider section may include the step of forming a plurality of the first medium facing surfaces corresponding to a plurality of the slider sections for a first wafer, and the step of producing the element section may include the step of forming a plurality of the thin-film magnetic head elements on a second wafer.

In the method of manufacturing the slider of the invention, the step of producing the slider section may include the steps of: forming a plurality of the first medium facing surfaces corresponding to a plurality of the slider sections for a first wafer to thereby form a first slider section aggregate including a plurality of the slider sections arranged in a plurality of rows; and cutting the first slider section aggregate to thereby form a second slider section aggregate including a plurality of the slider sections arranged in a row. The step of producing the element section may include the steps of: forming a plurality of the thin-film magnetic head elements on a second wafer to thereby form a first element section aggregate including a plurality of the element sections arranged in a plurality of rows; and cutting the first element section aggregate to thereby form a second element section aggregate including a plurality of the element sections arranged in a row. The step of bonding the slider section and the element section to each other may include the step of bonding the second slider section aggregate and the second element section aggregate to each other to thereby produce a slider aggregate including a plurality of the sliders arranged in a row. The method of manufacturing the slider may further comprise the step of cutting the slider aggregate into a plurality of the sliders separated from one another.

In the method of manufacturing the slider of the invention, the slider section may have a substrate portion and a medium facing layer placed on the substrate portion, the element section may have an insulating portion surrounding the thin-film magnetic head element, the substrate portion may have a hardness greater than that of the insulating portion, the hardness of the medium facing layer may be closer to the hardness of the insulating portion as the substrate portion and the medium facing layer are compared in hardness, and, the first medium facing surface may be formed on the medium facing layer in the step of producing the slider section.

The method of manufacturing the slider of the invention may further comprise the step of lapping the first and second medium facing surfaces so as to flatten the first and second surfaces, after the step of bonding the slider section and the element section to each other.

The method of manufacturing the slider of the invention may further comprise, after the step of bonding the slider section and the element section to each other, the step of lapping the first medium facing surface so as to allow the first medium facing surface to have a first surface closer to the element section, a second surface closer to the air inflow end, and a border portion located between the first and second surfaces, and to allow the second surface to slant against the first surface such that the first and second surfaces make a convex shape bent at the border portion. In this case, the first surface and the second surface may form an angle of 30° or smaller. The method of manufacturing the slider may further comprise the step of forming a recess in a region including the border portion in the first medium facing surface. Further, the second medium facing surface may be disposed farther from the recording medium than the first surface of the first medium facing surface is.

In the method of manufacturing the slider of the invention, a ceramic-based adhesive may be used to bond the slider section and the element section to each other in the step of bonding the slider section and the element section to each other.

In the method of manufacturing the slider of the invention, in the step of bonding the slider section and the element section to each other, a thermosetting adhesive may be put between the slider section and the element section, and the adhesive may be cured by heating at a temperature of 300° C. or less to thereby bond the slider section and the element section to each other.

In the method of manufacturing the slider of the invention, the step of producing the element section may include the steps of: forming a plurality of the thin-film magnetic head elements on one of surfaces of a wafer; and removing at least part of the wafer by lapping the other one of the surfaces of the wafer. In this case, in the step of bonding the slider section and the element section to each other, a surface formed at the element section by the lapping may be bonded to the slider section. Alternatively, in the step of bonding the slider section and the element section to each other, a surface-opposite to the surface formed at the element section by the lapping may be bonded to the slider section. In the step of removing at least part of the wafer, the other one of the surfaces of the wafer may be lapped with a support plate placed on a plurality of the thin-film magnetic head elements. At least part of the support plate, the part including the surface facing the thin-film magnetic head elements, may have conductivity.

In the method of manufacturing the slider of the invention, the step of producing the slider section may include the steps of: forming an etching mask of metal on one of surfaces of a ceramic substrate; and etching the ceramic substrate by dry etching through the use of the etching mask to thereby form the concavities and convexities on the one of the surfaces of the ceramic substrate. In this case, the dry etching may be reactive ion etching.

In the method of manufacturing the slider of the invention, the step of producing the slider section may include the steps of: forming a first etching mask of metal on one of surfaces of a ceramic substrate; etching the ceramic substrate by dry etching through the use of the first etching mask to thereby form a first recess in the one of the surfaces of the ceramic substrate; forming a second etching mask to cover part of the first recess; and etching the ceramic substrate further by dry etching through the use of the second etching mask to thereby form a second recess deeper than the first recess in the one of the surfaces of the ceramic substrate.

In the method of manufacturing the slider of the invention, a magnetoresistive element for reproduction and an induction-type electromagnetic transducer for recording may be formed in this order on one of surfaces of a wafer in the step of producing the element section, and the slider section and the element section may be bonded to each other such that the magnetoresistive element is disposed closer to the slider section than the induction-type electromagnetic transducer in the step of bonding the slider section and the element section to each other.

In the method of manufacturing the slider of the invention, the induction-type electromagnetic transducer for recording and the magnetoresistive element for reproduction may be formed in this order on one of surfaces of the wafer in the step of producing the element section, and the slider section and the element section may be bonded to each other such that the magnetoresistive element is disposed closer to the slider section than the induction-type electromagnetic transducer in the step of bonding the slider section and the element section to each other.

Other and further objects, features and advantages of the invention will appear more fully from the following description.

BRIEF DESCRIPTION OF THE DRAWINGS

FIG. 42 is a side view for illustrating the step of bonding the slider section and the element section to each other in the third embodiment.

FIG. 43 is a side view for illustrating a step that follows FIG. 42.

FIG. 44 is a side view for illustrating a step that follows FIG. 43.

DETAILED DESCRIPTION OF THE PREFERRED EMBODIMENTS

Preferred embodiments of the invention will now be described in detail with reference to the accompanying drawings.

First Embodiment

Figure 1:
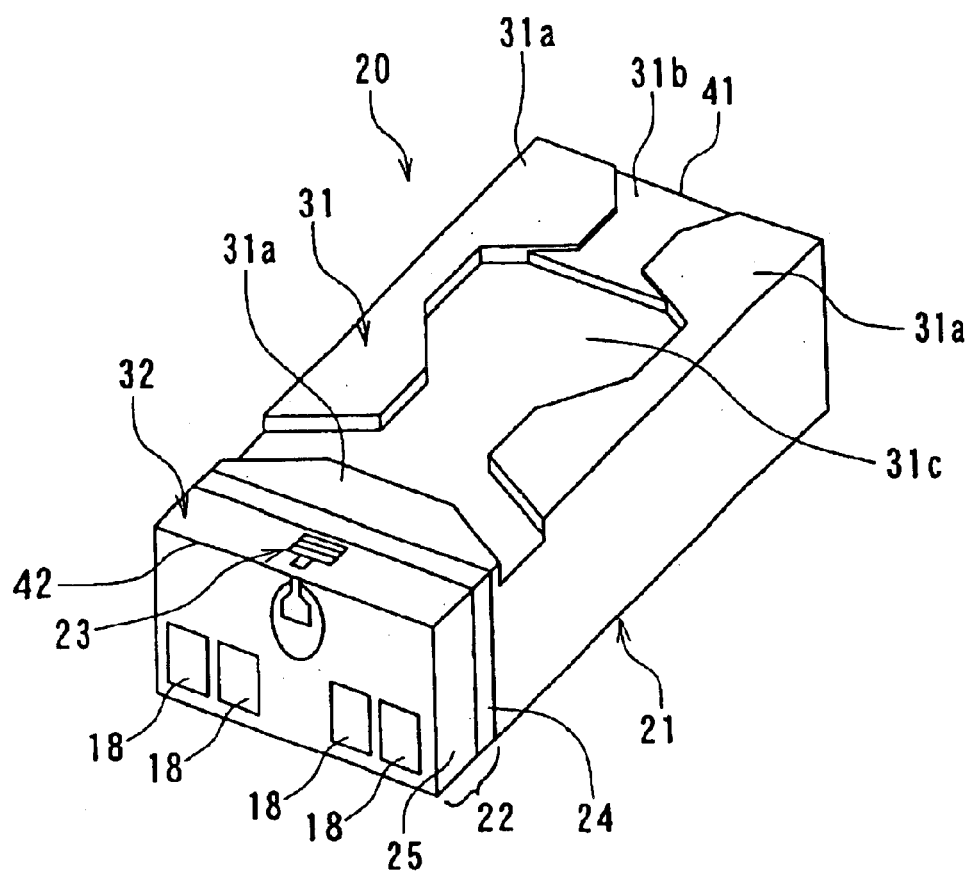
FIG. 1 is a perspective view of a slider according to a first embodiment of the invention.

Reference is now made to FIG. 1 to describe a configuration of a slider of a thin-film magnetic head (hereinafter simply referred to as a slider) according to a first embodiment of the invention. FIG. 1 is a perspective view of the slider according to the embodiment.

The slider 20 according to the first embodiment comprises a slider section 21 and an element section 22. The entire slider section 21 has a generally cuboid shape. The entire element section 22 has a cuboid shape. The entire slider 20 has a generally cuboid shape.

The slider section 21 has: a first medium facing surface 31 facing toward a rotating recording medium; and an air inflow end 41 serving as an end from which an airflow generated by the rotation of the recording medium flows in. The slider section 21 is made of aluminum oxide and titanium carbide, for example.

The element section 22 has: a second medium facing surface 32 facing toward the recording medium; an air outflow end 42 serving as an end from which the airflow generated by the rotation of the recording medium flows out; and a thin-film magnetic head element 23. The thin-film magnetic head element 23 is disposed near the second medium facing surface 32.

The slider section 21 and the element section 22 are bonded to each other such that the air inflow end 41 and the air outflow end 42 are disposed on opposite sides with the first and second medium facing surfaces 31 and 32 in between.

The first medium facing surface 31 has concavities and convexities for controlling the orientation of the slider section 21 during the rotation of the recording medium. Specifically, the first medium facing surface 31 has surfaces 31a that are closest to the recording medium, a surface 31b having a predetermined first difference in level from the surfaces 31a, and a surface 31c having a second difference in level, greater than the first difference in level, from the surfaces 31a. The surfaces 31a are provided close to both sides along the width of the slider section 21 and adjacent to the element section 22. The surface 31b is provided close to the air inflow end 41. The remaining part of the first medium facing surface 31, i.e., the part other than the surfaces 31a and 31b, constitutes the surface 31c.

The slider 20 of the embodiment can provide a force to cause the slider section 21 to move apart from or move toward the recording medium by means of an airflow according to the shape of the concavities and convexities of the first medium facing surface 31. Therefore, the orientation of the slider 20 during the rotation of the recording medium can be controlled by appropriately designing the shape of the concavities and convexities of the first medium facing surface 31.

The element section 22 includes a substrate portion 24 serving as an underlying base for the thin-film magnetic head element 23, and an insulating portion 25 surrounding the thin-film magnetic head element 23. The substrate portion 24 is made of aluminum oxide and titanium carbide, for example. The insulating portion 25 is made mainly of alumina, for example. The substrate portion 24 is bonded to the slider section 21. Electrode pads 18 are provided on the surface of the insulating portion 25 opposite to the substrate portion 24. The pads 18 are connected to the thin-film magnetic head element 23. The substrate portion 24 is not necessarily required, however. When the element section 22 does not include the substrate portion 24, the insulating portion 25 is bonded to the slider section 21.

Although not shown in FIG. 1, the slider 20 may include a protection layer to cover the first and second medium facing surfaces 31 and 32. The protection layer is made of alumina or diamond-like carbon, for example.

A method of manufacturing the slider 20 according to the embodiment will now be described. The method includes the steps of producing the slider section 21, producing the element section 22 separately from the slider section 21, and bonding the slider section 21 and the element section 22 to each other.

Figure 2:
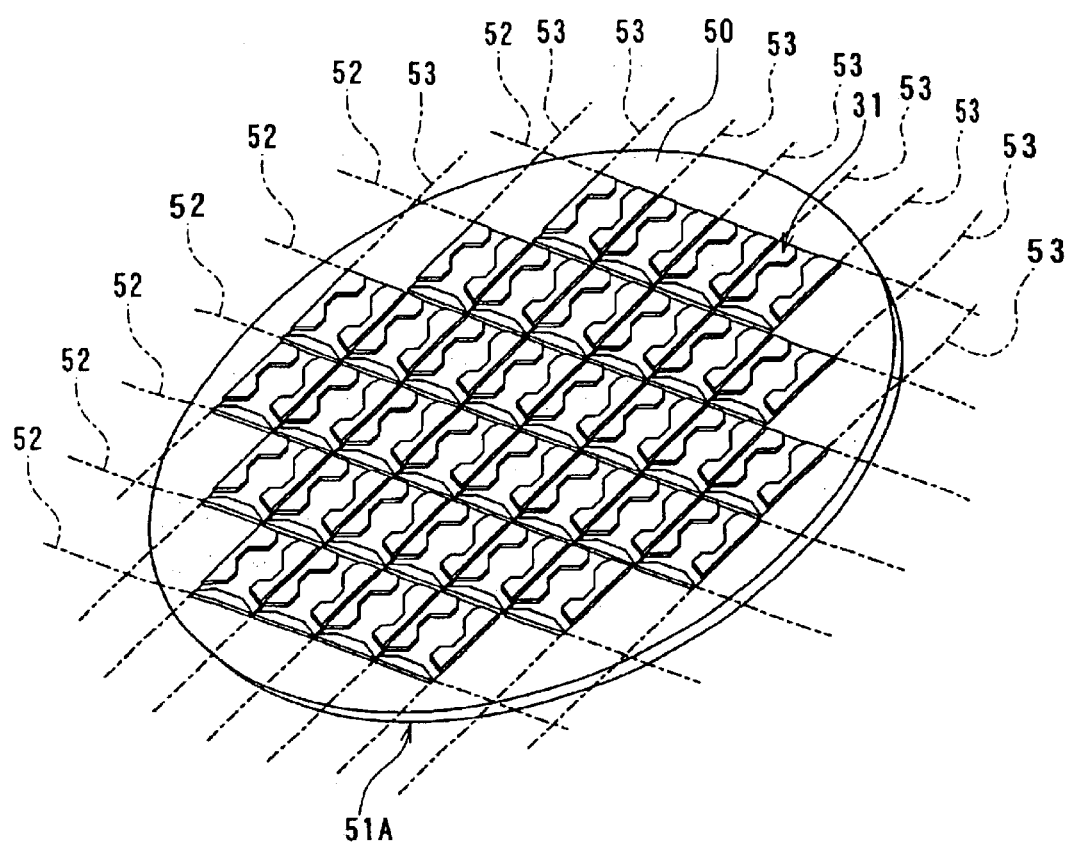
FIG. 2 is a perspective view of a first slider section aggregate of the first embodiment.

First, the step of producing the slider section 21 will be described. As shown in FIG. 2, the step of producing the slider section 21 includes: the step of forming a plurality of the first medium facing surfaces 31 corresponding to a plurality of the slider sections 21 for a first wafer 50 to thereby form a first slider section aggregate 51A including a plurality of the slider sections 21 arranged in a plurality of rows; and the step of cutting the first slider section aggregate 51A in positions denoted by reference numeral 52 in FIG. 2, thereby forming second slider section aggregates each including a plurality of the slider sections 21 arranged in a row. The first wafer 50 may be made of silicon, or of a ceramic material such as aluminum oxide and titanium carbide. The first wafer 50 appearing in the following description is made of aluminum oxide and titanium carbide. The first wafer 50 corresponds to the ceramic substrate according to the invention.

In the step of forming a plurality of the first medium facing surfaces 31 for the first wafer 50, the first medium facing surfaces 31 may be formed with a camber. In forming the camber, it is recommendable to provide the first wafer 50 with incisions using a diamond grinder at the positions denoted by reference numeral 53 in FIG. 2, before forming the first medium facing surfaces 31.

Referring now to FIGS. 3 to 10, the step of forming a plurality of the first medium facing surfaces 31 for the first wafer 50 will be described in detail. FIGS. 3 to 8 are sectional views each showing a part of the first wafer 50. In this step, first, a seed layer for plating is formed on one of surfaces of the first wafer 50 by sputtering. The seed layer is 50 nm in thickness, for example. Then, a frame for forming an etching mask by frame plating is formed on the seed layer by photolithography. The etching mask is formed using the frame by frame plating. The material of the etching mask is a metal such as NiFe and Cu. Here, the material of the etching mask is NiFe (Ni: 80 wt %, Fe: 20 wt %) by way of example. The etching mask may have a thickness of about 0.5 $\mu$m to 1.0 $\mu$m. Then, the frame is removed and, part of the seed layer, i.e, the part that was under the frame, is removed by ion milling, for example.

Figure 3:
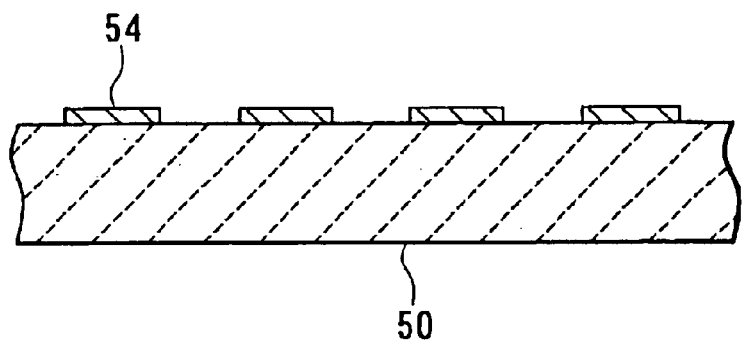
FIG. 3 is a sectional view for illustrating the step of forming a first medium facing surface in the first embodiment.

FIG. 3 shows the metal etching mask 54 thus formed on the one of the surfaces of the first wafer 50. The etching mask 54 is placed in positions where the surfaces 31a of the first medium facing surfaces 31 are to be formed.

Figure 4:
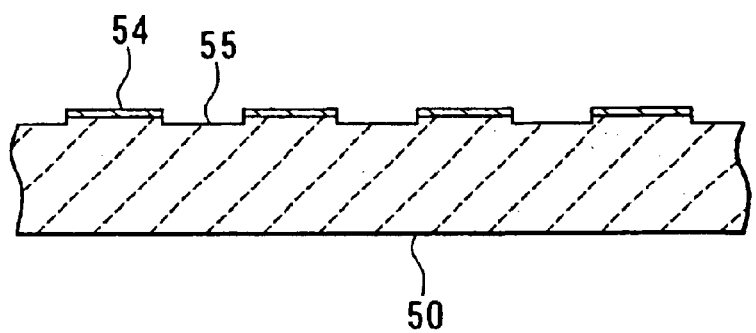
FIG. 4 is a sectional view for illustrating a step that follows FIG. 3.

Then, as shown in FIG. 4, the first wafer 50 is etched by dry etching through the use of the etching mask 54, thereby forming first recesses 55 on the one of the surfaces of the first wafer 50. The first recesses 55 are about 1 $\mu$m in depth. A part of the bottom surface of each first recess 55 makes the surface 31b of the first-medium facing surface 31. The dry etching used here is ion milling or reactive ion etching. If the reactive ion etching is employed, a halogen-based gas such as $Cl_2$, $BCl_3$, $CF_4$ and $SF_6$ may be used as the reactive gas. Using as the reactive gas a mixture of $Cl_2$ and $BCl_3$ in the ratio of 10:4 or a ratio ±10% shifted from the above ratio will allow a large etching selectivity ratio between the etching mask 54 of metal and the wafer 50 of aluminum oxide and titanium carbide. The reactive gas may also be a mixture gas of $O_2$, $N_2$, Ar, He, and $H_2$. The reactive gas may also be a gas containing the above halogen-based gas and the above mixture gas.

Figure 5:
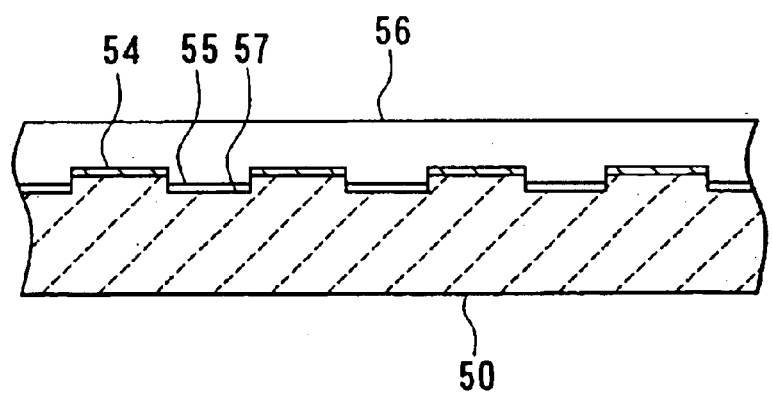
FIG. 5 is a sectional view for illustrating a step that follows FIG. 4.
Figure 9:
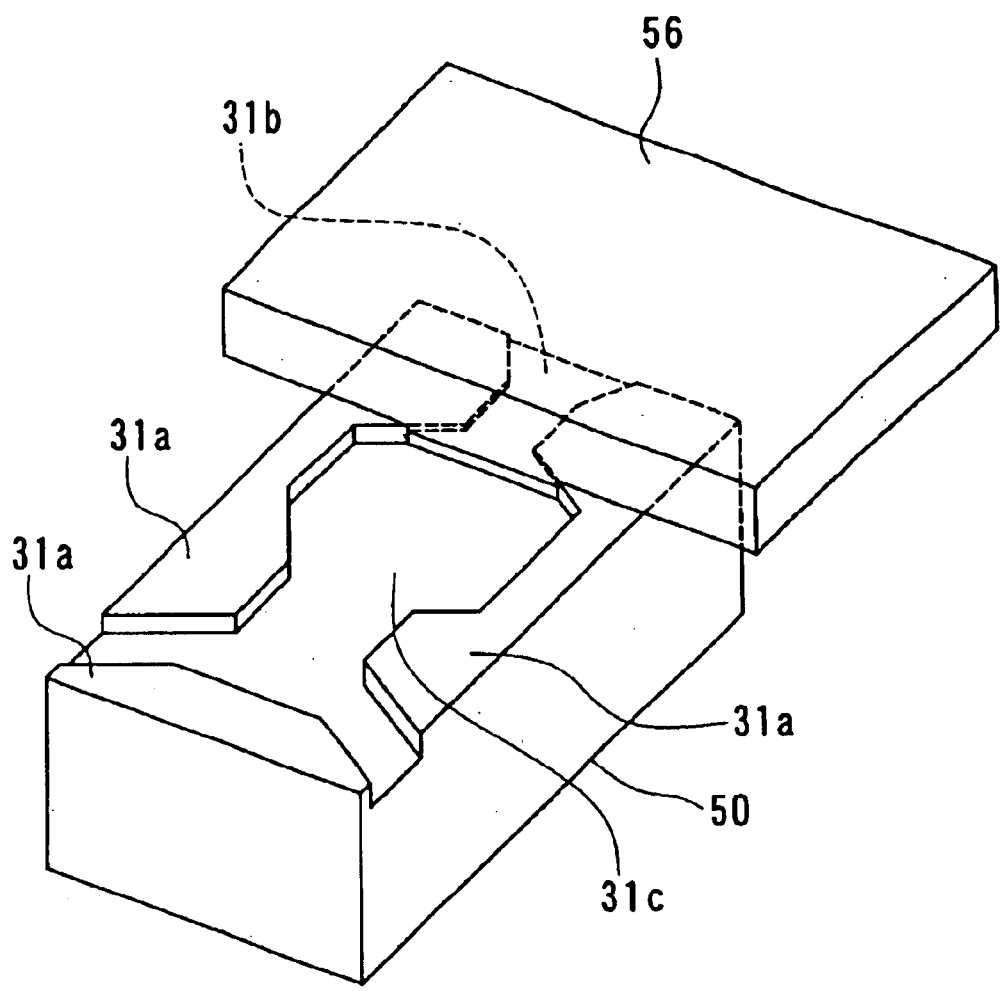
FIG. 9 is a perspective view for illustrating the step shown in FIG. 5.

Then, as shown in FIG. 5, with the etching mask 54 left unremoved, an etching mask 56 of a photoresist, for example, is formed on the one of the surfaces of the first wafer 50 to cover a part of each of the first recesses 55. As shown in FIG. 9, the etching mask 56 is provided in positions where the surfaces 31b of the first medium facing surfaces 31 are to be formed. Then, using the etching masks 54 and 56, the first wafer 50 is further dry-etched to form second recesses 57 deeper than the first recesses 55 on the one of the surfaces of the first wafer 50. The depth of the second recesses 57 from the surfaces 31a is about 3 μm, for example. A part of the bottom surface of each second recess 57 makes the surface 31c of the first medium facing surface 31. The remaining part of each second recess 57 is disposed between adjacent ones of the first medium facing surfaces 31. The method of etching the wafer 50 to form the second recesses 57 is the same as the method of etching the wafer 50 to form the first recesses 55.

The etching mask 56 is then removed by a solvent, and the etching mask 54 is removed by ion milling, for example. In this way, the first medium facing surfaces 31 each including the surfaces. 31a to 31c are formed.

The first medium facing surfaces 31 are lapped on a concave surface plate to form a camber for each first medium facing surface 31.

Figure 6:
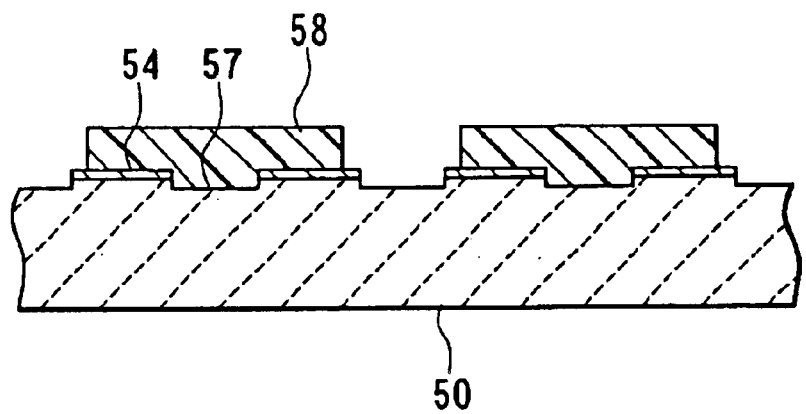
FIG. 6 is a sectional view for illustrating a step that follows FIG. 5.

Then, as shown in FIG. 6, an etching mask 58 of a photoresist, for example, is formed on the one of the surfaces of the first wafer 50. The etching mask 58 is formed on a portion of each first medium facing surface 31 other than its peripheral portion, and used for chamfering the peripheral portion of each first medium facing surface 31.

Figure 7:
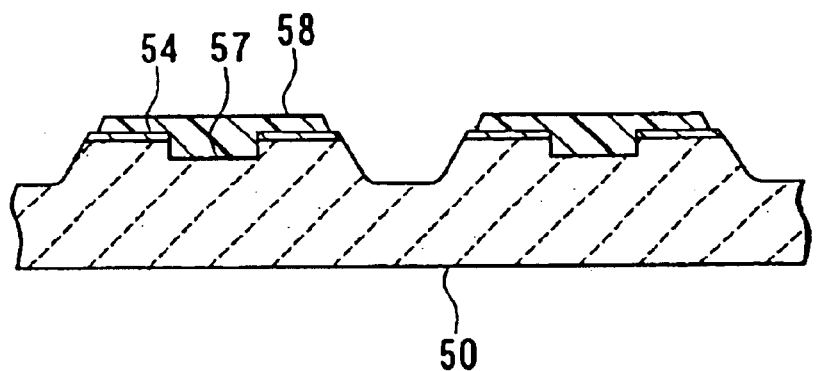
FIG. 7 is a sectional view for illustrating a step that follows FIG. 6.

Then, as shown in FIG. 7, the first wafer 50 is etched by, for example, reactive ion etching through the use of the etching mask 58. The etching depth is about 5 μm, for example. The portion of the surface of the first wafer 50 located between adjacent ones of the first medium facing surfaces 31 has a depth of, for example, 3 μm from the surfaces 31a before the etching using the etching mask 58, and therefore the depth after the etching is about 8 μm, for example, from the surfaces 31a.

When the first wafer 50 is etched by reactive ion etching using the etching mask 58, the etching mask 58 is side-etched as well. As a result, as shown in FIG. 7, the peripheral portions of the first medium facing surfaces 31 are etched more deeply on the outer sides. The peripheral portions are thereby shaped into a curved surface.

Figure 8:
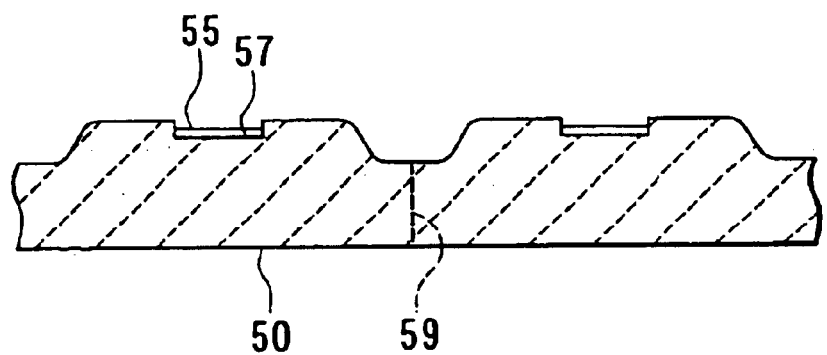
FIG. 8 is a sectional view for illustrating a step that follows FIG. 7.

Then, as shown in FIG. 8, the etching mask 58 is removed with a solvent. Chamfering the peripheral portions of the first medium facing surfaces 31 as described above allows to prevent damage to the recording medium in a hard disk drive due to a collision of the slider section 21 against the recording medium because of mechanical vibration or the like. In FIG. 8, the broken line indicated by reference numeral 59 represents the border between adjacent ones of the slider sections 21.

Figure 10:
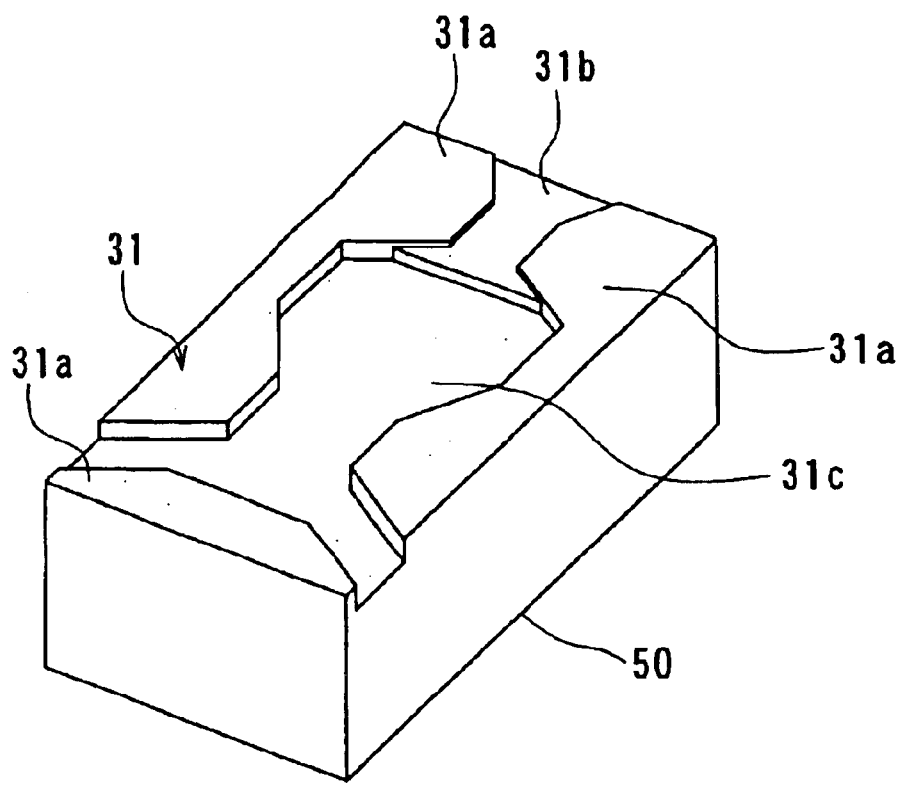
FIG. 10 is a perspective view of a first wafer after the first medium facing surface of the first embodiment has been formed.

FIG. 10 is a perspective view of the first wafer 50 after the first medium facing surfaces 31 have been formed in the manner described above. Note that FIG. 10 shows only a part of the first wafer 50 corresponding to a single slider section 21.

The first slider section aggregate 51A shown in FIG. 2 is formed in this way. The first slider section aggregate 51A is cut in the positions denoted by reference numeral 52. Thus, the second slider section aggregates each including a plurality of the slider sections 21 arranged in a row are formed.

Figure 11:
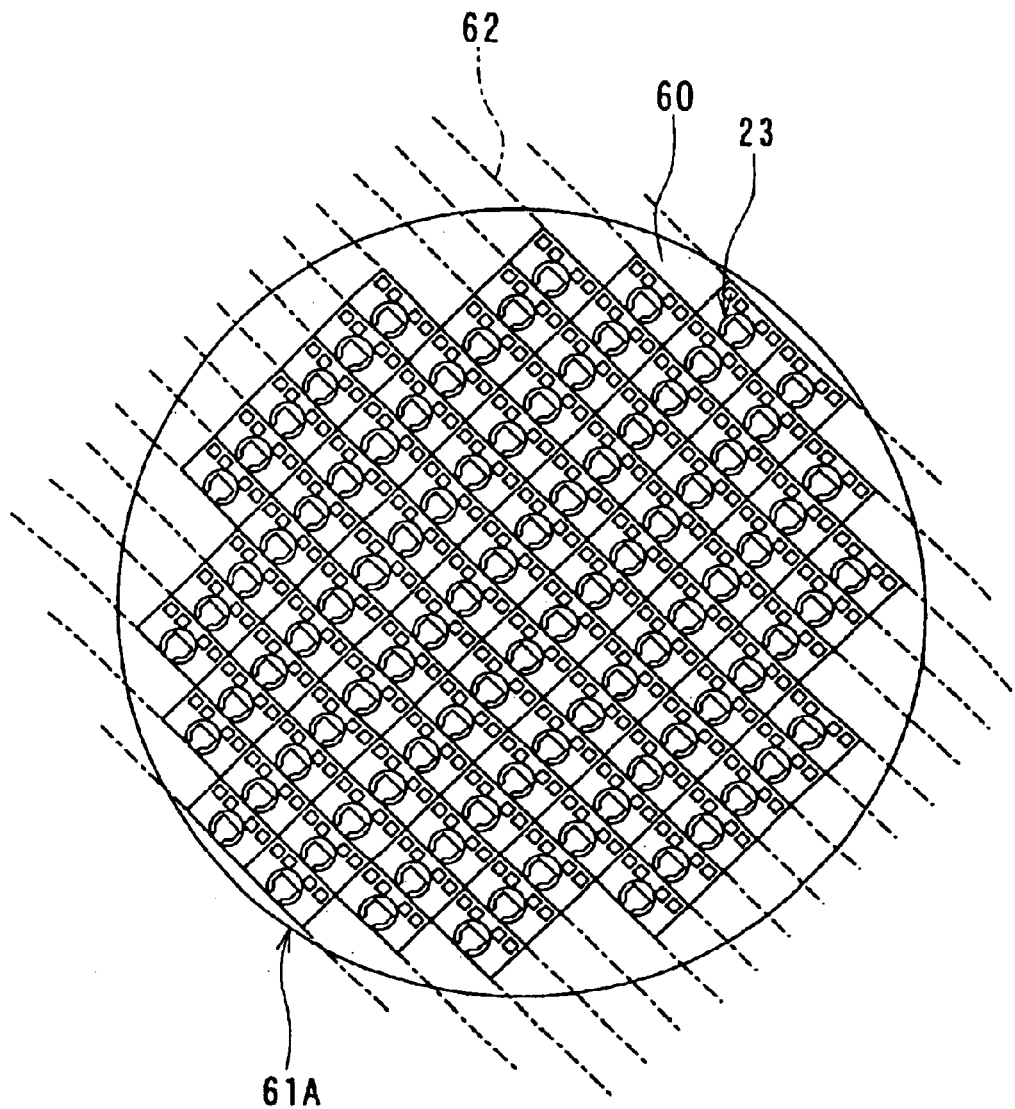
FIG. 11 is a perspective view of a first element section aggregate of the first embodiment.

The step of producing the element section 22 will now be described. As shown in FIG. 11, the step of producing the element section 22 includes the steps of: forming a plurality of the thin-film magnetic head elements 23 on a second wafer 60 to thereby form a first element section aggregate 61A including a plurality of the element sections 22 arranged in a plurality of rows; and cutting the first element section aggregate 61A in positions denoted by reference numeral 62 in FIG. 11 to thereby produce second element section aggregates each including a plurality of the element sections 22 arranged in a row. The second wafer 60 may be made of silicon, or a ceramic material such as aluminum oxide and titanium carbide. The second wafer 60 appearing in the following description is made of aluminum oxide and titanium carbide.

Figure 12:
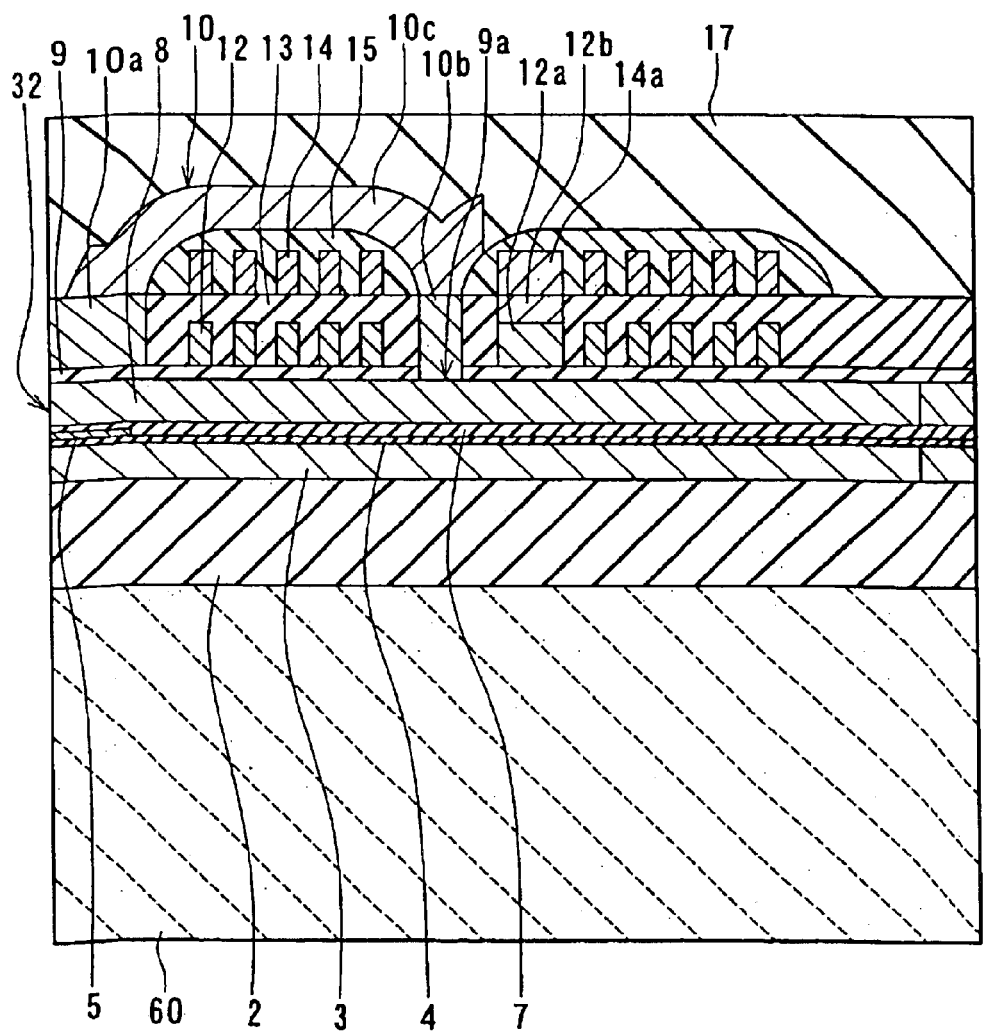
FIG. 12 is a sectional view of a thin-film magnetic head element of the first embodiment.
Figure 13:
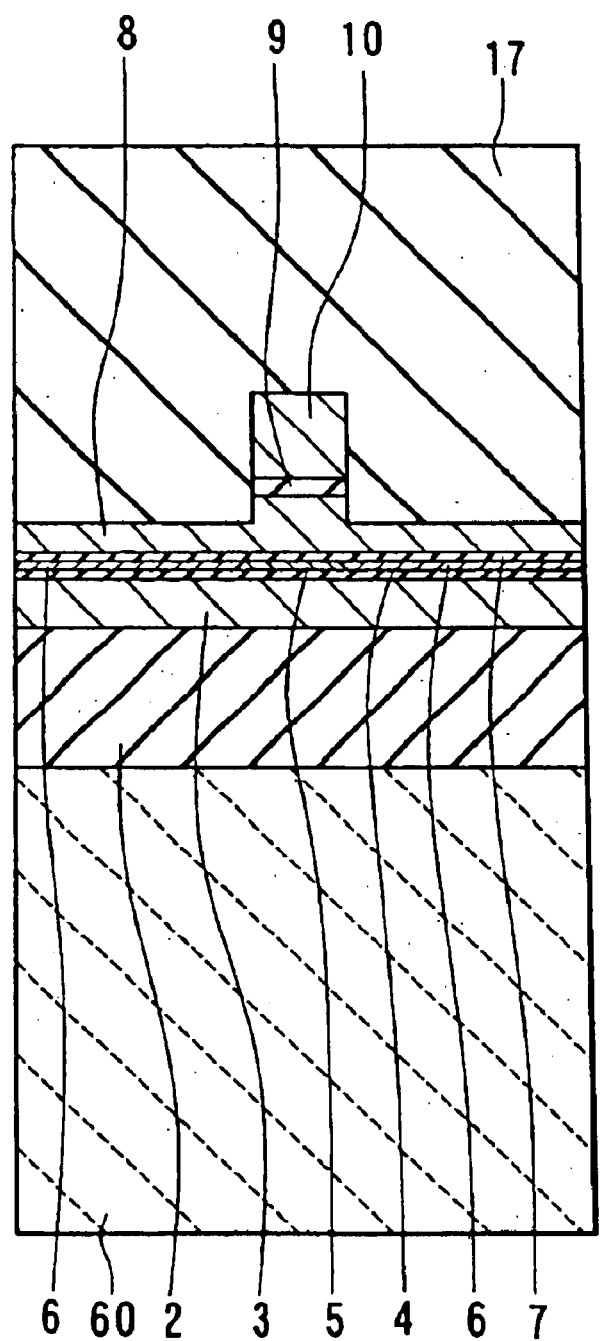
FIG. 13 is a sectional view of the thin-film magnetic head element of the first embodiment.

Reference is now made to FIGS. 12 and 13 to describe a configuration of the thin-film magnetic head element 23 and an example of a method of forming the same will be described. FIGS. 12 and 13 are sectional views of the thin-film magnetic head element 23. FIG. 12 shows a section orthogonal to the second medium facing surface 32 and the top surface of the second wafer 60, while FIG. 13 shows a section parallel to the second medium facing surface 32.

In the method of forming the thin-film magnetic head element 23 shown in FIGS. 12 and 13, an insulating layer 2 made of alumina ($Al_2O_3$) for example, is first formed on the second wafer 60. On the insulating layer 2, a bottom shield layer 3 of a magnetic material is formed for the reproducing head. Then, a bottom shield gap film 4 of an insulating material such as alumina is formed on the bottom shield layer 3. An MR element 5 for reproduction is then formed on the bottom shield gap film 4. A pair of electrode layers 6 are then formed on the bottom shield gap film 4. The electrode layers 6 are electrically connected to the MR element 5. Then, a top shield gap film 7 of an insulating material such as alumina is formed on the bottom shield gap film 4, the MR element 5, and the electrode layers 6. The MR element 5 is embedded in the shield gap films 4 and 7.

The MR element 5 may be an element utilizing a magnetosensitive film that exhibits magnetoresistivity, such as an AMR element, a GMR element or a tunnel magnetoresistive (TMR) element. Examples of insulating materials to be used for the shield gap films 4 and 7 include alumina, aluminum nitride, and diamond-like carbon (DLC). The shield gap films 4 and 7 may be formed through sputtering or chemical vapor deposition (CVD).

Then, a top-shield-layer-cum-bottom-pole layer (hereinafter called a bottom pole-layer) 8 is formed on the top shield gap film 7. The bottom pole layer 8 is made of a magnetic material and used for both the reproducing head and the recording head. A recording gap layer 9 made of an insulating film such as an alumina film is then formed on the bottom pole layer 8. Then, the recording gap layer 9 is partially etched to form a contact hole 9a for making a magnetic path. A pole portion layer 10a of a magnetic material is formed on the recording gap layer 9 in the magnetic pole portion. At the same time, a magnetic layer 10b of a magnetic material is formed on the contact hole 9a.

Using the pole portion layer 10a as a mask, the recording gap layer 9 is dry-etched, and then a part of the bottom pole layer 8 is etched to form a trim structure as shown in FIG. 13. The trim structure suppresses an increase in the effective track width due to expansion of a magnetic flux generated during writing in a narrow track. The etching of the recording gap layer 9 is effected by, for example, reactive ion etching using a halogen-based gas. The etching of the bottom pole layer 8 is effected by argon ion milling, for example.

Then, a first layer 12 of a thin-film coil made of copper, for example, is formed on recording gap layer 9 for the recording head. In FIG. 12, reference numeral 12a denotes the connection part of the first layer 12 to be connected to a second layer 14 of the thin-film coil described later. A conductor layer 12b is then formed on the connection part 12a.

Then, an insulating layer 13 made of alumina, for example, is formed to cover the entire surface. The insulating layer 13 is polished by chemical mechanical polishing (CMP), for example, so that the pole portion layer 10a the magnetic layer 10b and the conductor layer 12b are exposed, and the surface is flattened.

The second layer 14 of the thin-film coil is then formed on the insulating layer 13. In FIG. 12, reference numeral 14a indicates the connection part of the second layer 14 that is connected to the first layer 12 of the thin-film coil. The connection part 14a is connected to the conductor layer 12b. Then, a photoresist layer 15 is formed to cover the second layer 14 of the thin-film coil.

Then, a yoke portion layer 10c of a magnetic material such as Permalloy (NiFe) is formed on the pole portion layer 10a, the photoresist layer 15 and the magnetic layer 10b. The pole portion layer 10a, the magnetic layer lob and the yoke portion layer 10c make up a top pole layer 10. An overcoat layer 17 made of alumina, for example, is then formed on the yoke portion layer 10c. The surface of the overcoat layer 17 is flattened, and electrode pads 18 (see FIG. 1) are formed thereon.

The second wafer 60 is to be the substrate portion 24 in FIG. 1. The greater part of the insulating portion 25 shown in FIG. 1 is the overcoat layer 17.

The thin-film magnetic head element 23 comprises the reproducing head and the recording head (induction-type electromagnetic transducer). The reproducing head includes the MR element 5 for magnetic signal detection, and the bottom shield layer 3 and the top shield layer (bottom pole layer 8) for shielding the MR element 5. Portions of the bottom shield layer 3 and the top shield layer on a side of the second medium facing surface 32 are opposed to each other, with the MR element 5 interposed between these portions of the bottom shield layer 3 and the top shield layer.

The recording head includes the bottom pole layer 8 and the top pole layer 10 magnetically coupled to each other and including magnetic pole portions that are opposed to each other and located in regions on a side of the second medium facing surface 32. The recording head further includes: the recording gap layer 9 provided between the magnetic pole portion of the bottom pole layer 8 and the magnetic pole portion of the top pole-layer 10; and the thin-film coil including the layers 12 and 14, at least part of the thin-film coil being disposed between the bottom pole layer 8 and the top pole layer 10 and insulated from the bottom and top pole layers 8 and 10.

According to the embodiment, the reproducing head including the MR element 5 and the recording head (induction-type electromagnetic transducer) are formed in this order on one of surfaces of the second wafer 60.

Figure 14:
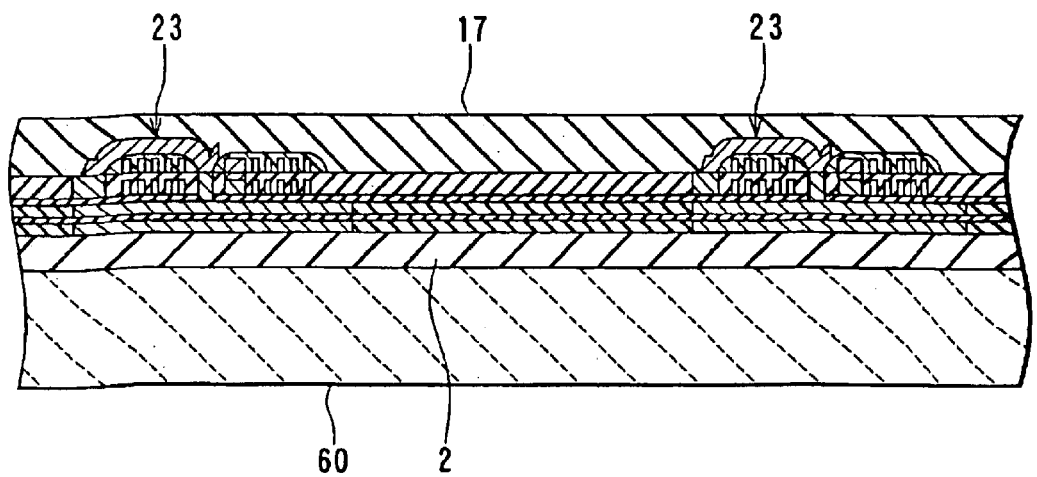
FIG. 14 is a sectional view for illustrating the step of producing an element section of the first embodiment.
Figure 15:
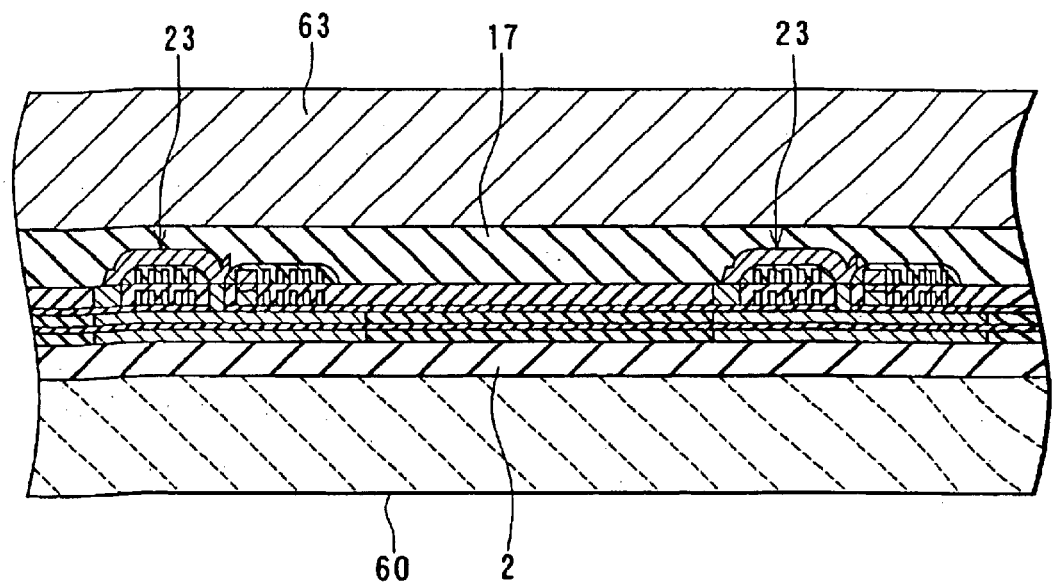
FIG. 15 is a sectional view for illustrating a step that follows FIG. 14.
Figure 16:
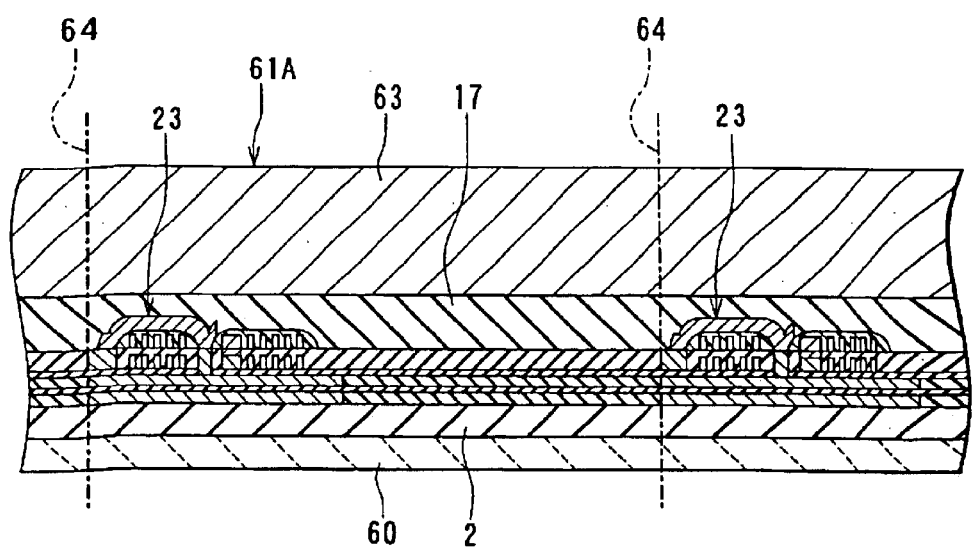
FIG. 16 is a sectional view for illustrating a step that follows FIG. 15.
Figure 17:
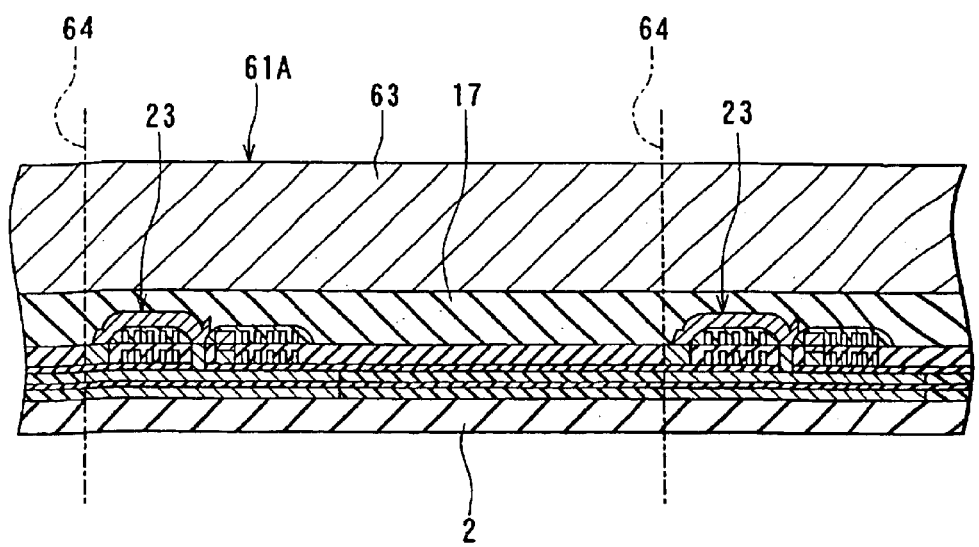
FIG. 17 is a sectional view for illustrating a step that follows FIG. 16.

FIG. 14 is a sectional view showing a part of the second wafer 60 where a plurality of the thin-film magnetic head elements 23 are formed. The step of producing the element section 22 according to the embodiment includes the step of removing at least part of the second wafer 60 after forming the plurality of the thin-film magnetic head elements 23 on the one of the surfaces of the second wafer 60 (the surface on the upper side of FIG. 14) as described above. Reference is now made to FIGS. 15 to 17 to describe the step of removing at least part of the second wafer 60.

In this step, as shown in FIG. 15, a support plate 63 is placed on the plurality of the thin-film magnetic head elements 23, and bonded to the overcoat layer 17. It is preferable that at least a part of the support plate 63, the part including the surface that faces the thin-film magnetic head elements 23, has-conductivity. In this case, it is possible to prevent damage to the MR elements 5 in the thin-film magnetic head elements 23 due to electrostatic discharge which could be caused by the electrode pads 18 contacting the support plate 63.

Then, as shown in FIGS. 16 and 17, at least part of the wafer 60 is removed by lapping the other surface of the second wafer 60 (the surface on the lower side of FIG. 16) with a grinder, for example, thereby forming the first element section aggregate 61A. FIG. 16 shows the first element section aggregate 61A after part of the wafer 60 is removed, while FIG. 17 shows the first element section aggregate 61A after the entire wafer 60 is removed. For the first element section aggregate 61A formed by removing part of the wafer 60, the remaining part of the wafer 60 in the first element section aggregate 61A constitutes the substrate portions 24.

In FIGS. 16 and 17, the alternate long and short dashed lines with reference numeral 64 indicate the border between adjacent ones of the element sections 22. The border 64 corresponds to the cutting position 62 shown in FIG. 11. The first element section aggregate 61A is cut along the cutting positions 62 together with the support plate 63. Thus, the second element section aggregates each including a plurality of the element sections 22 arranged in a row are formed, and the second medium facing surfaces 32 are formed in the positions of the border 64.

Figure 18:
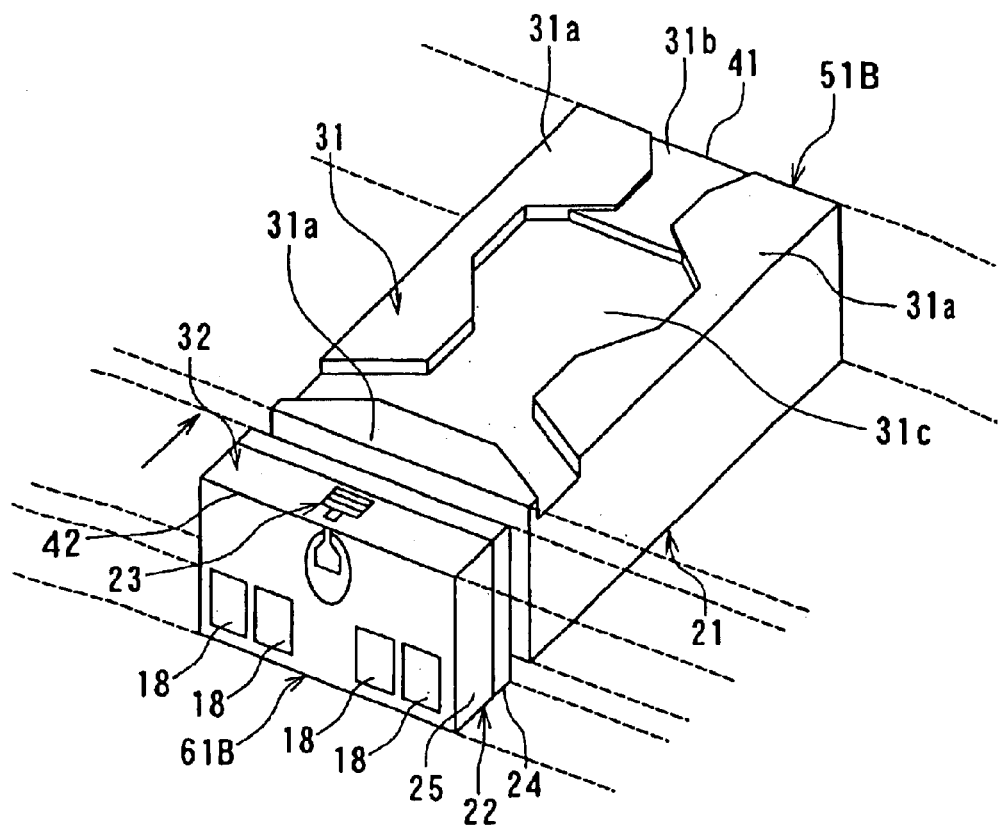
FIG. 18 is a perspective view for illustrating the step of bonding a slider section and the element section to each other in the first embodiment.

The step of bonding the slider section 21 and the element section 22 to each other will now be described. As shown in FIG. 18, in the step of bonding the slider section 21 and the element section 22 to each other, one second slider section aggregate 51B including a plurality of the slider sections 21 arranged in a row and one second element section aggregate 61B including a plurality of the element sections 22 arranged in a row are bonded to each other, thereby producing a slider aggregate including a plurality of the sliders 20 arranged in a row. FIG. 18 shows a part of the second slider section aggregate 51B corresponding to a single slider section 21, and a part of the second element section aggregate 61B corresponding to a single element section 22. The element section 22 shown in FIG. 18 has the substrate portion 24 constituted by part of the second wafer 60 remaining after the lapping. However, the substrate portion 24 is not necessarily required.

The surface of the slider section 21 to be bonded to the element section 22 is, of the two surfaces formed by cutting the first slider section aggregate 51A in the position indicated by reference numeral 52 in FIG. 2, the one on the opposite side to the air inflow end 41. Meanwhile, the surface of the element section 22 to be bonded to the slider section 21 is the surface formed by lapping in the step shown in FIG. 16 or 17.

The element section 22 is bonded to the slider section 21 so that the reproducing head including the MR element 5 is disposed closer to the slider section 21 than the recording head (induction-type electromagnetic transducer).

To bond the slider section 21 and the element section 22 to each other, a ceramic-based thermosetting adhesive is first applied to at least one of the slider section 21 and the element section 22. Then, the sections are butted against each other and the adhesive is cured by heating. Here, in order to prevent damage to some of the films making up the MR element 5 which are vulnerable to heat, the adhesive is preferably heated at a temperature at 300° C. or lower for curing to bond the slider section 21 and the element section 22 to each other. Heating the adhesive at a temperature of 200° C. to 300° C. for curing will allow the films vulnerable to heat to be prevented from being damaged and also allow the slider section 21 and the element section 22 to strongly adhere to each other.

Figure 19:
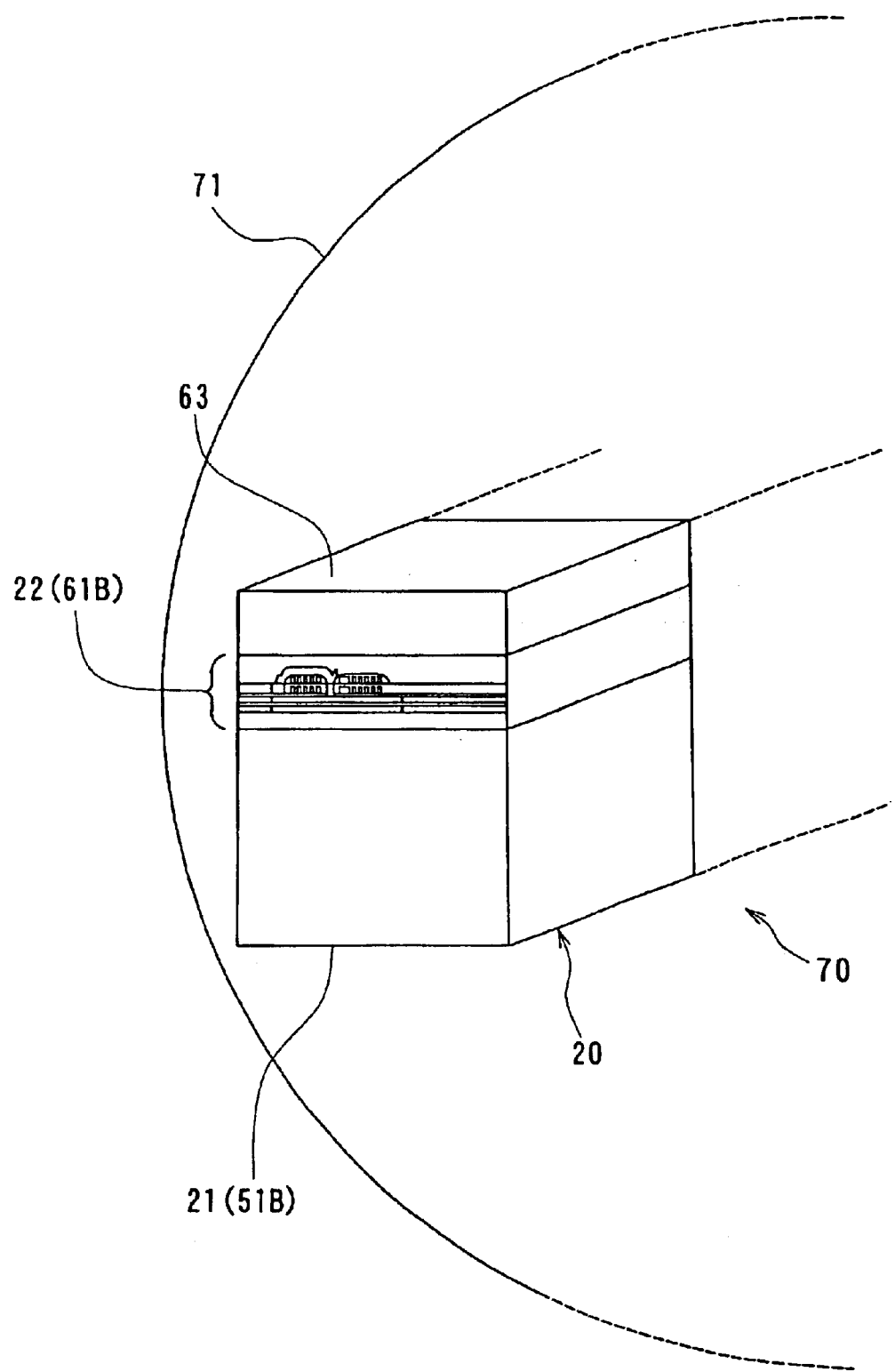
FIG. 19 is a perspective view for illustrating the step of lapping the first medium facing surface and a second medium facing surface in the first embodiment.
Figure 20:
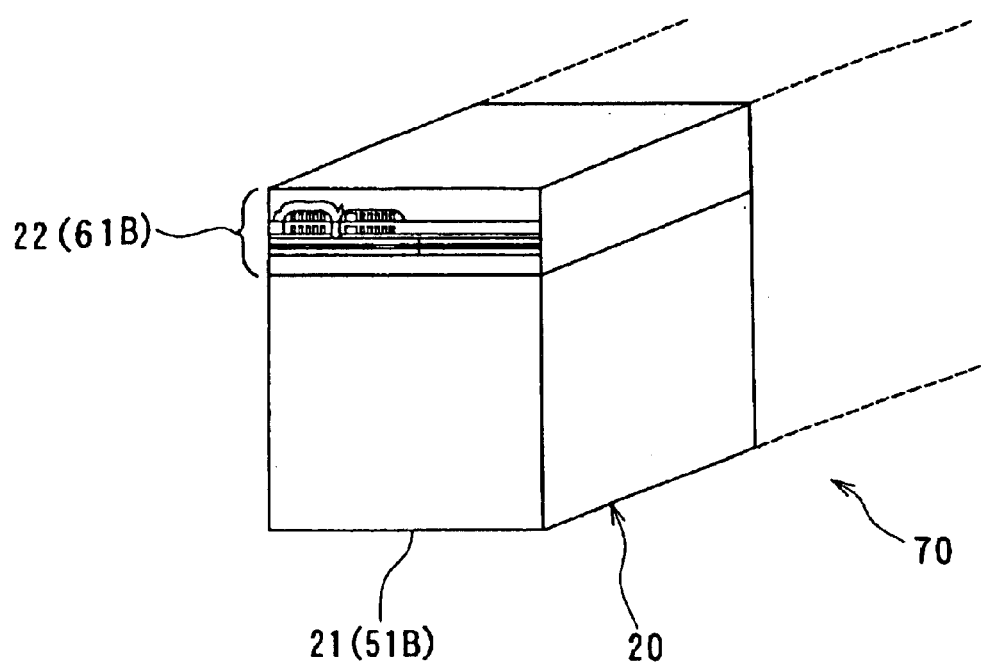
FIG. 20 is a perspective view of a slider aggregate of the first embodiment after it has been lapped.

The method of manufacturing the slider according to the embodiment includes, after bonding the slider section 21 and the element section 22 to each other as described above, the step of lapping the first and second medium facing surfaces 31 and 32 to flatten these surfaces 31 and 32. As shown in FIG. 19, the lapping is performed on a, slider aggregate 70 including a plurality of the sliders 20 arranged in a row. FIG. 19 shows the slider aggregate 70 brought into contact with a surface plate 71. FIG. 20 shows the slider aggregate 70 after the lapping.

As shown in FIG. 19, the slider aggregate 70 may be lapped while the support plate 63 remains attached to the slider aggregate 70. Alternatively, the support plate 63 may be detached from the slider aggregate 70 before lapping the slider aggregate 70. When the slider aggregate 70 is lapped while the support plate 63 remains attached to the slider 70, the support plate 63 may be detached from the slider aggregate 70 after the lapping, or after a protection layer to be described later is formed for the slider aggregate 70.

The lapping of the slider aggregate 70 is performed while detecting the resistance values of the MR elements 5 in the plurality of the element sections 22 included in the slider aggregate 70 so as to make every element section 22 equal in MR height and in throat height.

Figure 21:
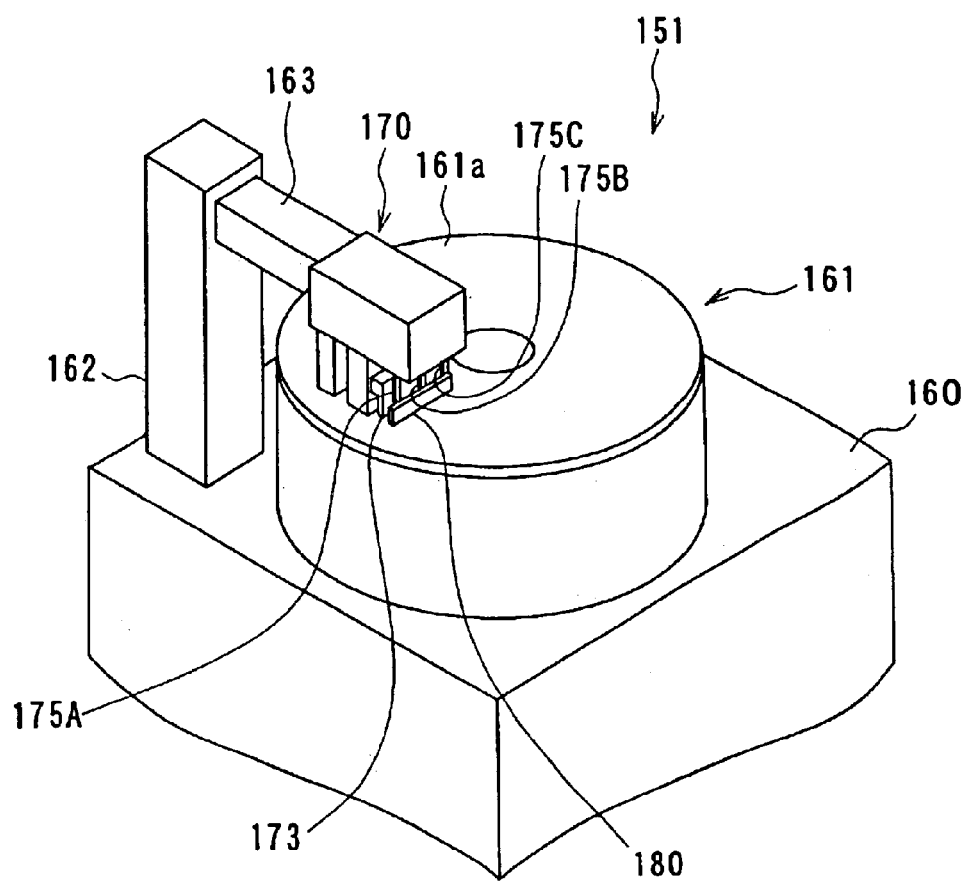
FIG. 21 is a perspective view showing a schematic configuration of a lapping apparatus for lapping the slider aggregate of the first embodiment.
Figure 22:
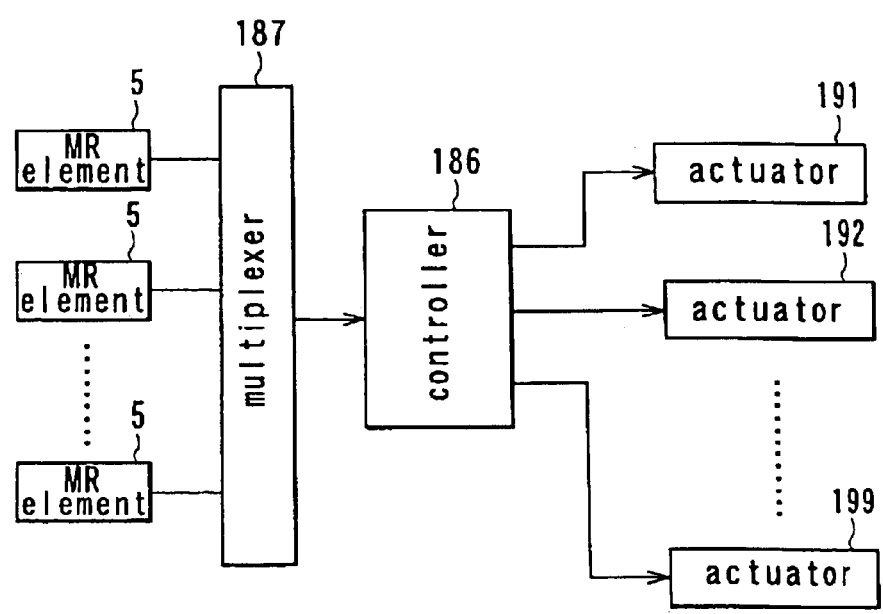
FIG. 22 is a block diagram showing an example of a circuit configuration of the lapping apparatus shown in FIG. 21.

Referring now to FIGS. 21 and 22, description will be given of an example of the method of lapping the slider aggregate 70 while detecting the resistance values of the MR elements 5 in the plurality of the element sections 22 included in the slider aggregate 70 so as to make every element section 22 equal in MR height and in throat height.

FIG. 21 is a perspective view illustrating a schematic configuration of a lapping apparatus for lapping the slider aggregate 70. This lapping apparatus 151 comprises: a table 160; a rotating lapping table 161 provided on the table 160; a strut 162 provided on the table 160 by the side of the rotating lapping table 161; and a material supporter 170 attached to the strut 162 through an arm 163. The rotating lapping table 161 has a lapping plate (surface plate) 161a to come to contact with the first and second medium facing surfaces 31 and 32 of the slider aggregate 70.

The material supporter 170 comprises a jig retainer 173 and three load application rods 175A, 175B and 175C placed in front of the jig retainer 173 with specific spacing. A jig 180 is to be fixed to the jig retainer 173. The jig 180 has three load application sections each of which is in the shape of a hole having an oblong cross section. Load application pins are provided at the lower ends of the load application rods 175A, 175B and 175C, respectively. Each of the load application pins has a head to be inserted to each of the load application sections (holes) of the jig 180, the head having an oblong cross section. Each of the load application pins is driven by an actuator (not shown) in the vertical, horizontal (along the length of the jig 180) and rotational directions.

The jig 180 has a retainer for retaining the slider aggregate 70. With this jig 180, the retainer and the slider aggregate 70 are deformed by applying loads in various directions to the three load application sections. The first and second medium facing surfaces 31 and 32 of the slider aggregate 70 are thereby lapped while the throat heights and MR heights of a plurality of the element sections 22 in the slider aggregate 70 are controlled so that the target values are obtained.

FIG. 22 is a block diagram showing an example of the circuit configuration of the lapping apparatus shown in FIG. 21. This lapping apparatus comprises: nine actuators 191 to 199 for applying loads in the three directions to the load application sections of the jig 180; a controller 186 for controlling the nine actuators 191 to 199 through monitoring the resistance values of a plurality of MR elements 5 in the slider aggregate 70; and a multiplexer 187, connected to the MR elements 5 in the slider aggregate 70 through a connector (not shown), for selectively connecting one of the MR elements 5 to the controller 186.

In this lapping apparatus, the controller 186 monitors the resistance values of the MR elements 5 in the slider aggregate 70 through the multiplexer 187, and controls the actuators 191 to 199 so that throat height and MR height of every element section 22 in the slider aggregate 70 fall within a certain limited tolerance.

Figure 23:
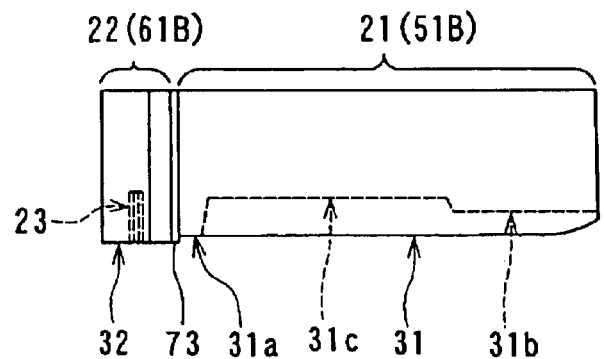
FIG. 23 is a side view for illustrating the step of bonding the slider section and the element section to each other in the first embodiment.
Figure 24:
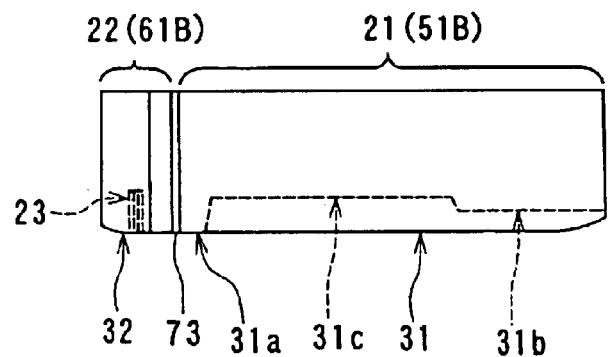
FIG. 24 is a side view for illustrating a step that follows FIG. 23.
Figure 25:
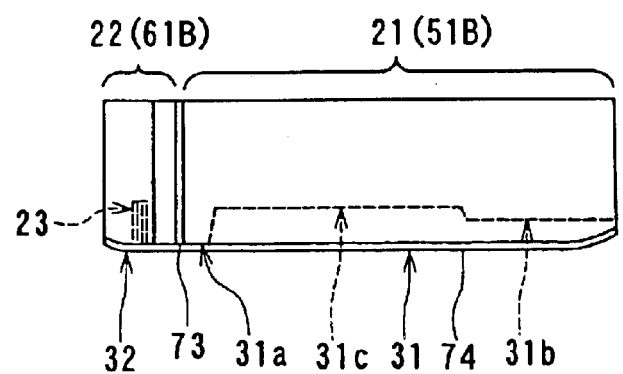
FIG. 25 is a side view for illustrating a step that follows FIG. 24.

Reference is now made to FIGS. 23 to 25 to detail the step of bonding the slider section 21 and the element section 22 to each other and subsequent steps. FIGS. 23 to 25 are side views of the slider aggregate 70.

As shown in FIG. 23, in the step of bonding the slider section 21 and the element section 22 to each other, the second slider section aggregate 51B including a plurality of the slider sections 21 arranged in a row and the second element section aggregate 61B including a plurality of the element sections 22 arranged in a row are bonded to each other using an adhesive 73, thereby producing the slider aggregate 70 including a plurality of the sliders 20 arranged in a row. By going through this step, as shown in FIG. 23, a difference in level may develop between the first medium facing surface 31 in the slider section 21 and the second medium facing surface 32 in the element section 22.

Following the above-mentioned step, as described before, the first and second medium facing surfaces 31 and 32 are lapped while the throat heights and MR heights of the plurality of the element sections 22 in the slider aggregate 70 are controlled to obtain target values. The first and second medium facing surfaces 31 and 32 are thereby flattened as shown in FIG. 24. Thus, according to the embodiment, it is possible to flatten the first and second medium facing surfaces 31 and 32 even if precision in the alignment of the slider section. 21 and the element section 22 is low at the time of bonding these sections.

Then, as shown in FIG. 25, a protection layer 74 is formed to cover the first and second medium facing surfaces 31 and 32 of the slider aggregate 70. The protection layer 74 is made of alumina or diamond-like carbon, for example. The protection layer 74 has a thickness of about 3 to 5 nm, for example.

Figure 26:
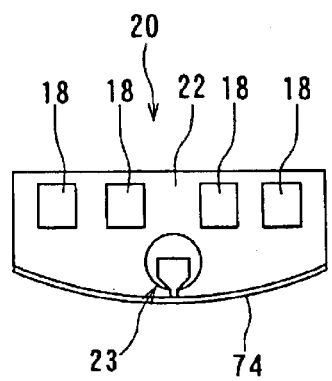
FIG. 26 is a front view of the slider according to the first embodiment.

Finally, the slider aggregate 70 is cut into a plurality of the sliders. 20 separated from one another. FIG. 26 is a front view of the slider 20 as viewed from the side of the element section 22.

Figure 27:
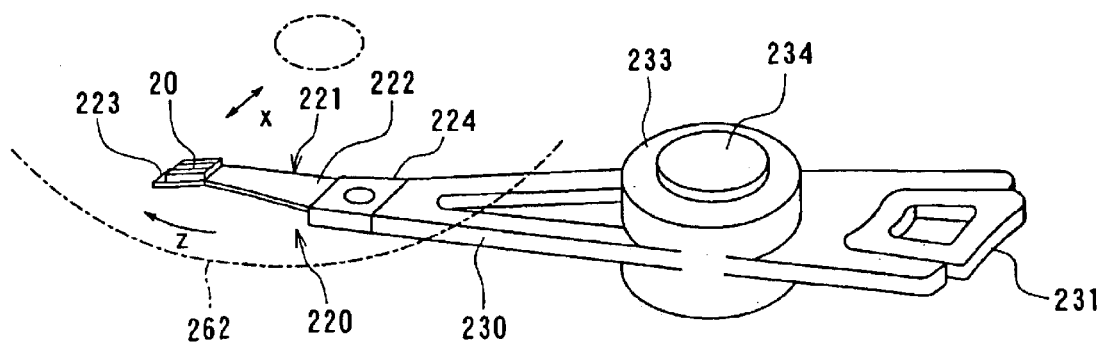
FIG. 27 is a perspective view of a head gimbal assembly incorporating the slider according to the first embodiment.
Figure 28:
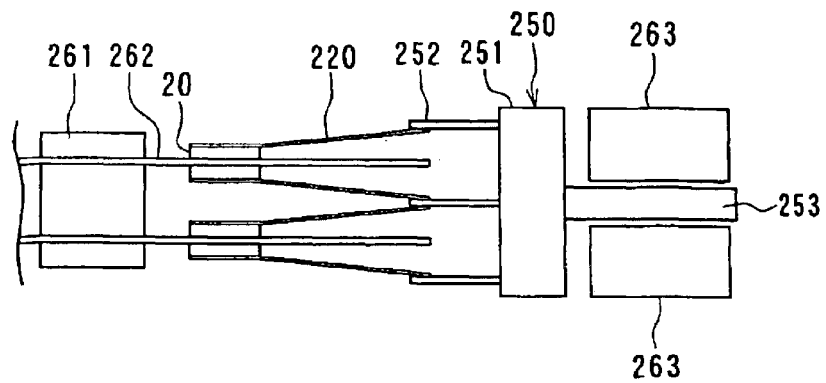
FIG. 28 is an explanatory view showing the main part of a hard disk drive in which the slider according to the first embodiment is used.
Figure 29:
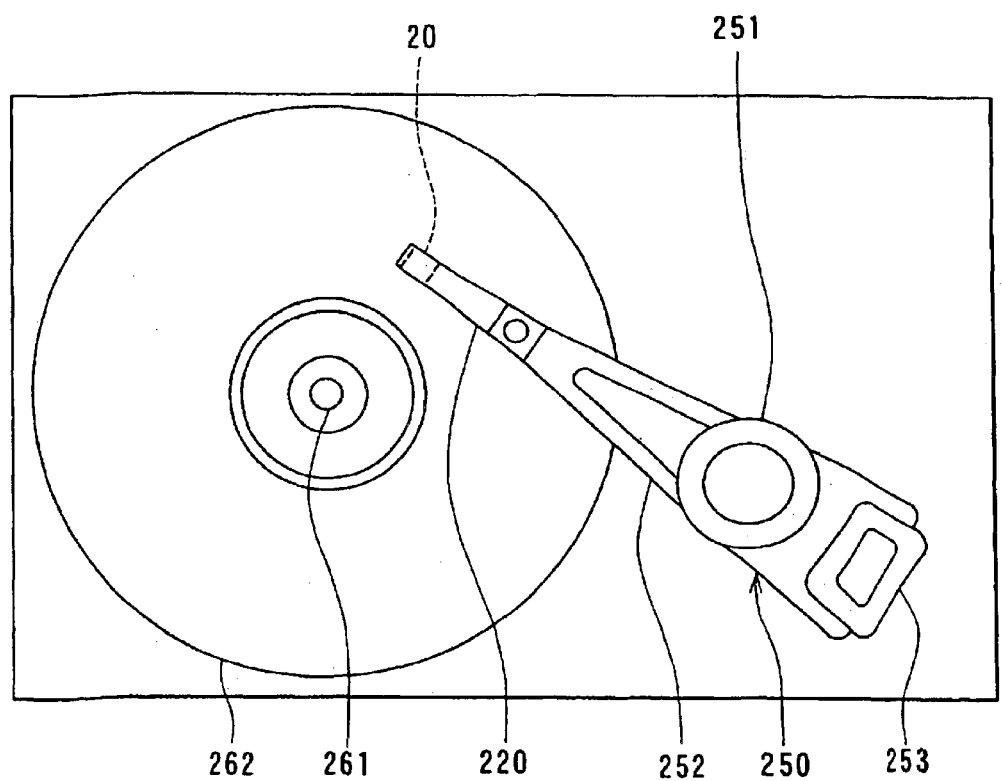
FIG. 29 is a top view of the hard disk drive in which the slider according to the first embodiment is used.

Reference is now made to FIGS. 27 to 29 to describe a head gimbal assembly and a hard disk drive incorporating the slider 20 of the present embodiment. Now, reference is made to FIG. 27 to describe the head gimbal assembly 220.

In a hard disk drive, the slider 20 is disposed to face toward a hard disk platter 26.2 that is a circular-plate-shaped recording medium to be rotated and driven. The head gimbal assembly 220 comprises the slider 20 and a suspension 221 that flexibly supports the slider 20. The suspension 221 incorporates: a plate-spring-shaped load beam 222 made of stainless steel, for example; a flexure 223 to which the slider 20 is joined, the flexure being provided at an end of the load beam 222 and giving an appropriate degree of freedom to the slider 20; and a base plate 224 provided at the other-end of the load beam 222. The base plate 224 is attached to an arm 230 of an actuator that moves the slider 20 along the x direction across the track of the hard disk platter 262. The actuator incorporates the arm 230 and a voice coil motor that drives the arm 230. A gimbal section that maintains the orientation of the slider 20 is provided in the portion of the flexure 223 on which the slider 20 is mounted.

The head gimbal assembly 220 is attached to the arm 230 of the actuator. An assembled body comprising the arm 230 and the head gimbal assembly 220 attached to the arm 230 is called a head arm assembly. An assembled body comprising a plurality of head gimbal assemblies 220 and a carriage with a plurality of arms is called a head stack assembly, in which the head gimbal assemblies 220 are each attached to the arms.

FIG. 27 illustrates an example of the head arm assembly. In the head arm assembly, the head gimbal assembly 220 is attached to an end of the arm 230. A coil 231 that is part of the voice coil motor is fixed to the other end of the arm 230. A bearing 233 is provided in the middle of the arm 230. The bearing 233 is attached to an axis 234 that rotatably supports the arm 230.

Reference is now made to FIGS. 28 and 29 to describe an example of the head stack assembly and the hard disk drive. FIG. 28 is an explanatory view illustrating the main part of the hard disk drive. FIG. 29 is a top view of the hard disk drive. The head stack assembly 250 incorporates a carriage 251 having a plurality of arms 252. A plurality of head gimbal assemblies 220 are each attached to the arms 252 such that the assemblies 220 are arranged in the vertical direction with spacing between adjacent ones. A coil 253 that is part of the voice coil motor is mounted on the carriage 251 on a side opposite to the arms 252. The head stack assembly 250 is installed in the hard disk drive. The hard disk drive includes a plurality of hard disk platters 262 mounted on a spindle motor 261. Two of the sliders 20 are allocated to each of the platters 262, such that the two sliders 20 face each other with each of the platters 262 in between. The voice coil motor includes permanent magnets 263 located to face each other, the coil 253 of the head stack assembly 250 being placed between the magnets 263.

The head stack assembly 250 except the slider 20 and the actuator support the slider 20 and align it with respect to the hard disk platter 262.

In this hard disk drive, the actuator moves the slider 20 across the track of the platter 262 and aligns the slider 20 with respect to the platter 262. The thin-film magnetic head incorporated in the slider 20 writes data on the platter 262 through the use of the recording head and reads data stored on the platter 262 through the use of the reproducing head.

For the slider 20 according to the embodiment, while the recording medium (hard disk platter 262) is rotating, a pressure for-moving the slider 20 away from the recording medium is generated between the recording medium and the surfaces 31a of the first medium facing surface 31 of the slider 20. On the other hand, while the recording medium is rotating, the air passing through between the surface 31b and the recording medium increases in volume when it reaches the space between the surface 31c and the recording medium. Accordingly, a negative pressure to draw the slider 20 toward the recording medium is generated between the surface 31c and the recording medium. As a result, while the recording medium is rotating, the slider 20 flies over the recording medium, being inclined such that the air outflow end 42 is closer to the recording medium than the air inflow end 41 is.

As described in the foregoing, according to the embodiment, the slider section 21 and the element section 22 are produced separately, and then bonded to each other to complete the slider 20. Therefore, according to the embodiment, it is possible to mass-produce the slider section 21 and element section 22 separately at a time. In particular, it is possible to prepare at a time a large number of the first medium facing surfaces 31 corresponding to a large number of the slider sections 21 for the first wafer 50. According to the conventional method of manufacturing a slider, a wafer having a plurality of thin-film magnetic head elements formed thereon is cut into a plurality of bars. Each bar is then lapped to form a lapped surface, and the lapped surface of each bar is etched to form medium facing surfaces. According to the slider 20 of the embodiment and the manufacturing method thereof, it is possible to significantly reduce the number of steps for manufacturing the slider, as compared with the case of the conventional slider and the manufacturing method thereof. The manufacturing cost of the slider 20 is thereby significantly reduced.

Meanwhile, according to the conventional method of manufacturing a slider, a camber is formed by lapping the bar using a concave surface plate. In contrast, according to the embodiment, the camber is formed by lapping the first wafer 50 using a concave surface plate. Therefore, according to the embodiment, a larger number of cambers can be formed for the sliders at a time as compared with the case of the conventional method. This also serves to reduce the manufacturing cost of the slider 20.

According to the conventional method, the bar including the thin-film magnetic head elements is lapped using a concave surface plate to form a camber. The lapping for forming the camber may result in occurrence of a smear, which can degrade the characteristics of the reproducing head. In contrast, according to the embodiment, the camber is formed by lapping the first wafer 50 that does not include the thin-film magnetic head elements 23. As a result, the lapping for forming the camber will not cause degradation in the characteristics of the reproducing head.

According to the embodiment, the step of chamfering the peripheral portion of the first medium facing surface 31 is performed also on the first wafer 50. This also serves to reduce the manufacturing cost of the slider 20.

Second Embodiment

Figure 30:
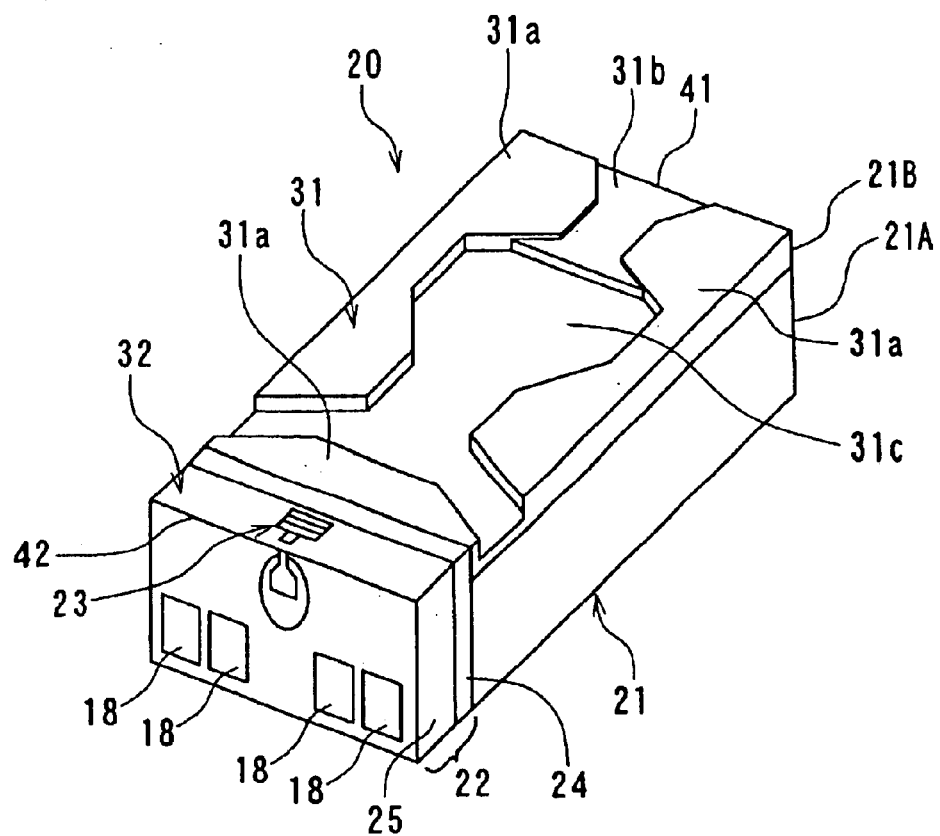
FIG. 30 is a perspective view of a slider according to a second embodiment of the invention.

Description will now be given of a slider according to a second embodiment and a manufacturing method thereof. FIG. 30 is a perspective view of the slider 20 according to the embodiment. In the slider 20, the slider section 21 includes a substrate portion 21A and a medium facing layer 21B placed on the substrate portion 21A. The first medium facing surface 31 is formed on the medium facing layer 21B. As in the first embodiment, the element section 22 has the insulating portion 25 surrounding the thin-film magnetic head element 23.

The hardness of the substrate portion 21A is greater than that of the insulating portion 25. As the substrate 21A and the medium facing layer 21B are compared in hardness, the hardness of the medium facing layer 21B is closer to that of the insulating portion 25. The main material of the insulating portion 25 and the material of the medium facing layer 21B are preferably the same. The substrate portion 21A is made of aluminum oxide and titanium carbide, for example. The insulating portion 25 is made mainly of alumina, for example. The medium facing layer 21B is made of alumina or diamond-like carbon, for example. The slider 20 according to the embodiment is otherwise configured the same as in the first embodiment.

A method of manufacturing the slider 20 according to the embodiment will now be described. The method includes the steps of producing the slider section 21, producing the element section 22 separately from the slider section 21, and bonding the slider section 21 and the element section 22 to each other. In this embodiment, the step of producing the element section 22 is the same as that in the first embodiment.

The step of producing the slider section 21 will now be described. The step is essentially the same as that in the first embodiment. As will be described, however, in the embodiment the first wafer 50 has a substrate portion and a medium facing layer placed on the substrate portion. A plurality of the first medium facing surfaces 31 corresponding to a plurality of the slider sections 21 are formed in the medium facing layer of the first wafer 50.

Reference is now made to FIGS. 31 to 36 to detail the step of forming a plurality of the first medium facing surfaces 31 for the first wafer 50. FIGS. 31 to 36 are sectional views each showing a part of the first wafer 50. According to the embodiment, the first wafer 50 has a substrate portion 50A, and a medium facing layer 50B placed on the substrate portion 50A. The substrate portion. 50A is later cut into the substrate portions 21A of the slider sections 21. Similarly, the medium facing layer 50B is later-cut into the medium facing layers 21B of the slider sections 21. The medium facing layer 50B has a thickness of 3 $\mu$m to 5 $\mu$m, for example.

In this step, first, a seed layer for plating is formed on the medium facing layer 50B of the first wafer 50 by sputtering. The seed layer has a thickness of 50 nm, for example. Then, a frame for forming an etching mask by frame plating is formed on the seed layer by photolithography. The etching mask is formed using the frame by frame plating. The material of the etching mask is a metal such as NiFe and Cu. Here, the material of the etching mask is NiFe (Ni: 80 wt %, Fe: 20 wt %) by way of example. The etching mask may have a thickness of about 0.5 $\mu$m to 1.0 $\mu$m. The frame is then removed and, a part of the seed layer, the part that was under the frame is removed by ion milling, for example.

Figure 31:
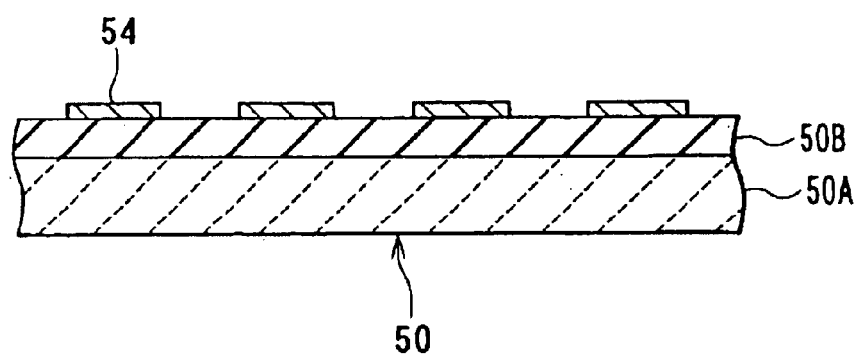
FIG. 31 is a sectional view for illustrating the step of forming a first medium facing surface in the second embodiment.

FIG. 31 shows the metal etching mask 54 thus formed on the medium facing layer 50B. The etching mask 54 is placed in positions where the surfaces 31a of the first medium facing surfaces 31 are to be formed.

Figure 32:
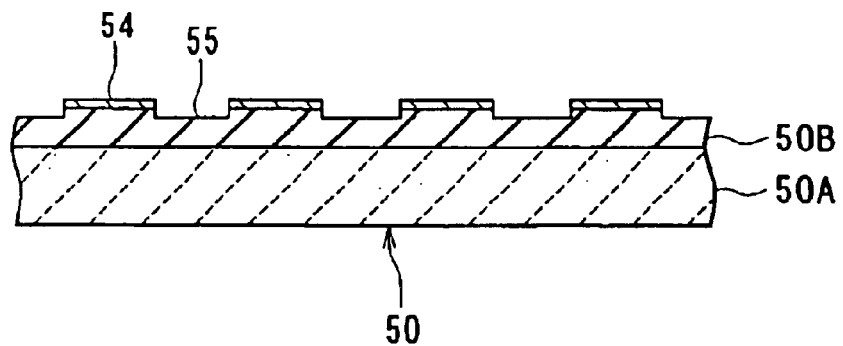
FIG. 32 is a sectional view for illustrating a step that follows FIG. 31.

Then, as shown in FIG. 32, the medium facing layer 50B is etched by dry etching through the use of the etching mask 54, thereby forming the first recesses 55 on the top surface of the medium facing layer 50B. The first recesses 55 are about 1 $\mu$m in depth. A part of the bottom surface of each first recess 55 makes the surface 31b of the first medium facing surface 31. The dry etching used here is ion milling or reactive ion etching. If reactive ion etching is employed, a halogen-based gas such as $Cl_2$, $BCl_3$, $CF_4$ and $SF_6$ may be used as the reactive gas. Using as the reactive gas a mixture of $Cl_2$ and $BCl_3$ in the ratio of 10:4 or a ratio ±10% shifted from the above ratio will allow a large etching selectivity ratio between the etching mask 54 of metal and the medium facing layer 50B of alumina. The reactive etching gas may also be a mixture gas of $O_2$, $N_2$, Ar, He, and $H_2$. The reactive gas may also be a gas containing the above halogen-based gas and the above mixture gas.

Figure 33:
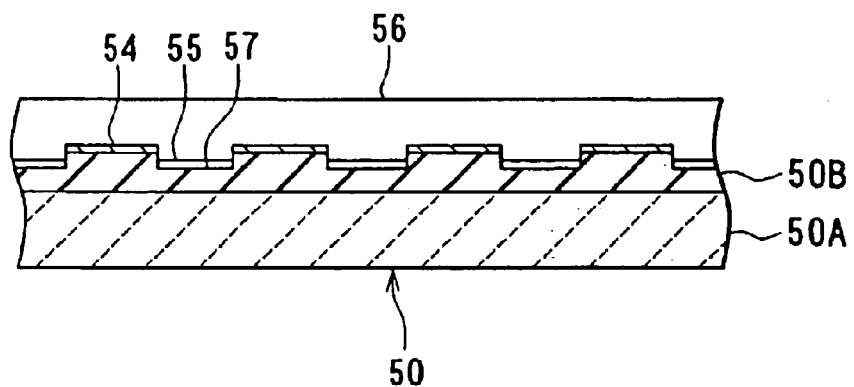
FIG. 33 is a sectional view for illustrating a step that follows FIG. 32.

Then, as shown in FIG. 33, with the etching mask 54 left unremoved, the etching mask 56 of a photoresist, for example, is formed on the medium facing layer 50B to cover a part of each of the first recesses 55. As shown in FIG. 9, the etching mask 56 is provided in positions where the surfaces 31b of the first medium facing surfaces 31 are to be formed. Then, using the etching masks 54 and 56, the first wafer 50 is further dry-etched to form the second recesses 57 deeper than the first recesses 55 on the top surface of the medium facing layer 50B. The depth of the second recesses 57 from the surfaces 31a is about 3 $\mu$m, for example. A part of the bottom surface of each second recess 57 makes the surface 31c of the first medium facing surface 31. The remaining part of each second recess 57 is disposed-between adjacent ones of the first medium facing surfaces 31. The method of etching the wafer 50 to form the second recesses 57 is the same as the method of etching the wafer 50 to form the first recesses 55.

The etching mask 56 is then removed by a solvent, and the etching mask 54 is removed by ion milling, for example in this way, the first medium facing surfaces 31 including the surfaces 31a to 31c are formed.

The first medium facing surfaces 31 are lapped on a concave surface plate to form a camber for each first medium facing surface 31.

Figure 34:
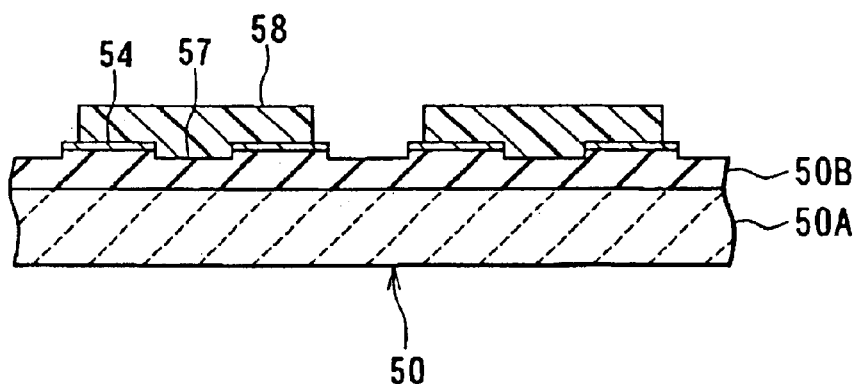
FIG. 34 is a sectional view for illustrating a step that follows FIG. 33.

Then, as shown in FIG. 34, the etching mask 58 of a photoresist, for example, is formed on the medium facing layer 50B. The etching mask 58 is formed on a portion of each first medium facing surface 31 other than its peripheral portion, and used for chamfering the peripheral portion of each first medium facing surface 31.

Figure 35:
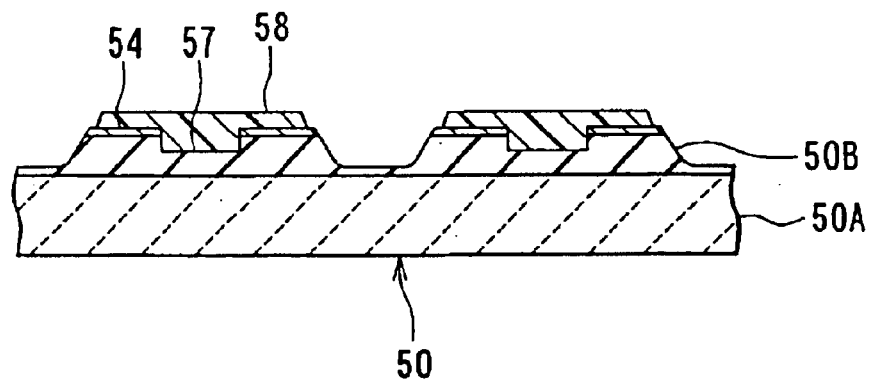
FIG. 35 is a sectional view for illustrating a step that follows FIG. 34.

Then, as shown in FIG. 35, the medium facing layer 50B is etched by, for example, reactive ion etching through the use of the etching mask 58. The etching depth is about 5 $\mu$m, for example. The portion of the top surface of the medium facing layer 50B located between the adjacent ones of the first medium facing surfaces 31 has a depth of, for example, 3 $\mu$m from the surfaces 31a before the etching using the etching mask 58, and therefore the depth after the etching is about 8 $\mu$m, for example, from the surfaces 31a.

When the first wafer 50 is etched by reactive ion etching using the etching mask 58, the etching mask 58 is side-etched as well. As a result, as shown in FIG. 35, the peripheral portions of the first medium facing surfaces 31 are etched more deeply on the outer sides. The peripheral portions are thereby shaped into a curved surface.

Figure 36:
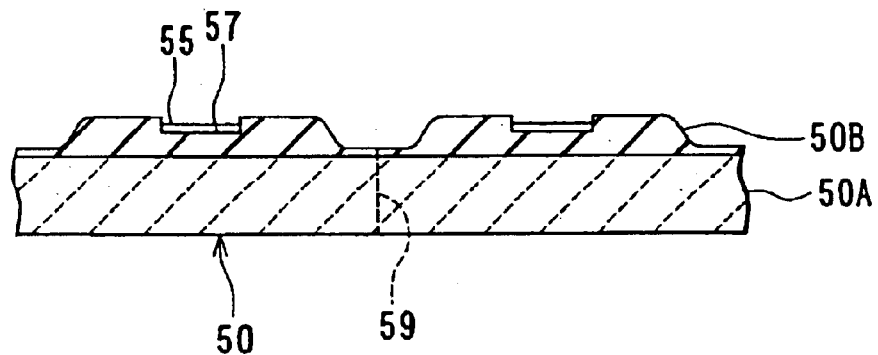
FIG. 36 is a sectional view for illustrating a step that follows FIG. 35.

Then, as shown in FIG. 36, the etching mask 58 is removed with a solvent. Chamfering the peripheral portions of the first medium facing surfaces 31 as described above allows to prevent damage to the recording medium in a hard disk drive due to a collision of the slider section 21 against the recording medium because of mechanical vibration or the like. In FIG. 36, the broken line indicated by reference numeral 59 represents the border between adjacent ones of the slider sections 21.

The first slider section aggregate 51A shown in FIG. 2 is formed in this way. The first slider section aggregate 51A is cut in the positions denoted by reference numeral 52. Thus, the second slider section aggregates each including a plurality of the slider sections 21 arranged in a row are formed.

Figure 37:
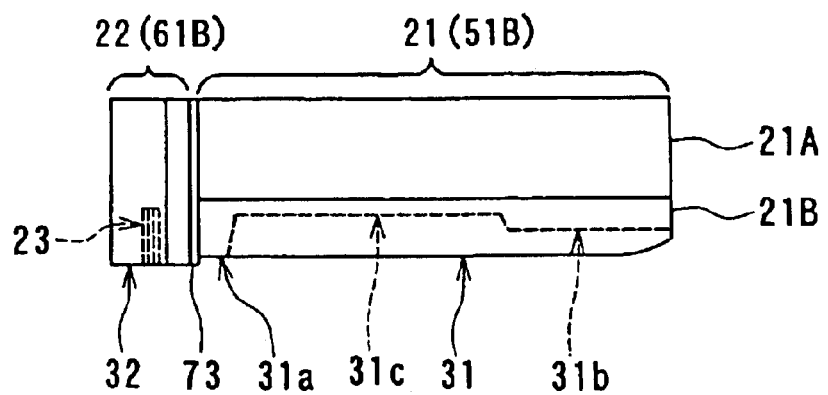
FIG. 37 is a side view for illustrating the step of bonding a slider section and an element section to each other in the second embodiment.
Figure 38:
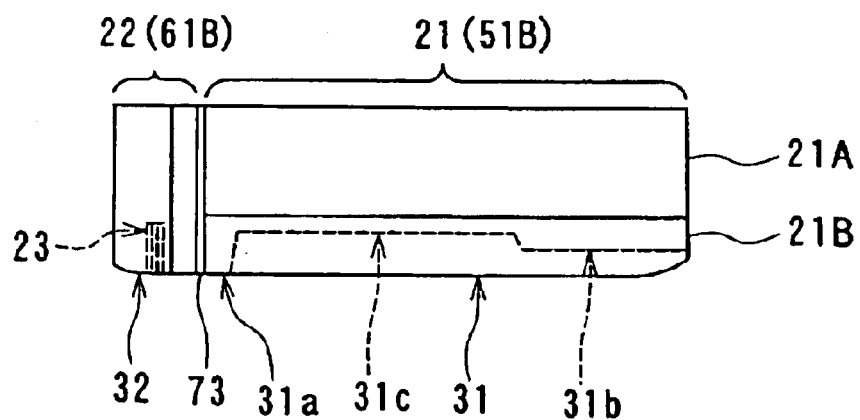
FIG. 38 is a side view for illustrating a step that follows FIG. 37.
Figure 39:
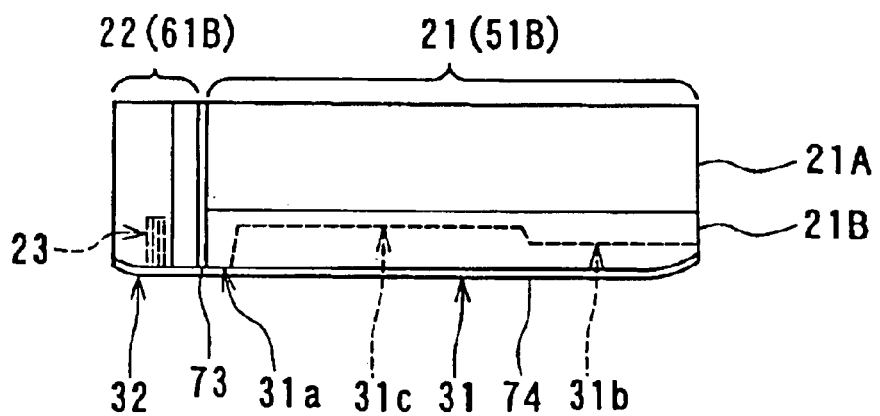
FIG. 39 is a side view for illustrating a step that follows FIG. 38.

Reference is now made to FIGS. 37 to 39 to describe the step of bonding the slider section 21 and the element section 22 to each other and subsequent steps. FIGS. 37 to 39 are side-views of the slider aggregate 70.

As shown in FIG. 37, in the step of bonding the slider section 21 and the element section 22 to each other, the second slider section aggregate 51B including a plurality of the slider sections 21 arranged in a row and the second element section aggregate 61B including a plurality of the element sections 22 arranged in a row are bonded to each other using the adhesive 73 to produce the slider aggregate 70 including a plurality of the sliders 20 arranged in a row. By going through this step, as shown in FIG. 37, a difference in level may develop between the first medium facing surface 31 in the slider section 21 and the second medium facing surface 32 in the element section 22.

Following the above-mentioned step, the first and second medium facing surfaces 31 and 32 are lapped while the throat heights and MR heights of the plurality of the element sections 22 in the slider aggregate 70 are controlled to obtain target values. The first and second medium facing surfaces 31 and 32 are thereby flattened as shown in FIG. 38.

Then, as shown in FIG. 39, the protection layer 74 is formed to cover the first and second medium facing surfaces 31 and 32 of the slider aggregate 70. The protection layer 74 is made of alumina or diamond-like carbon, for example. The protection layer 74 has a thickness of about 3 to 5 nm, for example. Finally, the slider aggregate 70 is cut into a plurality of the sliders 20 separated from one another.

Here, assume that the substrate portion 21A of the slider section 21 is made of aluminum oxide and titanium carbide; the insulating portion 25 of the element section 22 is made mainly of alumina; the medium facing layer 21B is not provided; and the first medium facing surface 31 is formed on the substrate portion 21A. In this case, when lapping the first and second medium facing surfaces 31 and 32, the insulating portion 25 and the substrate portion 21A harder than the insulating portion 25 are lapped at the same time. Accordingly, as a result of the lapping, a difference of about 3 to 5 nm in level may be created between the first and second medium facing surfaces 31 and 32, the second medium facing surface 32 being recessed from the first medium facing surface 31. This would result in an increase in the magnetic space and therefore hinder improvements in the characteristics of the recording head and the reproducing head.

In contrast, according to the embodiment, the medium facing layer 21B is provided on the substrate portion 21A, and the first medium facing surface 31 is formed on the medium facing layer 21B. The hardness of the substrate portion 21A is greater than that of the insulating portion 25. As the substrate 21A and the medium facing layer 21B are compared in hardness, the hardness of the medium facing layer 21B is closer to that of the insulating portion 25. Therefore, according to the embodiment, no difference in level will be caused between the first and second medium facing surfaces 31 and 32 as a result of lapping these surfaces. In particular, when the main material of the insulating portion 25 and the material of the medium facing layer 21B are the same, the above-mentioned difference in level can substantially be eliminated.

From the foregoing, according to the embodiment, the low-flying slider 20 is achieved, that is, a reduction in the magnetic space is achieved. Furthermore, as a result of reduction in the magnetic space the embodiment makes it is possible to improve the reproducing output and reduce the half width of the reproducing head, thereby increasing the recording density. As a result of reduction in the magnetic space, it is also possible to improve the overwrite property and nonlinear transition shift of the recording head.

The remainder of the configuration, functions and effects of the present embodiment are the same as those of the first embodiment.

Third Embodiment

Figure 40:
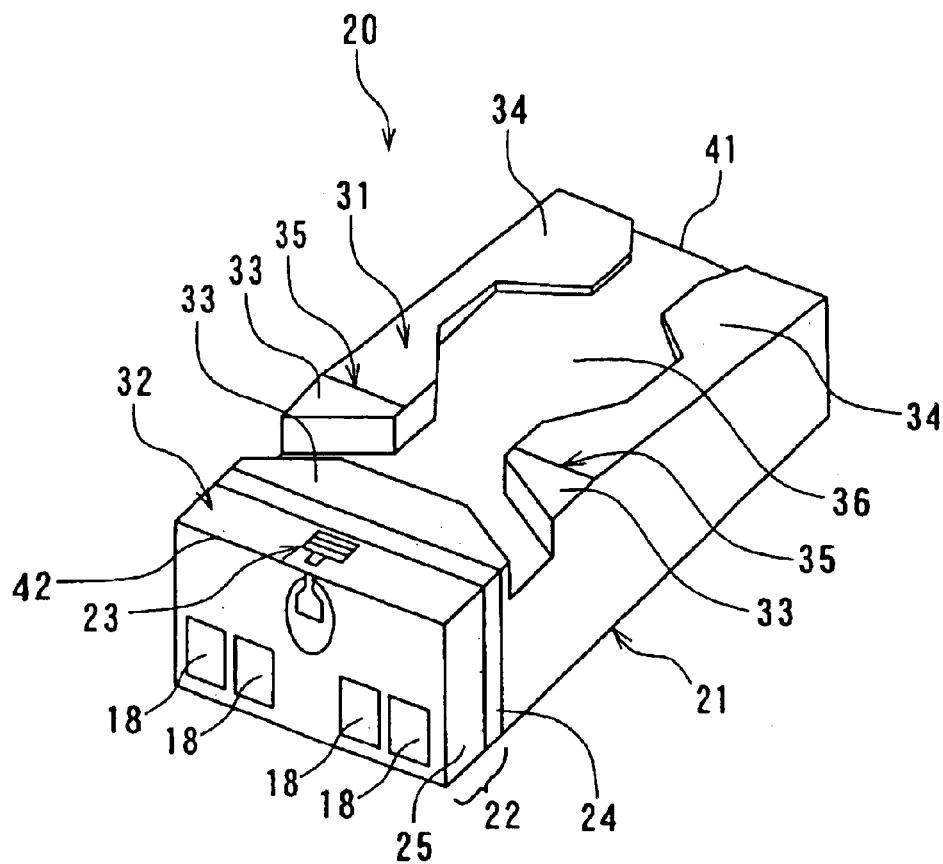
FIG. 40 is a perspective view of a slider according to a third embodiment of the invention.

Description will now be given of a slider according to a third embodiment and-a manufacturing method thereof. FIG. 40 is a perspective view of the slider 20 according to the embodiment. In the slider 20, the first medium facing surface 31 has first surfaces 33 closer to the element section 22, second surfaces 34 closer to the air inflow end 41, and border portions 35 each located between the first and second surfaces 33 and 34. The first surfaces 33 include two portions disposed near the sidewalls of the slider section 21 along the width thereof, and a portion disposed near the end of the slider section 21 closer to the element section 22. The second surfaces 34 include two portions disposed near the sidewalls of the slider section 21 along the width thereof, the two portions extending in the direction of air passage and being connected to the two portions of the first surfaces 33. The first medium facing surface 31 further includes a third surface 36 disposed between the two portions of the second surfaces 34 and extending in the direction of air passage.

Each second surface 34 is slanted against the first surface 33 such that the first and second surfaces 33 and 34 make a convex shape (roof-like shape) bent at the border portion 35. The first and second surfaces 33 and 34 preferably form an angle of 30° or smaller, and more preferably an angle of 10° or smaller. It is also preferable that the angle formed between the first and second surfaces 33 and 34 does not fall below 0.1°.

The first and third surfaces 33 and 36 lie in parallel to the surface of the slider section 21 opposite from the first medium facing surface 31. The second and third surfaces 34 and 36 have such a difference in level that the third surface 36 is located farther from the recording medium than the second surfaces 34 are. This difference in level varies gradually so as to increase with decreasing distance from the element section 22. In other words, each second surface 34 makes a plane that slants against the third surface 36. The second and third surfaces 34 and 36 preferably form an angle of 30° or smaller, and more preferably an angle of 10° or smaller. It is also preferable that the angle formed between the second and third surfaces 34 and 36 does not fall below 0.1°.

In the first medium facing surface 31, the length from each border portion 35 to the end of the medium facing surface 31 closer to the element section 22 is preferably 50% or less of the length from the end thereof closer to the element section 22 to the air inflow end 41.

The slider 20 according to the embodiment is otherwise configured the same as in the first embodiment.

A method of manufacturing the slider 20 according to the embodiment will now be described. The method includes the steps of producing the slider section 21, producing the element section 22 separately from the slider section 21, and bonding the-slider section 21 and the element section 22 to each other. The method further includes, after the step of bonding the slider section 21 and the element section 22 to each other, the step of lapping the first medium facing surface 31 so as to allow the first medium facing surface 31 to have the first surfaces 33 closer to the element section 22, the second surfaces 34 closer to the air inflow end 41, and the border portions 35 each located between the first and second surfaces 33 and 34, and to allow the second surfaces 34 to slant against the first surfaces 33 such that the first and second surfaces 33 and 34 make a convex shape bent at the border portion 35. In this embodiment, the step of producing the element section 22 is the same as that in the first embodiment.

The step of producing the slider section 21 will now be described. As in the first embodiment, as shown in FIG. 2, the step of producing the slider section 21 includes: the step of forming a plurality of the first medium facing surfaces 31 corresponding to a plurality of the slider sections 21 for the first wafer 50 to thereby form the first slider section aggregate 51A including a plurality of the slider sections 21 arranged in a plurality of rows; and the step of cutting the first slider section aggregate 51A in positions denoted by reference numeral 52 in FIG. 2, thereby forming the second slider section aggregates 51B each including a plurality of the slider sections 21 arranged in a row, as shown in FIG. 41.

Figure 41:
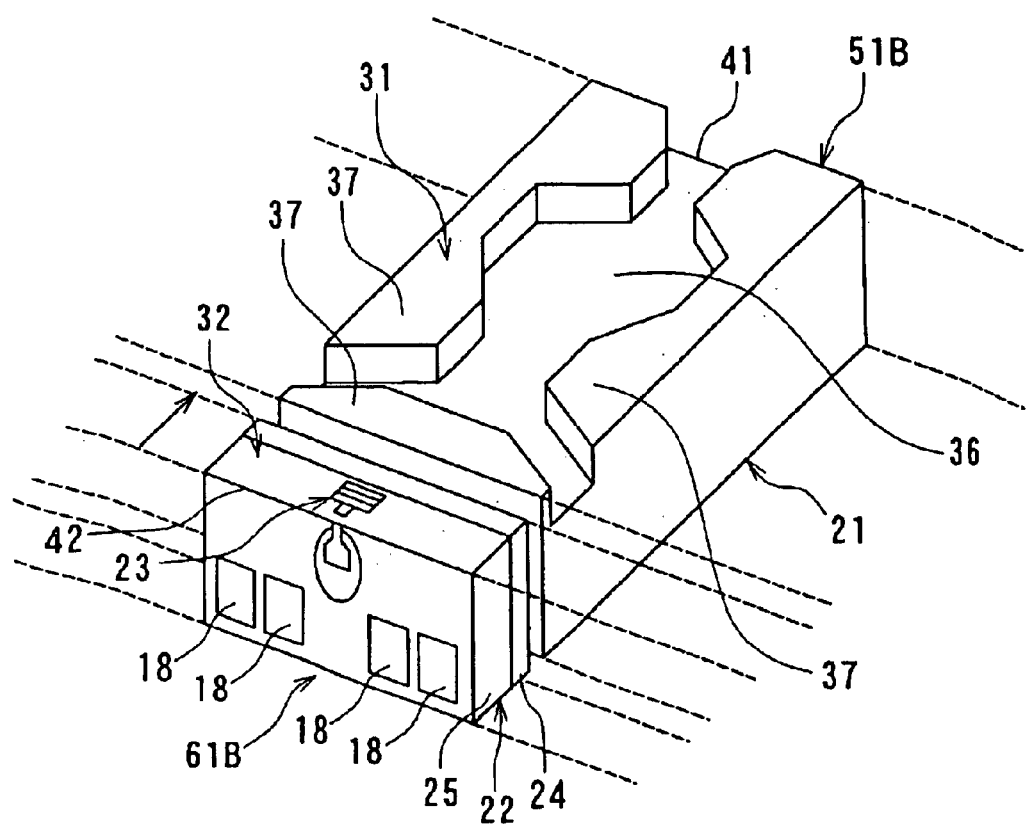
FIG. 41 is a perspective view for illustrating the step of bonding a slider section and an element section to each other in the third embodiment.

According to the embodiment, however, as shown in FIG. 41, the shape of the first medium facing surface 31 after the step of producing the slider section 21 is different from that of the first embodiment as described below. That is, the first medium facing surface 31 includes surfaces 37 closest to the recording medium and having the same shape as the surfaces 31a of the first embodiment, and the third surface 36 has a predetermined difference in level from the surfaces 37. The difference in level between the surfaces 37 and 36 is about 2 to 3 $\mu$m, for example.

The first medium facing surfaces 31 may be formed in a similar way to the case of forming the first recesses 55 (see FIG. 4) on one of surfaces of the first wafer 50 in the first embodiment. More specifically, an etching mask of metal is formed on one of surfaces of the first wafer 50, and the first wafer 50 is etched by dry etching through the use of the etching mask, thereby forming the third surfaces 36 on the one-of the surfaces of the first wafer 50.

The step of bonding the slider section 21 and the element section 22 to each other is the same as that in the first embodiment. Specifically, as shown in FIG. 41, the second slider section aggregate 51B including a plurality of the slider sections 21 arranged in a row and the second element section aggregate 61B including a plurality of the element sections 22 arranged in a row are bonded to each other, thereby producing the slider aggregate 70 including a plurality of the sliders 20 arranged in a row as shown in FIG. 19.

Reference is now made to FIGS. 42 to 45 to detail the step of bonding the slider section 21 and the element section 22 to each other and subsequent steps. FIGS. 42 to 45 are side views of the slider aggregate 70.

In the step of bonding the slider section 21 and the element section 22 to each other, as shown in FIG. 42, the second slider section aggregate 51B including a plurality of the slider sections 21 arranged in a row and the second element section aggregate 61B including a plurality of the element sections 22 arranged in a row are bonded to each other using the adhesive 73, thereby producing the slider aggregate 70 including a plurality of the sliders 20 arranged in a row. By going through this step, as shown in FIG. 42, a difference in level may develop between the first medium facing surface 31 in the slider section 21 and the second medium facing surface 32 in the element section 22.

Following the above-mentioned step, the first and second medium facing surfaces 31 and 32 are lapped while the throat-heights and MR heights of the plurality of the element sections 22 in the slider aggregate 70 are controlled to obtain target values. The first and second medium facing surfaces 31 and 32 are thereby flattened as shown in FIG. 43.

Then, a step shown in FIG. 44 is performed. In this step, part of each of the surfaces 37 is lapped by lapping the slider aggregate 70 with the orientation of the slider aggregate 70 with respect to the surface plate made different from that in the step of lapping the first and second medium facing surfaces 31 and 32. The first surfaces 33, the second surfaces 34, and the border portions 35 of the first medium facing surface 31 are thereby formed for each slider section 21. At this point, the air inflow end 41 is formed for each slider section 21.

Figure 45:
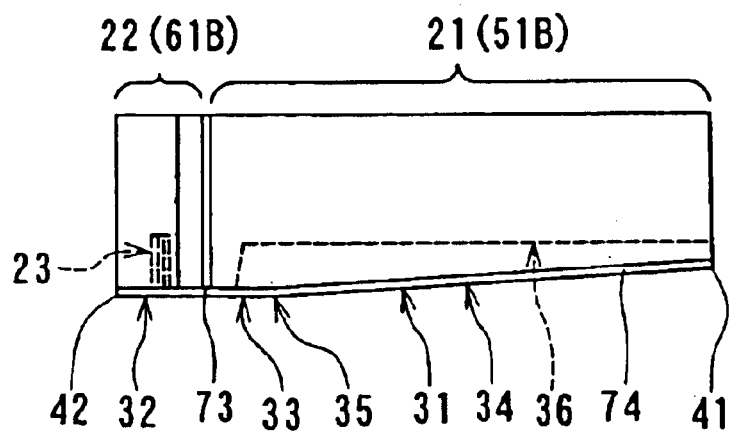
FIG. 45 is a side view for illustrating a step that follows FIG. 44.

Then, as shown in FIG. 45, the protection layer 74 is formed to cover the first and second medium facing surfaces 31 and 32 of the slider aggregate 70. Finally, the slider aggregate 70 is cut into a plurality of the sliders 20 separated from one another.

Figure 46:
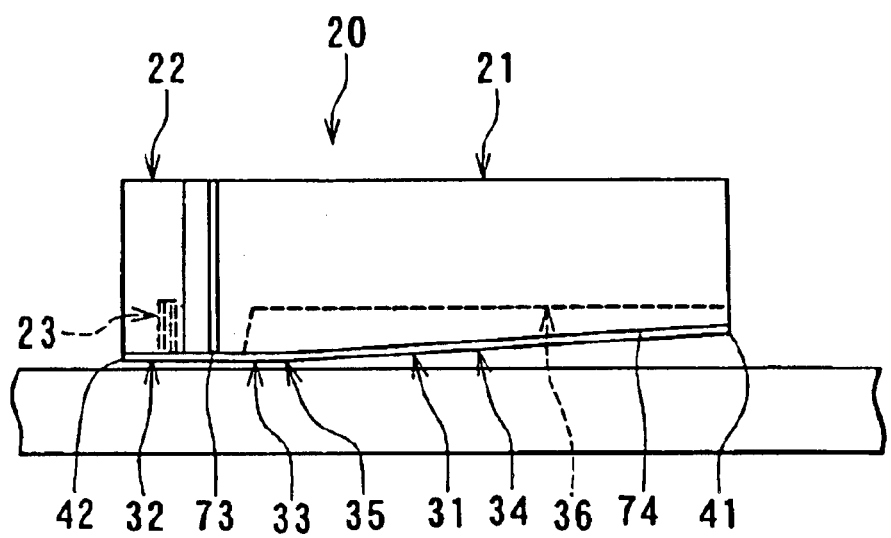
FIG. 46 is a side view showing a state of the slider according to the third embodiment while the recording medium is rotating.
Figure 47:
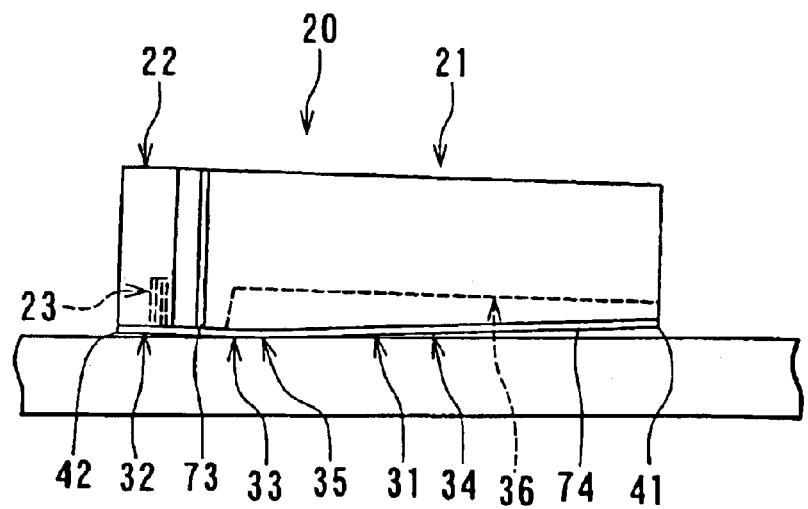
FIG. 47 is a side view showing a state of the slider according to the third embodiment while the recording medium is at rest.

Reference is now made to FIGS. 46 and 47 to describe the functions and effects of the slider 20 according to the embodiment. FIG. 46 is a side view showing a state of the slider 20 while the recording medium 45 is rotating. FIG. 47 is a side view showing a state of the slider 20 while the recording medium 45 is at rest.

As shown in FIG. 46, while the recording medium 45 is rotating, the slider section 21 flies by means of the airflow created by the rotation of the recording medium 45 and is off the surface of the recording medium 45. On the other hand, as shown in FIG. 47, the slider section 21 is in contact with the surface of the recording medium 45 while the recording medium 45 is at rest.

As shown in FIG. 46, while the recording medium 45 is rotating, each second surface 34 of the first medium facing surface 31 slants against the surface of the recording medium 45 such that the smaller the distance between a point in the second surface 34 and the air inflow end 41, the greater the distance between the point in the second surface 34 and the recording medium 45. While the recording medium 45 is rotating, the first surfaces 33 of the first medium facing surface 31 and the second medium facing surface 32 are almost parallel to the surface of the recording medium 45. While the recording medium 45 is rotating, each second surface 34 preferably forms an angle of 30° or smaller, and more preferably an angle of 10° or smaller, with respect to the surface of the recording medium 45. It is also preferable that the angle that the second surface 34 forms with the surface of the recording medium 45 is not smaller than 0.1°. The angle that the second surface 34 forms with the surface of the recording medium 45 while the recording medium 45 is rotating can be controlled according to the shape of the concavities and convexities of the first medium facing surface 31.

According to the embodiment, while the recording medium 45 is rotating, a pressure for moving the slider section 21 away from the recording medium 45 is generated between the recording medium 45 and the second surfaces 34. In the embodiment, the difference in level between the second and third surfaces 34 and 36 varies gradually so as to increase with decreasing distance from the air outflow end 42. Therefore, during the rotation of the recording medium 45, the air passing through between the third surface 36 and the recording medium 45 gradually increases in volume. Consequently, a negative pressure for drawing the slider section 21 toward the recording medium 45 is generated between the third surface 36 and the recording medium 45.

This negative pressure allows a part of the slider section 21 located near the air outflow end 42, in particular, to be close to the recording medium 45 while the medium is rotating. Consequently, according to the slider 20 of the embodiment, a reduction in magnetic space is achieved. In terms of reduction in magnetic space, by appropriately designing the shape of the concavities and convexities of the first medium facing surface 31, it is possible for the slider 20 of the embodiment to work equivalently or better than the slider 20 shown in FIG. 1 whose first medium facing surface.31 has three surfaces of different levels.

The first medium facing surface 31 shown in FIG. 1 has three surfaces of different levels. In this case, negative pressure is generated by the surfaces 31b and 31c whose levels are different from each other. In contrast, according to the embodiment, negative pressure is generated by the third surface 36 having no step. Therefore, air flows more smoothly through between the slider 20 and the recording medium 45 as compared with the case of the slider 20 shown in FIG. 1. According to the embodiment, it is thus easy to control the orientation of the slider 20 during the rotation of the recording medium 45.

In the embodiment, when the recording medium 45 shifts from the rotating state to the resting state and the slider section 21 comes into contact with the surface of the recording medium 45, the border portions 35 are the first to make contact with the surface of the recording medium 45. When the recording medium 45 shifts from the resting state to the rotating state and the slider section 21 takes off from the surface of the recording medium 45, the border portions 35 are the last to depart from the surface of the recording medium 45. Thus, the border portions 35 function like a wheel of an aircraft.

As described above, the slider 20 of the embodiment makes contact with the surface of the recording medium 45 at the border portions 35 of the slider section 21. Therefore, as compared with conventional sliders, the area of the slider section 21 contacting the surface of the recording medium 45 is extremely smaller, yielding an extreme reduction in the frictional resistance between the slider section 21 and the surface of the recording medium 45. Therefore, according to the slider 20 of the embodiment, the initial contact of the slider section 21 with the surface of the recording medium 45 and the separation of the slider section 21 from the surface of the recording medium 45 can be performed smoothly. As a result, it is possible to prevent occurrence of damage to the recording medium 45 and the thin-film magnetic head element 23 due to a collision between the slider 20 and the recording medium 45.

In the slider 20 of the embodiment, the area of the slider section 21 contacting the surface of the recording medium 45 when it is at rest is extremely smaller than in conventional sliders. It is therefore possible to prevent the slider 20 from sticking to the recording medium 45.

According to the slider 20 of the embodiment, as shown in FIG. 46, during the rotation of the recording medium 45 each second surface 34 of the first medium facing surface 31 slants against the surface of the recording medium 45 such that the smaller the distance between a point in the second surface 34 and the air inflow end 41, the greater the distance between the point in the second surface 34 and the recording medium 45. As a result, the thin-film magnetic head element 23 gets closer to the surface of the recording medium 45. Thus, according to the slider 20 of the embodiment, during the rotation of the recording medium 45, the thin-film magnetic head element 23 is allowed to be close to the surface of the recording medium 45 while the second surfaces 34 are kept farther from the recording medium 45 than the thin-film magnetic head element 23. Therefore, the embodiment makes it possible to attain a greater reduction in magnetic space while avoiding a collision between the slider 20 and the recording medium 45.

If the edges of the air outflow end 42 are chamfered, it is possible to prevent a collision between the slider 20 and the recording medium 45 with higher reliability.

As has been described, the slider 20 of the embodiment makes it possible to reduce the magnetic space. Furthermore, it is possible to prevent the slider 20 from sticking to the recording medium 45, and to prevent damage to the recording medium 45 and the thin-film magnetic head element 23 due to a collision between the slider 20 and the recording medium 45.

According to the embodiment, as a result of reduction in the magnetic space, it is possible to improve the reproducing output and reduce the half width of the reproducing head of the thin-film magnetic head element 23, thereby increasing the recording density. Furthermore, as a result of reduction in the magnetic space, it is also possible to improve the overwrite property and nonlinear transition shift of the recording head of the thin-film magnetic head element 23.

The embodiment thus makes it possible to improve the characteristics of both the reproducing head and the recording head of the thin-film magnetic head element 23. As a result, it is possible to improve the yield of hard disk drives that implement the slider 20 of the embodiment.

To form the first medium facing surface 31 shown in FIG. 1 having the three surfaces of different levels, two steps of forming an etching mask and two steps of etching are required. In contrast, the embodiment involves only a single step of forming an etching mask and a single step of etching. Instead, the embodiment requires an extra step of lapping the first medium facing surface 31 as compared to the case of forming the first medium facing surface 31 shown in FIG. 1. However, the step of lapping the first medium facing surface 31 is simpler than the steps of forming an etching mask and performing etching. Thus, according to the embodiment, the process for forming the first medium facing surface 31 is simpler than that for forming the first medium facing surface 31 shown in FIG. 1. The manufacturing cost of the slider 20 is therefore reduced.

In the embodiment, the first medium facing surface 31 is formed easier than in the cases where crowns or cambers are formed on the medium facing surfaces of sliders. Besides, there will occur no problem associated with the crown/camber formation. Thus, according to the embodiment, it is possible to precisely define the shape of the first medium facing surface 31, improve the yield of the slider 20 and reduce the manufacturing costs of the slider 20, as compared to the cases where crowns or cambers are formed-on the medium facing surfaces of sliders. In view of the foregoing, the embodiment of the invention is excellent in terms of mass productivity.

In the embodiment, in the first medium facing surface 31 the length from each border portion 35 to the end of the medium facing surface 31 closer to the element section 22 is preferably 50% or less of the length from the end thereof closer to the element section 22 to the air inflow end 41. If this is satisfied, during rotation of the recording medium 45, the length of the portion (the portion extending from the border portion 35 to the end of the first medium facing surface 31 closer to the element section 22) that approaches the surface of the recording medium 45 out of the entire slider section 21 becomes equal to or less than the length of the portion (the second surface 34) that gets away from the surface of the recording medium 45. It is thereby possible to prevent a collision between the slider 20 and the recording medium 45 with yet higher reliability.

Meanwhile, according to the embodiment, the slider section 21 and the element section 22 are bonded to each other to form the slider 20. Therefore, the slider section 21/element section 22 joint portion of the slider 20 is inferior to the other portions in terms of strength. Accordingly, in order to prevent breakage of the slider 20, it is preferable that no external force be applied to the slider section 21/element section 22 joint portion. The slider 20 according to the embodiment contacts the surface of the recording medium 45 at the border portions 35. Therefore, the slider section 21/element section 22 joint portion does not contact the recording medium 45. As a result, it is possible to prevent breakage of the slider 20 which could be caused by an external force applied by the recording medium to the slider section 21/element section 22 joint portion of the slider 20.

Three modified examples of the slider 20 according to the embodiment and manufacturing methods thereof will now be described.

Figure 48:
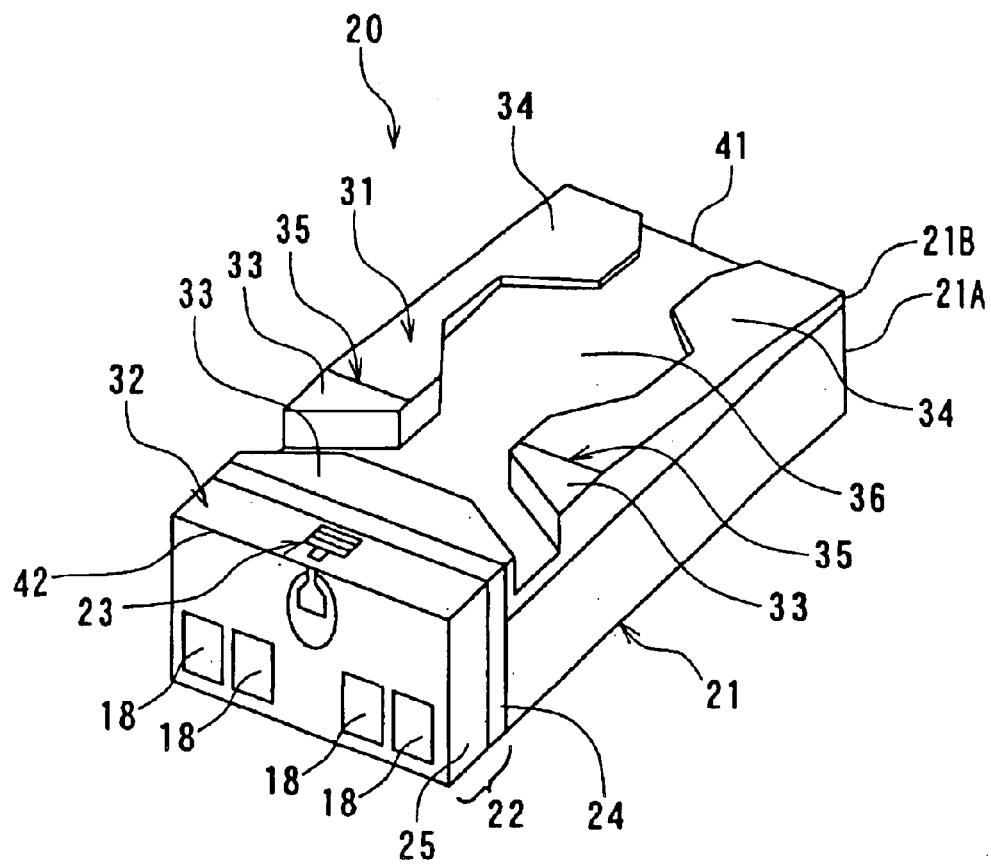
FIG. 48 is a perspective view of a slider of a first modified example of the third embodiment.

FIG. 48 is a perspective view of the slider 20 according to a first modified example. In this slider 20, the slider section 21 includes the substrate portion 21A and the medium facing layer 21B placed on the substrate portion 21A, as in the second embodiment. The first medium facing surface 31 is formed on the medium facing layer 21B. The element section 22 has the insulating portion 25 surrounding the thin-film magnetic head element 23. Examples of the materials of the substrate portion 21A, the medium facing layer 21B and the insulating portion 25, and the relationship among them in terms of hardness are as described in the second embodiment. The slider 20 of the first modified example is otherwise configured the same as the slider 20 shown in FIG. 40.

According to a method of manufacturing the slider 20 of the first modified example, in the step of producing the slider section 21, the first medium facing surfaces 31 are formed on the medium facing layer 21B. The first medium facing surfaces 31 may be formed in a similar way to the case of forming the first recesses 55 (see FIG. 4) on the one of the surfaces of the first wafer 50 in the first embodiment. More specifically, first, a seed layer for plating is formed on the medium facing layer 21B by sputtering. The seed layer has a thickness of 50 nm, for example. On the seed layer, a frame to be used for forming an etching mask by frame plating is formed by photolithography. Through the use of the frame, a metal etching mask is formed by frame plating. The etching mask may be made of NiFe, for example. Using the etching mask, the medium facing layer 21B is dry-etched to form the third surface 36 for the medium facing layer 21B. For example, reactive ion etching is used to etch the medium facing layer 21B. In this case, the reactive gas is typically produced by adding a mixture gas of $O_2$, $N_2$, Ar, He, and $H_2$ to a halogen-based gas such as $Cl_2$, $BCl_3$, $CF_4$, $SF_6$, and $CH_3$. The temperature during the etching is at least 50° C., and specifically 160° C., for example.

The other steps in the manufacturing method for the first modified example are the same as those for the slider 20 shown in FIG. 40.

Figure 49:
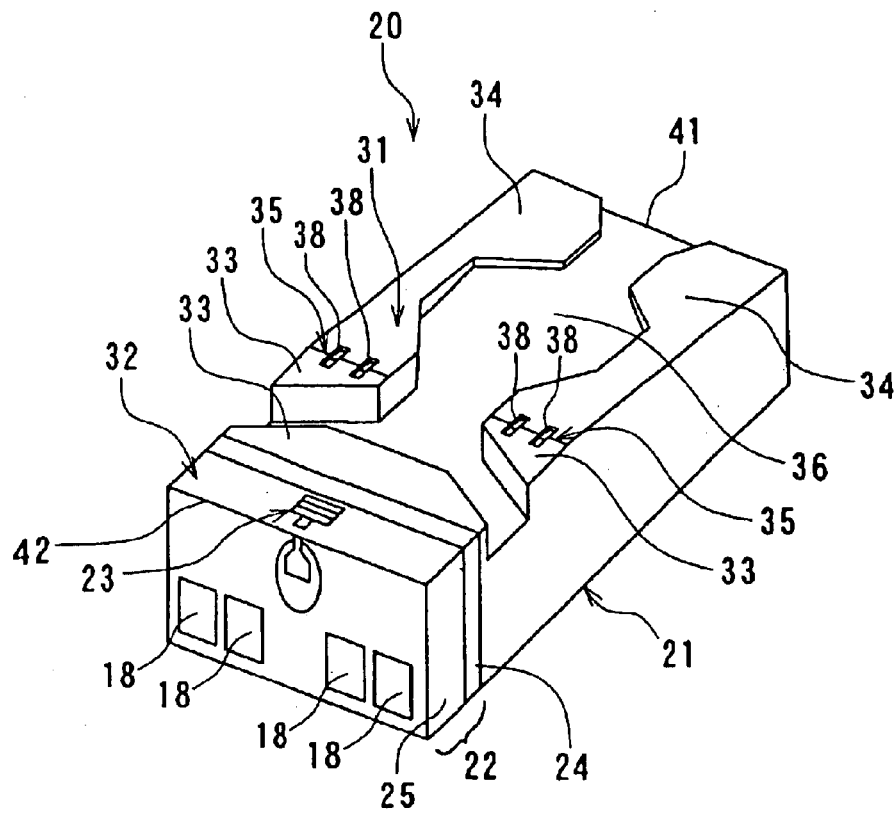
FIG. 49 is a perspective view of a slider of a second modified example of the third embodiment.

FIG. 49 is a perspective view of the slider 20 according to a second modified example. In the slider 20, the first medium facing surface 31 includes a plurality of recesses 38 formed in regions including the border portions 35. The slider 20 of the second modified example is otherwise configured the same as the slider 20 shown in FIG. 40.

The recesses 38 are formed by etching the protection layer 74 or the first wafer 50. The other steps in the manufacturing method for the second modified example are the same as those for the slider 20 shown in FIG. 40.

In the slider 20 of the second modified example, the slider section 21 is in contact with the surface of the recording medium 45 at the border portions 35 regardless of whether the recording medium 45 is rotating or at rest. Regardless of whether the recording medium 45 is rotating or at rest, each second surface 34 of the first medium facing surface 31 slants against the surface of the recording medium 45 such that the smaller the distance between a point in the second surface 34 and the air inflow end 41, the greater the distance between the point in the second surface 34 and the recording medium 45. In either case where the recording medium 45 is rotating or at rest, the first surfaces 33 of the first medium facing surface 31 may be in contact with the surface of the recording medium 45 or slant against the surface of the recording medium 45 such that the smaller the distance between a point in the first surface 33 and the air outflow end 42, the greater the distance between the point in the first surface 33 and the recording medium 45.

Since the slider 20 of the second modified example is in contact with the surface of the recording medium 45 even while the recording medium 45 is rotating, a greater reduction in magnetic space is achieved. Furthermore, according to the slider 20 of the second modified example, since the slider section 21 is always in contact with the surface of the recording medium 45, it is possible to prevent occurrence of a collision between the slider section 21 and the recording medium 45 which could be caused by the slider section 21 coming into contact with and getting away from the surface of the recording medium 45.

In the slider 20 of the second modified example, the first medium facing surface 31 includes a plurality of recesses 38 formed in regions including the border portions 35. Accordingly, the area of the slider section 21; contacting the surface of the recording medium 45 is smaller than in the case where no recesses 38 are provided. Frictional resistance between the slider section 21 and the surface of the recording medium 45 is thereby reduced.

Figure 50:
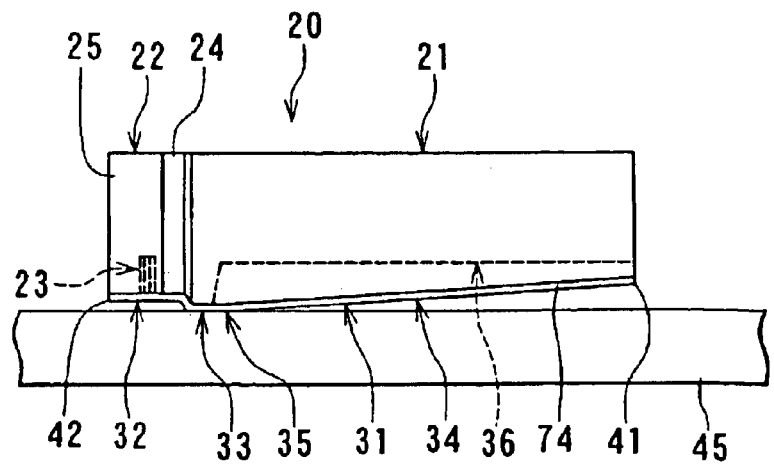
FIG. 50 is a side view of a slider of a third modified example of the third embodiment.

FIG. 50 is a side view of the slider 20 according to a third modified example. In the slider 20 of the third modified example, as shown in FIG. 50, the slider section 21 is in contact with the surface of the recording medium 45 regardless of whether the recording medium 45 is rotating or at rest.

In the slider 20 of the third modified example, the second medium facing surface 32 is located farther from the recording medium 45 than the first surfaces 33 of the first medium facing surface 31. The difference in level between the second medium facing surface 32 and the first surfaces 33 of the first medium facing surface 31 is about 3 to 4 nm. In the third modified example, this difference in level is utilized to reduce the magnetic space. The slider 20 of the third modified example is otherwise configured the same as the slider 20 shown in FIG. 40.

The difference in level between the second medium facing surface 32 and the first surfaces 33 of the first medium facing surface 31 occurs in the step shown in FIG. 43, that is, the step of lapping the first and second medium facing surfaces 31 and 32, because of the difference in hardness between the first wafer 50 and the insulating portion 25. The other steps in the manufacturing method for the third modified example are the same as those for the slider 20 shown in FIG. 40.

In the slider 20 of the third modified example, the first medium facing surface 31 may include a plurality of recesses 38 formed in regions including the border portions 35, like the second modified example.

While the recording medium 45 is rotating, the slider 20 of the third modified example makes contact with the surface of the recording medium 45 at the first surfaces 33 and the border portions 35 of the first medium facing surface 31. In this state, the distance between the second medium facing surface 32 and the surface of the recording medium 45 is about 3 to 4 nm. Thus, a significant reduction in magnetic space can be achieved with the slider 20 of the third modified example.

According to the slider 20 of the third modified example, since the second medium facing surface 32 does not contact the surface of recording medium 45, the thin-film magnetic head element 23 is kept away from the surface of the recording medium 45 although the magnetic space is reduced significantly as mentioned above. As a result, it is possible to prevent damage to the thin-film magnetic head element 23 and the recording medium 45 which could be caused by contact between the thin-film magnetic head element 23 and the recording medium 45.

The remainder of the configuration, functions and effects of the present embodiment are the same as those of the first embodiment.

Fourth Embodiment

Figure 51:
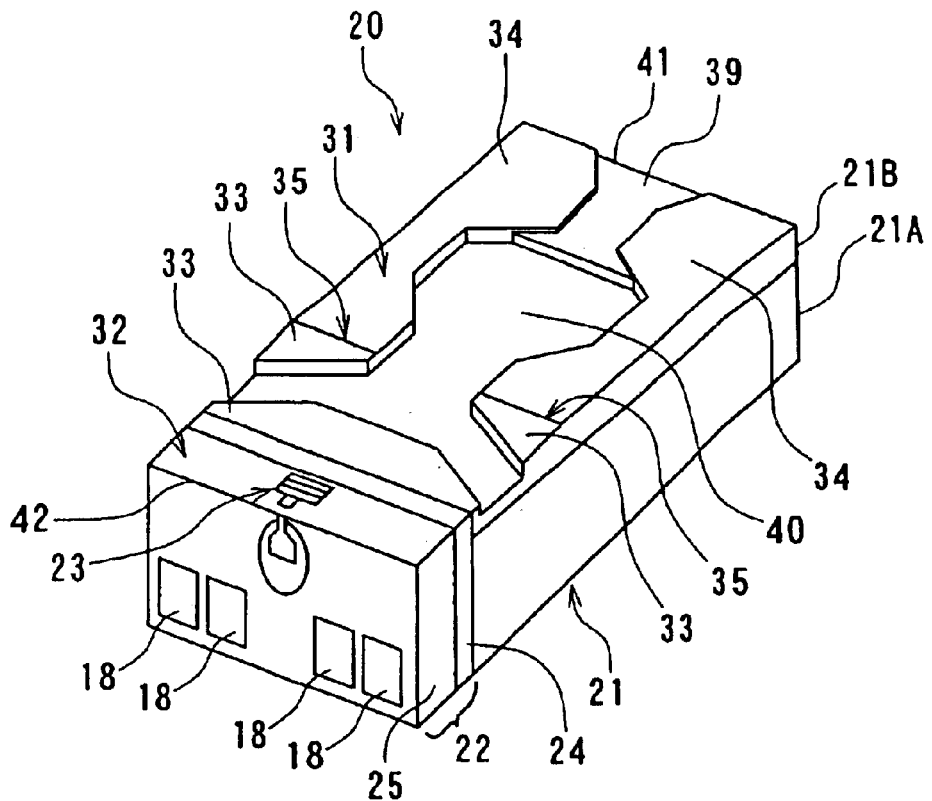
FIG. 51 is a perspective view of a slider according to a fourth embodiment of the invention.

Description will now be given of a slider according to a fourth embodiment and a manufacturing method thereof. FIG. 51 is a perspective view of the slider 20 according to the embodiment. In the slider 20, the slider section 21 includes the substrate portion 21A and the medium facing layer 21B placed on the substrate portion 21A. The first medium facing surface 31 is formed on the medium facing layer 21B. The element-section 22 has the insulating portion 25 surrounding the thin-film magnetic head element 23. Relationship among the hardnesses of the substrate portion 21A, the medium facing layer 21B and the insulating portion 25 is as described in the second embodiment.

The first medium facing surface 31 has first surfaces 33 closer to the element section 22, second surfaces 34 closer to the air inflow end 41, and border portions 35 each located between the first and second surfaces 33 and 34. The first surfaces 33 includes two portions disposed near the sidewalls of the slider section 21 along the width thereof, and a portion disposed near the end of the slider section 21 closer to the element section 22. The second surfaces 34 includes two portions disposed near the sidewalls of the slider section 21 along the width thereof, the two portions extending in the direction of air passage and being connected to the two portions of the first surfaces 33.

The first medium facing surface 31 further has a third surface 39 and a fourth surface 40 that are provided between the two portions of the second surfaces 34. The third surface 39 is disposed near the air inflow end 41. The second and third surfaces 34 and 39 have a first difference in level such that the third surface 39 is located farther from the recording medium than the second surfaces 34 are. The fourth surface 40 is located closer to the element section 22 than the third surface 39 is. The secondhand fourth surfaces 34 and 40 have a second difference in level such that the fourth surface 40 is located farther from the recording medium than the second surfaces 34 are. The second difference in level is greater than the first difference in level.

Each second surface 34 is slanted against the first surface 33 such that the first and second surfaces 33 and 34 make a convex shape (roof-like shape) bent at the border portion 35. The first and second surfaces 33 and 34 preferably form an angle of 30° or smaller. It is also preferable that the angle formed between the first and second surfaces 33 and 34 does not fall below 0.1°.

In the first medium facing surface 31, the length from each border portion 35 to the end of the medium facing surface 31 closer to the element section 22 is preferably 50% or less of the length from the end thereof closer to the element section 22 to the air inflow end 41.

The slider 20 according to the embodiment is otherwise configured the same as in the first embodiment.

A method of manufacturing the slider 20 according to the embodiment will now be described. The method includes the steps of producing the slider section 21, producing the element section 22 separately from the slider section 21, and bonding the slider section 21 and the element section 22 to each other. The method further includes, after the step of bonding the slider section 21 and the element section 22 to each other, the step of lapping the first medium facing surface 31 so as to allow the first medium facing surface 31 to have the first surfaces 33 closer to the element section 22, the second surfaces 34 closer to the air inflow end 41, and the border portions 35 located between the first and second surfaces 33 and 34, and to allow the second surfaces 34 to slant against the first surfaces 33 such that the first and second surfaces 33 and 34 make a convex shape (roof-like shape) bent-at the border portion 35. In this embodiment, the step of producing the element section 22 is the same as that in the first embodiment.

The step of producing the slider section 21 will now be described. Here, the second slider section aggregate. 51B is formed through the same steps as in the second embodiment. The shape of the second slider section aggregate 51B at this point is indicated by the dotted line in FIG. 52. At this point, the first medium facing surfaces 31 each including a surface 34A, the third surface 39 and the fourth surface 40 are formed for the second slider section aggregate 51B. The surfaces 34A, 39 and 40 correspond to the surfaces 31a, 31b, and 31c, respectively, of the second embodiment.

Figure 52:
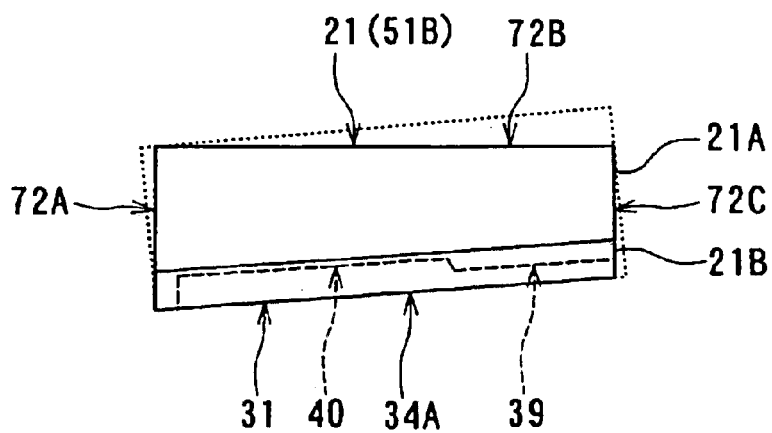
FIG. 52 is a side view for illustrating the step of producing a slider section in the fourth embodiment.

In the step of producing the slider section 21, as shown in FIG. 52, an end face of the second slider section aggregate 51B to be butted against the element section aggregate 61B is lapped to form a surface 72A to be bonded to the element section aggregate 61B. The surface 72A is formed to make an angle of less than 90° with the surface 34A, and also to make an angle of 0.1° to 30° with the end face before the lapping. Here, by way of example, the surface 72A is formed to make an angle of 0.5° to 1.0° with the end face before the lapping.

In the step of producing the slider section 21, another end face of the second slider section aggregate 51B that is opposite to the surface 34A may be lapped to form a surface 72B perpendicular to the surface 72A. Further, in the step of producing the slider section 21, another end face of the second slider section aggregate 51B opposite to the surface 72A may be lapped to form a surface 72C parallel to the surface 72A.

Figure 53:
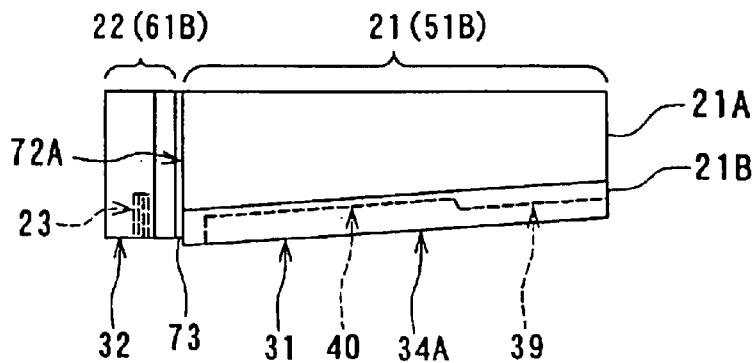
FIG. 53 is a side view for illustrating the step of bonding the slider section and an element section to each other in the fourth embodiment.

The step of bonding the slider section 21 and the element section 22 to each other will now be described. In this step, as shown in FIG. 53, the second element section aggregate 61B is bonded to the surface 72A of the second slider section aggregate 51B using the adhesive 73, thereby producing the slider aggregate 70 including a plurality of the sliders 20 arranged in a row as shown in FIG. 19. At this point, as shown in FIG. 53, the surface 34A of the slider section 21 is slanted with respect to the second medium facing surface 32 of the element section 22 at an angle of 0.1° to 30°, more specifically at an angle of 0.5° to 1.0°, for example.

Figure 54:
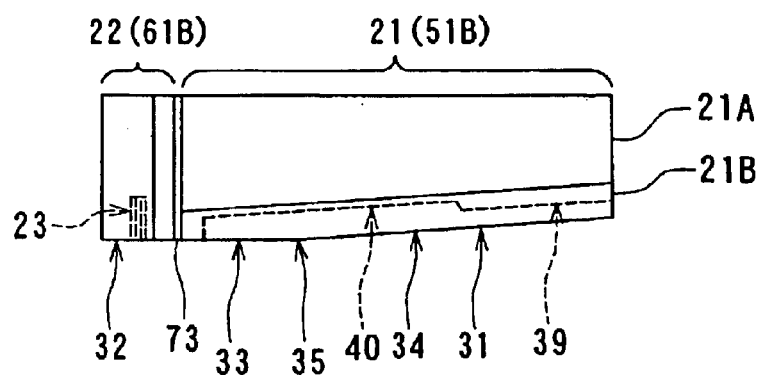
FIG. 54 is a side view for illustrating a step that follows FIG. 53.

The step-of lapping the first medium facing surface 31 will now be described. In this step, the first and second medium facing surfaces 31 and 32 are lapped while the MR heights and throat heights of a plurality of the element sections 22 in the slider aggregate 70 are controlled to obtain target values. Thus, as shown in FIG. 54, part of the surface 34A of the slider section 21, the part being adjacent to the element section 22, is lapped together with the second medium facing surface 32 to thereby form the first surface 33 of the first medium facing surface 31. The untapped part of the surface 34A makes the second surface 34 of the first medium facing surface 31.

Figure 55:
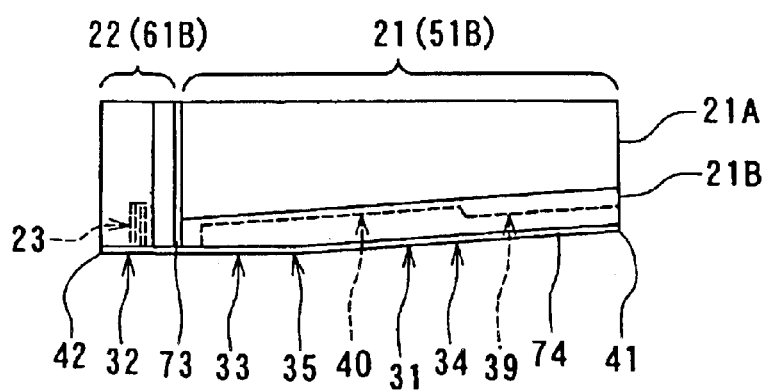
FIG. 55 is a side view for illustrating a step that, follows FIG. 54.

Then, as shown in FIG. 55, the protection layer 74 is formed to cover the first and second medium facing surfaces 31 and 32 of the slider aggregate 70. Finally, the slider aggregate 70 is cut into a plurality of the sliders 20 separated from one another.

Figure 56:
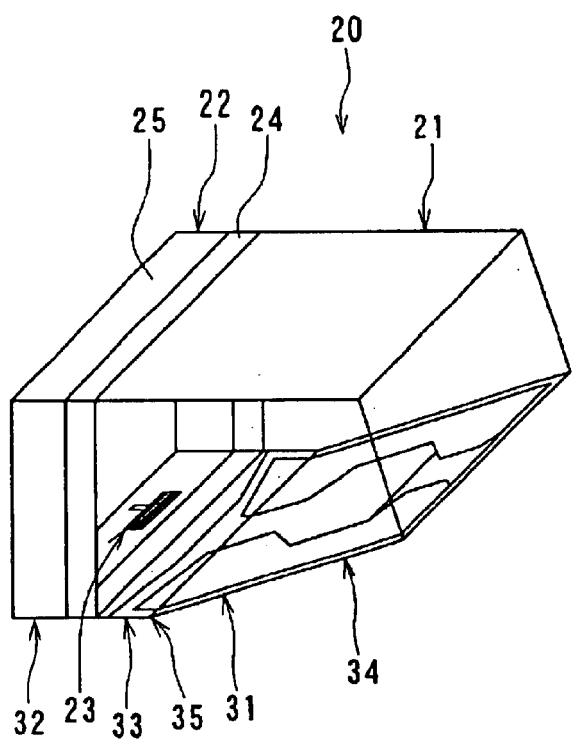
FIG. 56 is a perspective view illustrating an example of the appearance of the slider according to the fourth embodiment.
Figure 57:
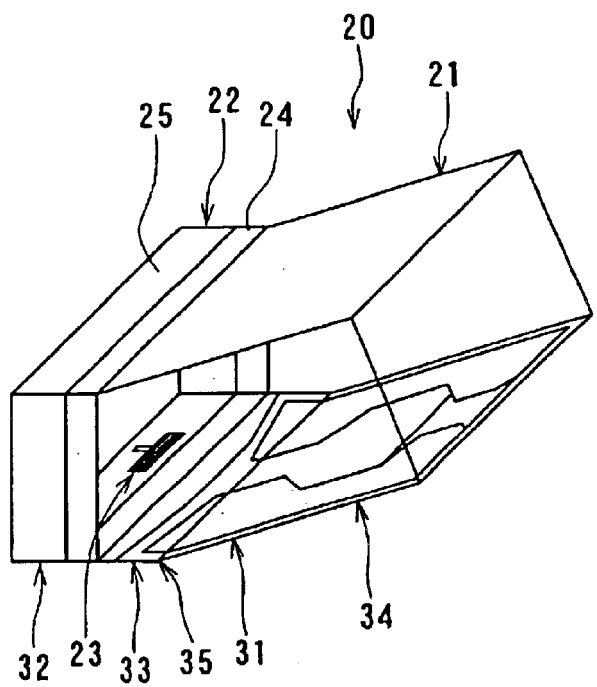
FIG. 57 is a perspective view illustrating another example of the appearance of the slider according to the fourth embodiment.

FIGS. 56 and 57 are perspective views each showing an example of the appearance of the slider according to the embodiment. In FIGS. 56 and 57, the first and second medium facing surfaces 31 and 32 are shown in phantom to be seen through the slider section 21 and the element section 22 for easy understanding. FIG. 56 shows the case where the surface 72B is formed in the step shown in FIG. 52 while the surface 72C is not formed. FIG. 57 shows the case where neither of the surfaces 72B and 72C is formed in the step shown in FIG. 52.

Figure 58:
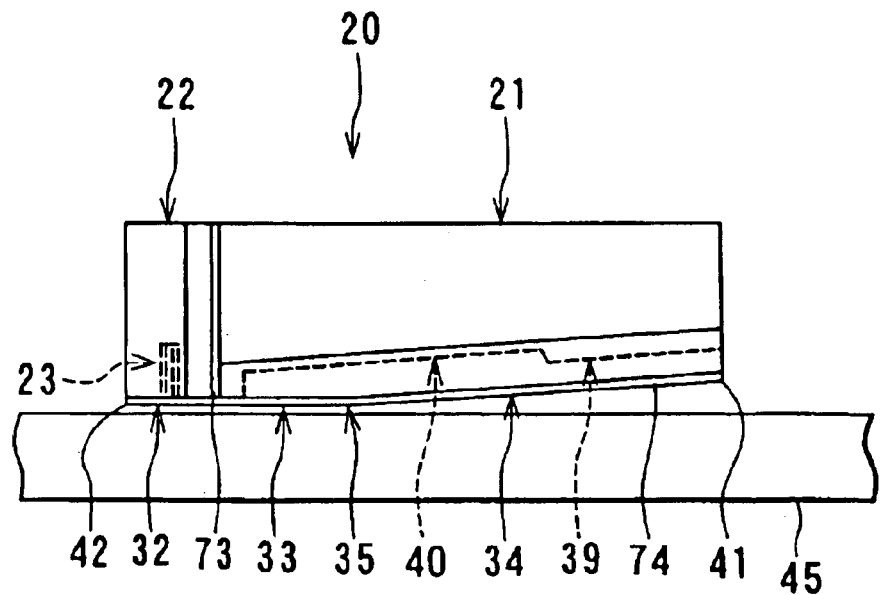
FIG. 58 is a side view showing a state of the slider according to the fourth embodiment while the recording medium is rotating.
Figure 59:
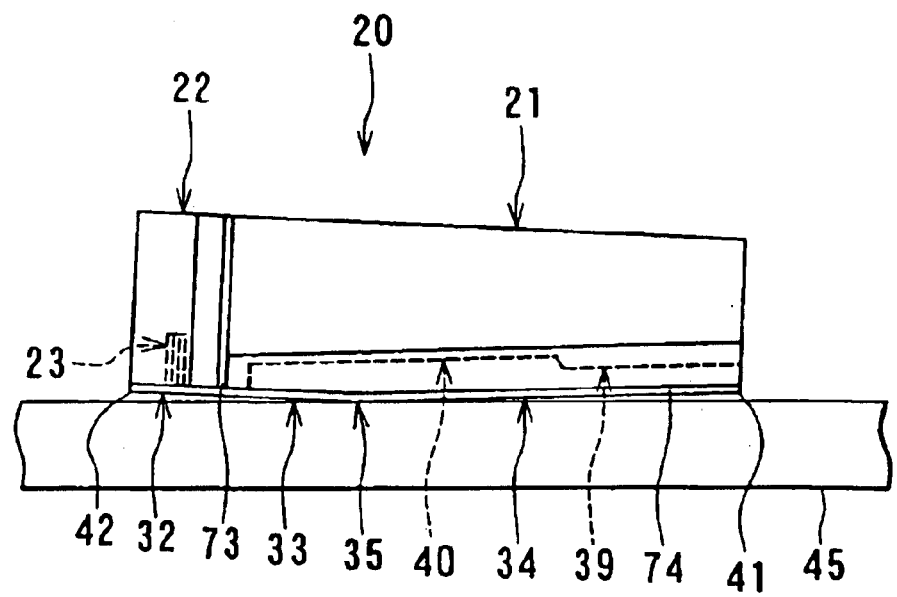
FIG. 59 is a side view showing a state of the slider according to the fourth embodiment while the recording medium is at rest.

Reference is now made to FIGS. 58 and 59 to describe the functions and effects of the slider 20 according to the embodiment. FIG. 58 is a side view showing a state of the slider 20 while the recording medium 45 is rotating. FIG. 59 is a side view showing a state of the slider 20 while the recording medium 45 is at rest.

As shown in FIG. 58, while the recording medium 45 is rotating, the slider section 21 flies by means of the airflow generated by the rotation of the recording medium 45 and is off the surface of the recording medium 45. On the other hand, as shown in FIG. 59, the slider section 21 is in contact with the surface of the recording medium 45 while the recording medium 45 is at rest.

As shown in FIG. 58, while the recording medium 45 is rotating, each second surface 34 of the first medium facing surface 31 slants against the surface of the recording medium 45 such that the smaller the distance between a point in the second surface 34 and the air inflow end 41, the greater the distance between the point in the second surface 34 and the recording medium 45. While the recording medium 45 is rotating, the first surfaces 33 of the first medium facing surface 31 and the second medium facing surface 32 are almost parallel to the surface of the recording medium 45. While the recording medium 45 is rotating, each second surface 34 preferably forms an angle of 0.1° to 30° with respect to the surface of the recording medium 45. The angle that the second surfaces 34 form with the surface of the recording medium 45 while the recording medium 45 is rotating can be controlled according to the shape of the concavities and convexities of the first medium facing surface 31.

In the embodiment, when the recording medium 45 shifts from the rotating state to the resting state and the slider section 21 comes into contact with the surface of the recording medium 45, the border portions 35 are the first to make contact with the surface of the recording medium 45. When the recording medium 45 shifts from the resting state to the rotating state and the slider section 21 takes off from the surface of the recording medium 45, the border portions 35 are the last to depart from the surface of the recording medium 45. Thus, the border portions 35 function like a wheel of an aircraft.

As described above, the slider 20 of the embodiment makes contact with the surface of the recording medium 45 at the border portions 35 of the slider section 21. Therefore, as compared with conventional sliders, the area of the slider section 21 contacting the surface of the recording medium 45 is extremely smaller, yielding an extreme reduction in the frictional resistance between the slider section 21 and the surface of the recording medium 45. Therefore, according to the slider 20 of the embodiment, the initial contact of the slider section 21 with the surface of the recording medium 45 and the separation of the slider section 21 from the surface of the recording medium 45 can be performed smoothly. As a result, it is possible to prevent occurrence of damage to the recording medium 45 and the thin-film magnetic head element 23 due to a collision between the slider 20 and the recording medium 45.

In the slider 20 of the embodiment, the area of the slider section 21 contacting the surface of the recording medium 45 when it is at rest is extremely smaller than in conventional sliders. It is therefore possible to prevent the slider 20 from sticking to the recording medium 45.

According to the slider 20 of the embodiment, as shown in FIG. 58, during the rotation of the recording medium 45 each of the second surfaces 34 of the first medium facing surface 31 slants against the surface of the recording medium 45 such that the smaller the distance between a point in the second surface 34 and the air inflow end 41, the greater the distance between the point in the second surface 34 and the recording medium 45. As a result, the thin-film magnetic head element 23 gets closer to the surface of the recording medium 45. Thus, according to the slider 20 of the embodiment, during the rotation of the recording medium 45, the thin-film magnetic head element 23 is allowed to be close to the surface of the recording medium 45 while the second surfaces 34 are kept farther from the recording medium 45 than the thin-film magnetic head element 23. Therefore, the embodiment makes it possible to attain a greater reduction in magnetic space while avoiding a collision between the slider 20 and the recording medium 45.

As has been described, the slider 20 of the embodiment makes it possible to reduce the magnetic space. Furthermore, it is possible to prevent the slider 20 from sticking to the recording medium 45, and to prevent damage to the recording medium 45 and the thin-film magnetic head element 23 due to a collision between the slider 20 and the recording medium 45.

According to the embodiment, as a result of, reduction in the magnetic space, it is possible to improve the reproducing output and reduce the half width of the reproducing head of the thin-film magnetic head element 23, thereby increasing the recording density. Furthermore, as a result of reduction in the magnetic space, it is also possible to improve the overwrite property and nonlinear transition shift of the recording head of the thin-film magnetic head element 23.

The embodiment thus makes it possible to improve the characteristics of both the reproducing head and the recording head of the thin-film magnetic head element 23. As a result, it is possible to improve the yield of hard disk drives that implement the slider 20 of the embodiment.

Figure 60:
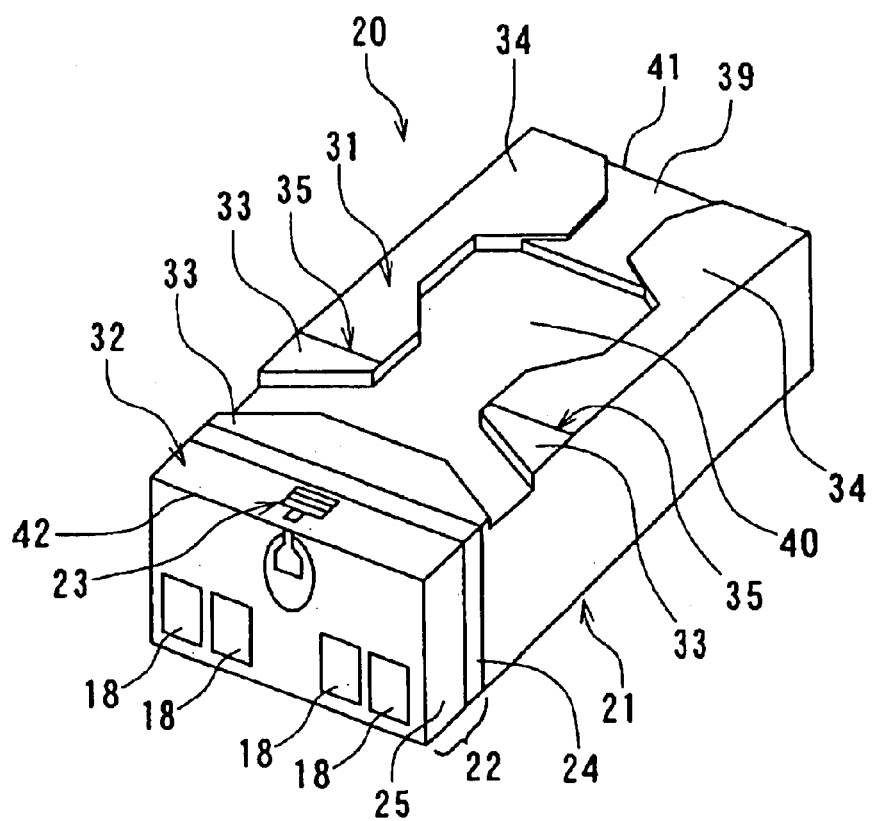
FIG. 60 is a side view of a slider of a modified example of the fourth embodiment.

FIG. 60 is a perspective view of the slider 20 of a modified example of the embodiment. In this slider 20, the slider section 21 is not divided into the substrate portion 21A and the medium facing layer 21B. The modified example is otherwise configured the same as the slider 20 shown in FIG. 51.

In this embodiment, the first medium facing surface 31 may include a plurality of recesses 38 formed in regions including the border portions 35, as in the second modified example of the third embodiment.

In this embodiment, as in the third modified example of the third embodiment, the second medium facing surface 32 may be located farther from the recording medium 45 than the first surfaces 33 of the first medium facing surface 31. In addition, the first surfaces 33 and the border portions 35 of the first medium facing surface 31 may be in contact with the surface of the recording medium 45 while the recording medium 45 is rotating.

The remainder of the configuration, functions and effects of the present embodiment are the same as those of the second embodiment.

Fifth Embodiment

Figure 61:
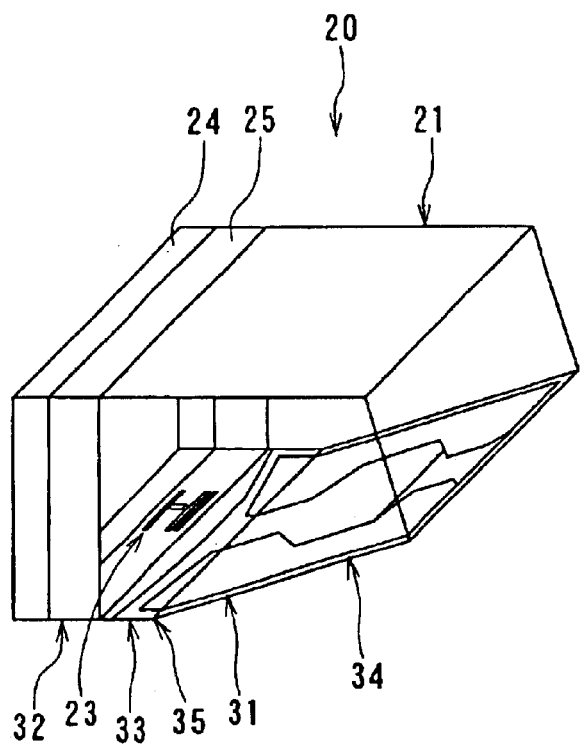
FIG. 61 is a perspective view illustrating an example of the appearance of a slider according to a fifth embodiment of the invention.
Figure 62:
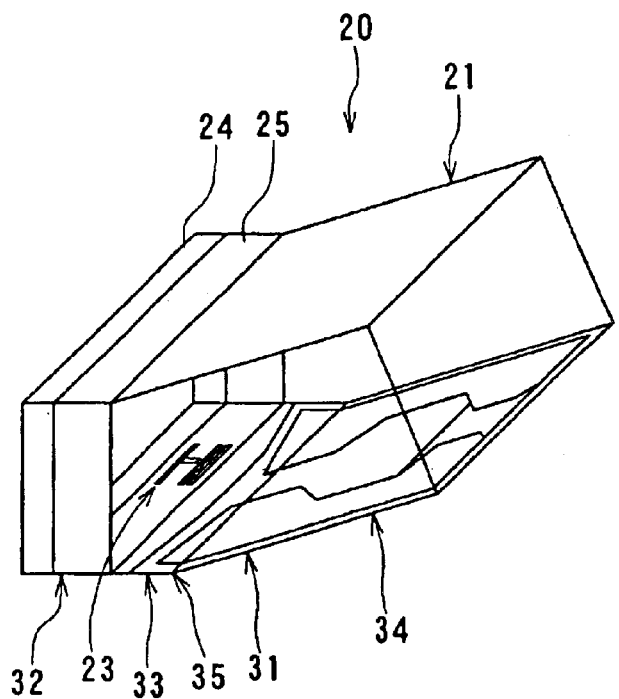
FIG. 62 is a perspective view illustrating another example of the appearance of the slider according to the fifth embodiment.

Description will now be given of a slider according to a fifth embodiment of the invention and a manufacturing method thereof. FIGS. 61 and 62 are perspective views each showing an example of the appearance of the slider according to the embodiment. In FIGS. 61 and 62, the first and second medium facing surfaces 31 and 32 are shown in phantom to be seen through the slider section 21 and the element section 22 for easy understanding.

The slider 20 of this embodiment is configured the same as that of the fourth embodiment, except for the configuration of the element section 22. The manufacturing method for the slider 20 of this embodiment includes the same steps as those for of the fourth embodiment except for the step of producing the element section 22 and the step of bonding the slider section 21 and the element section 22 to each other.

The configuration and producing method of the slider section 21 of the slider 20 shown in FIG. 61 are the same as those of the slider section 21 shown in FIG. 56. The configuration and producing method of the slider section 21 of the slider 20 shown in FIG. 62 are the same as those of the slider section 21 shown in FIG. 57.

The configuration of the element section 22, the step of producing the element section 22 and the step of bonding the slider section 21 and the element section 22 to each other according to the embodiment will now be detailed. As shown in FIGS. 61 and 62, the element section 22 of the embodiment includes: the substrate portion 24 serving as an underlying base for the thin-film magnetic head element 23; and the insulating portion 25 surrounding the thin-film magnetic head element 23. The thin-film magnetic head element 23 has a recording head (induction-type electromagnetic transducer) and a reproducing head including an MR element. The substrate portion 24 is made of aluminum oxide and titanium carbide, for example. The insulating portion 25 is made mainly of alumina, for example. The substrate portion 24 is not necessarily required, however.

In the element section 22 of the embodiment, conversely to the first to fourth embodiments, the recording head (induction-type electromagnetic transducer) and the reproducing head including the MR element are provided in this order on the substrate portion 24. In the element section 22 of the embodiment, the insulating portion 25 is bonded to the slider section 21 so that the reproducing head is located closer to the slider section 21 than the recording head. Electrode pads connected to the thin-film magnetic head element 23 are provided on the surface of the substrate portion 24 opposite to the insulating portion 25.

In the step of producing the element section 22 of the embodiment, conversely to the first to fourth embodiments, the recording head (induction-type electromagnetic transducer) and the reproducing head including the MR element are formed in this order on a surface of the second wafer 60.

Figure 63:
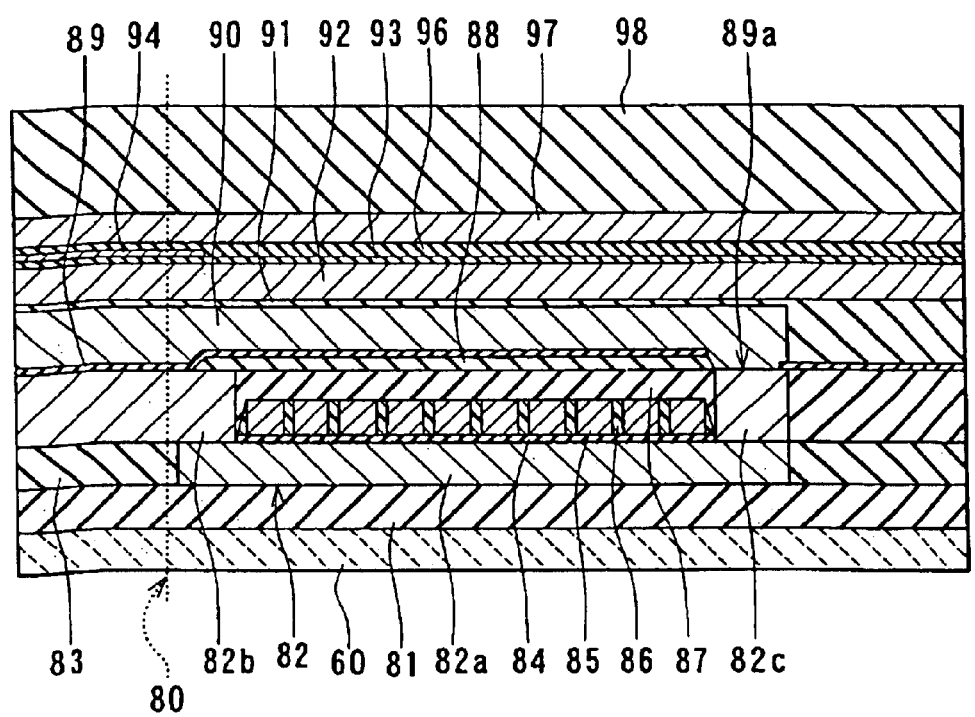
FIG. 63 is a sectional view of a thin-film magnetic head element according to the fifth embodiment.
Figure 64:
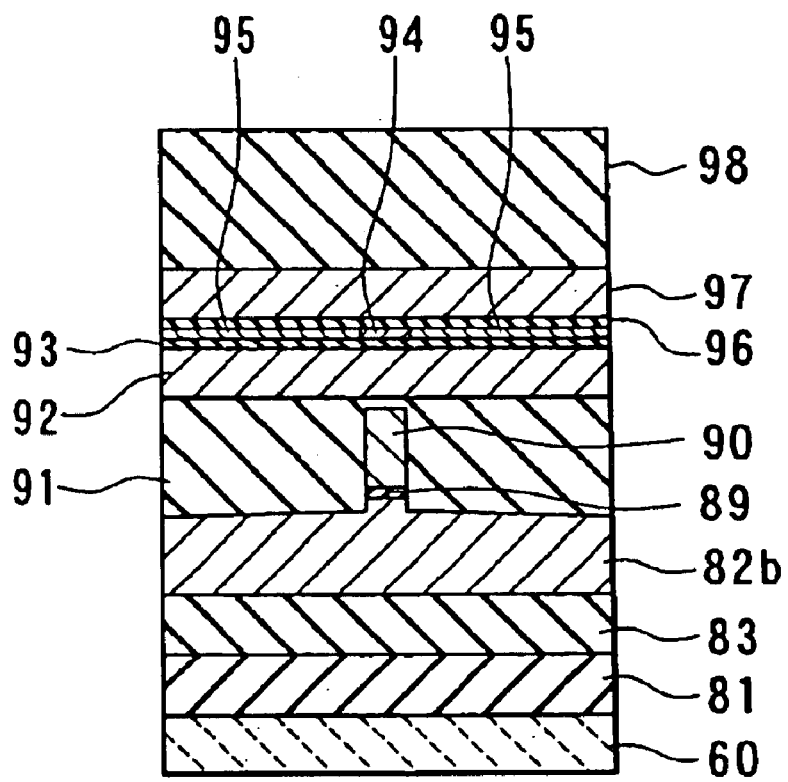
FIG. 64 is a sectional view of the thin-film magnetic head element according to the fifth embodiment.
Figure 65:
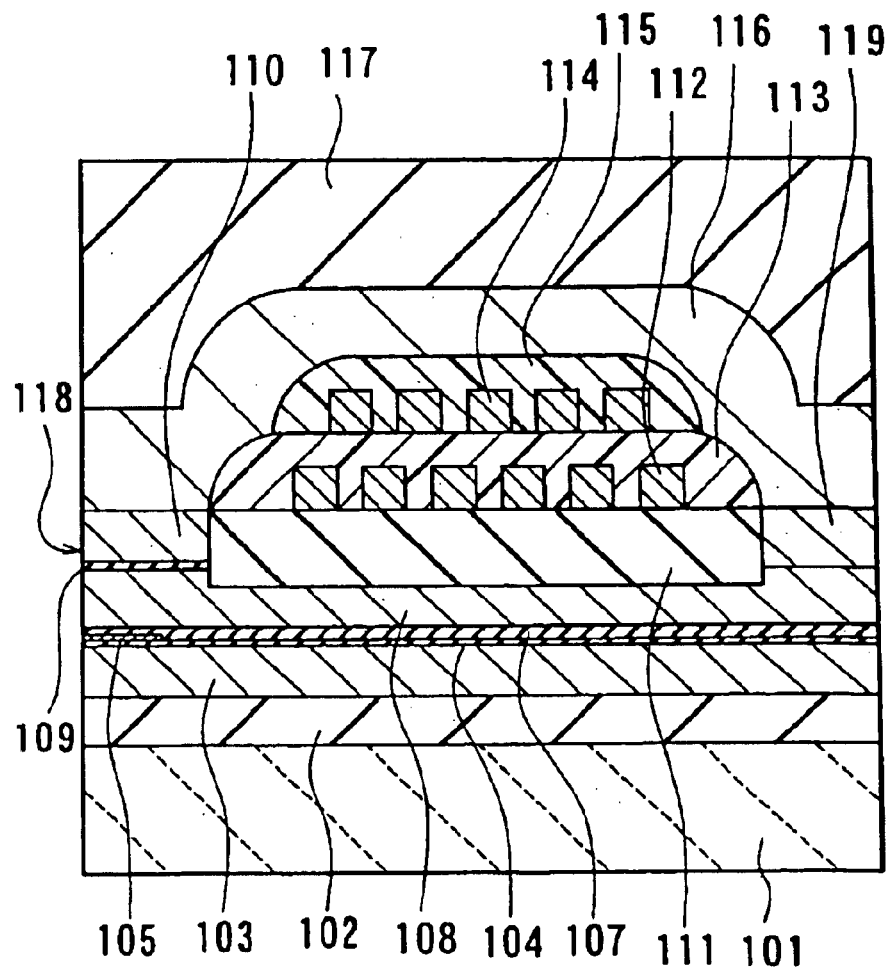
FIG. 65 is a sectional view of a thin-film magnetic head element of related art.
Figure 66:
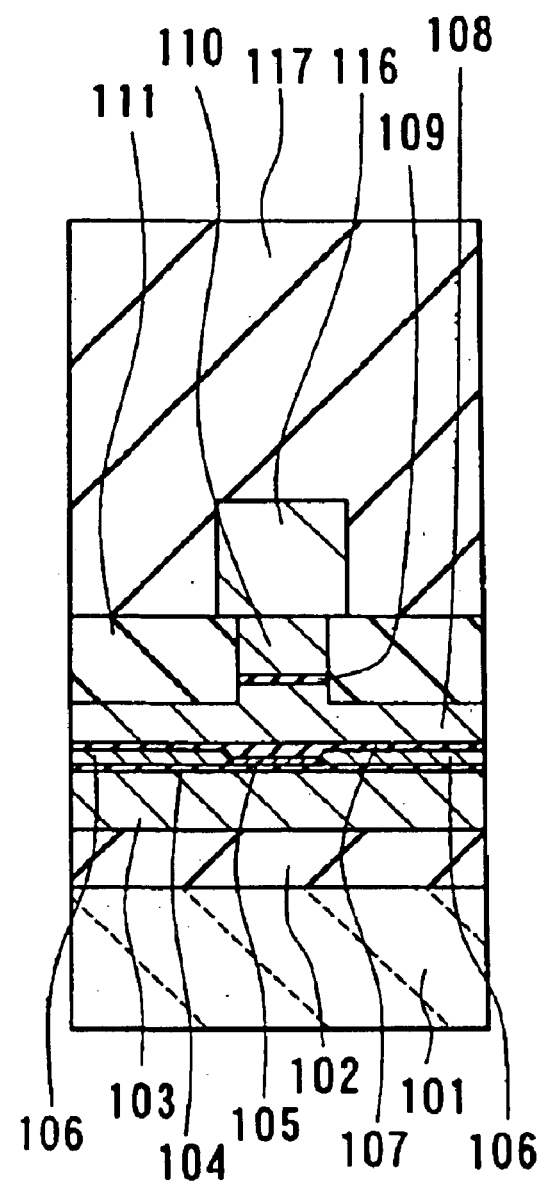
FIG. 66 is a sectional view of the thin-film magnetic head element of the related art.
Figure 67:
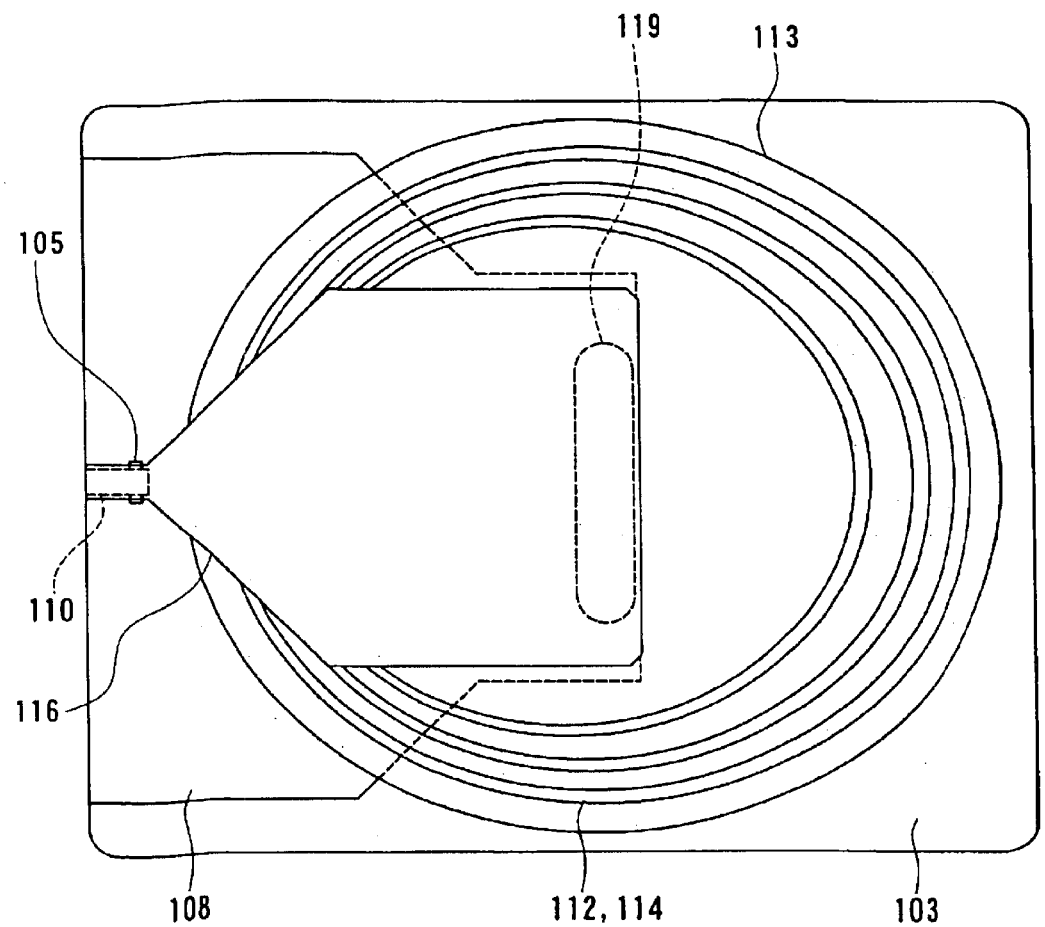
FIG. 67 is a top view of the thin-film magnetic head element of the related art.
Figure 68:
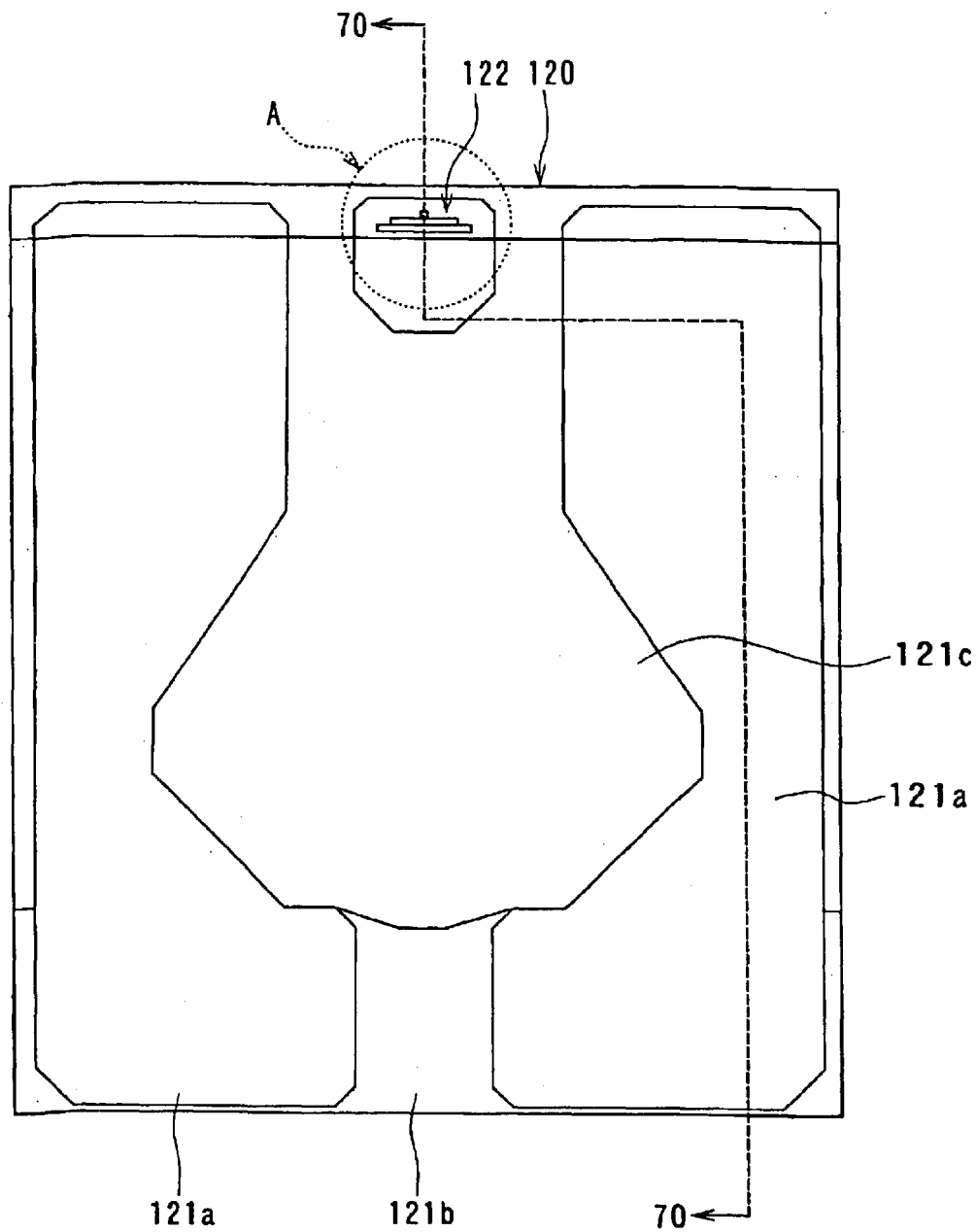
FIG. 68 is a bottom view illustrating an example of a configuration of the air bearing surface of a related-art slider.
Figure 69:
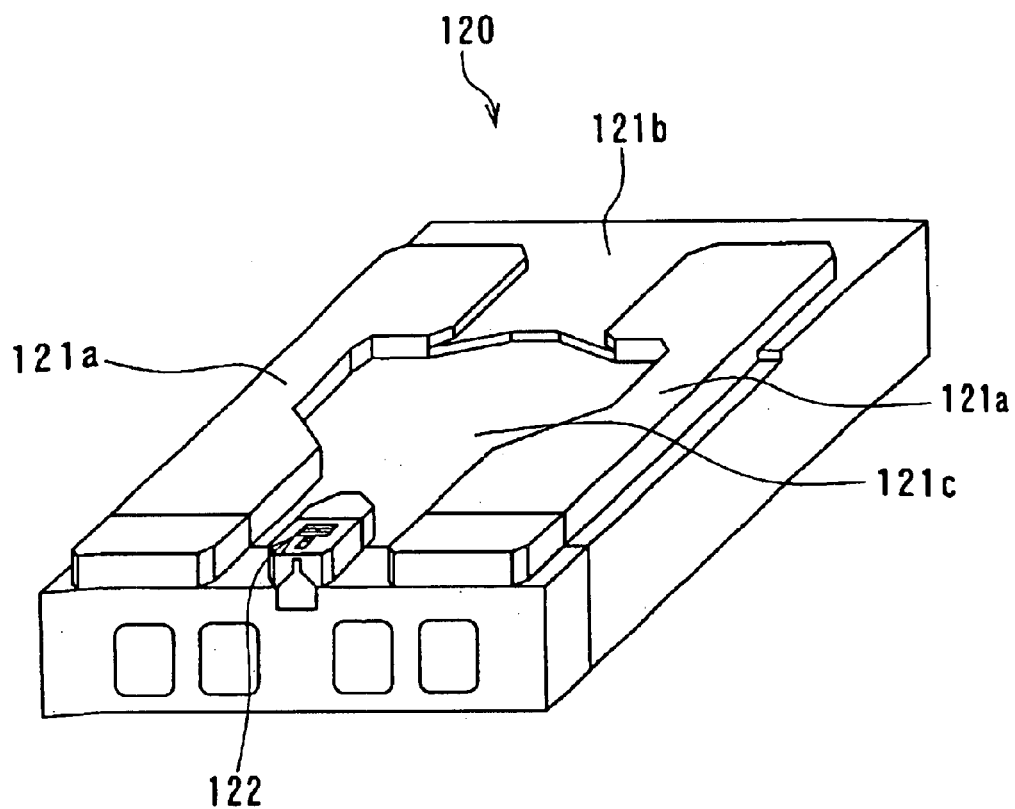
FIG. 69 is a perspective view of the related-art slider.
Figure 70:
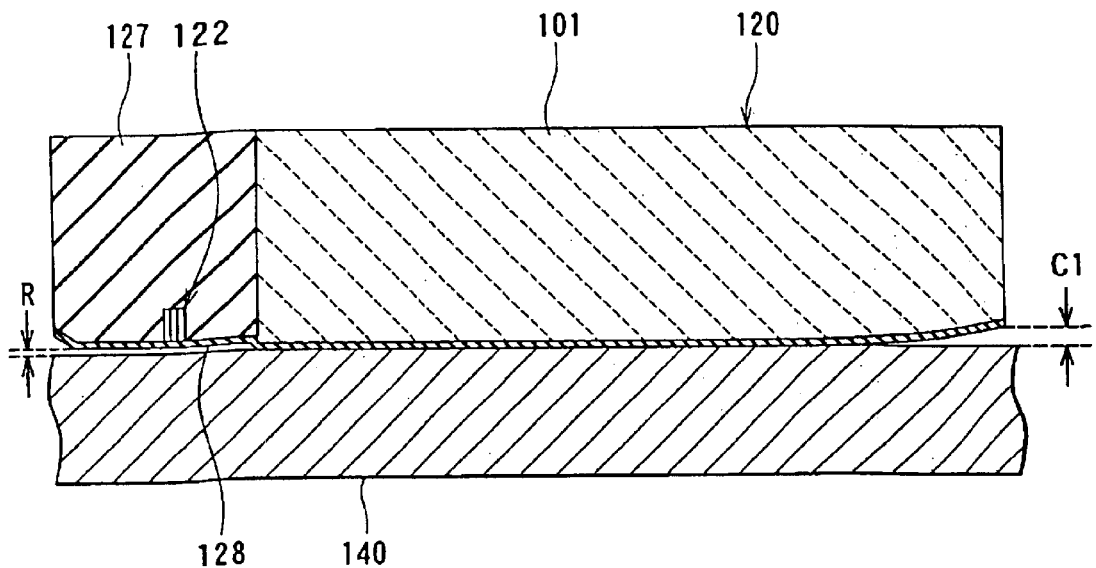
FIG. 70 is a sectional view illustrating the related-art slider and a recording medium in a state in which the recording medium is at rest.
Figure 71:
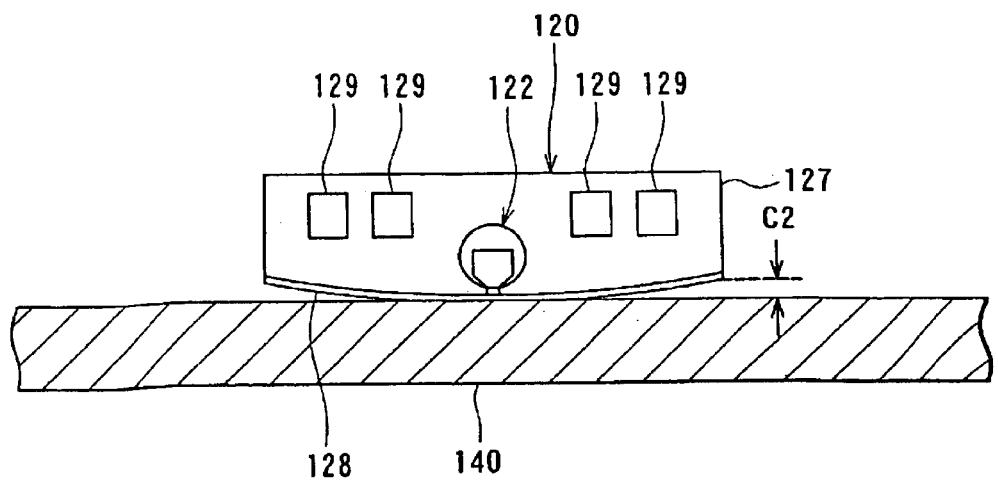
FIG. 71 is a front view of the related-art slider as viewed from the upper side of FIG. 68.
Figure 72:
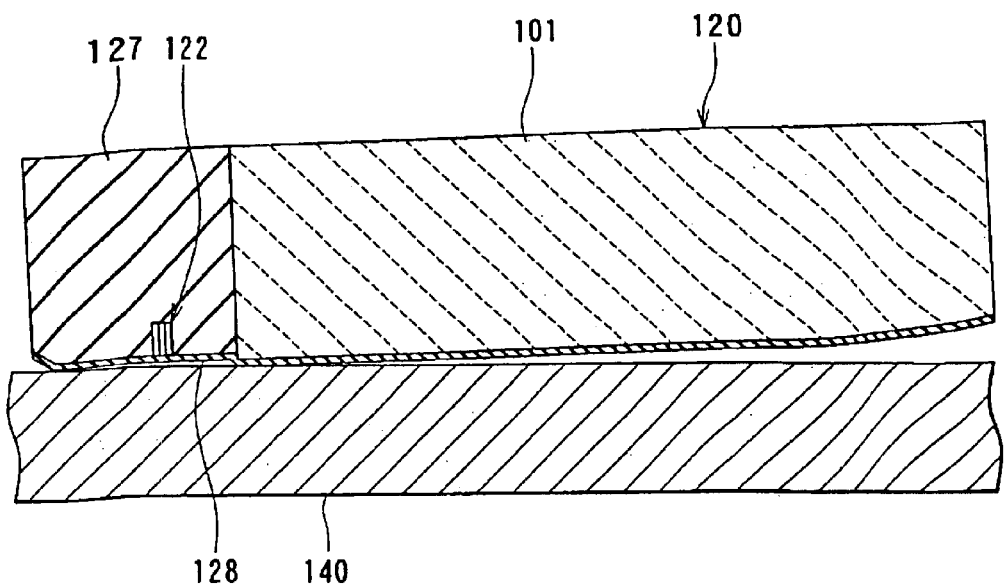
FIG. 72 is a sectional view illustrating the related-art slider and the recording medium in a state in which the recording medium has just started rotation from a resting state.
Figure 73:
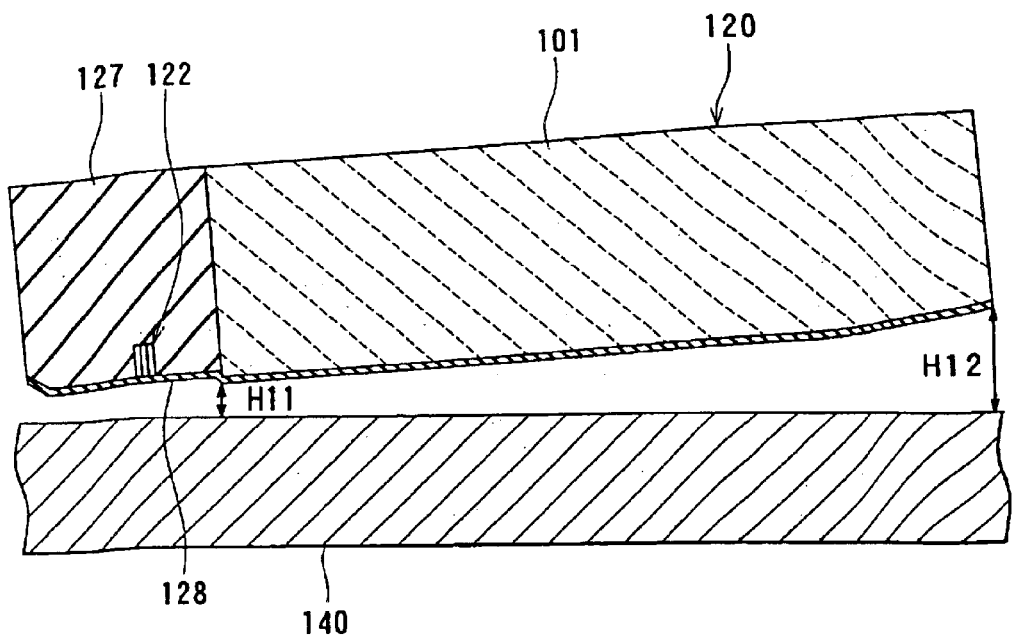
FIG. 73 is a sectional view illustrating the related-art slider flying over the surface of the recording medium.

Reference is now made to FIGS. 63 and 64 to describe a configuration of the thin-film magnetic head element 23 and a forming method thereof. FIGS. 63 and 64 are sectional views of the thin-film magnetic head element 23. FIG. 63 shows a section orthogonal to the second medium facing surface 32 and the top surface of the second wafer 60, while FIG. 64 shows a section parallel to the second medium facing surface 32. In FIG. 63, the dotted line with reference numeral 80 indicates the position where the second medium facing surface 32 is formed in a later step.

In the method of manufacturing the thin-film magnetic head element 23 shown in FIGS. 63 and 64, an insulating layer 81 of alumina, for example, is first formed on the second wafer 60. On the insulating layer 81, a yoke portion layer 82a of a magnetic material is formed into a specific shape. Then, an insulating layer 83 made of alumina, for example, is formed to cover the entire surface. The insulating layer 83 is polished by chemical mechanical polishing (CMP), for example, so that the yoke portion layer 82a is exposed.

Then, a pole portion layer 82b of a magnetic material is formed on the yoke portion layer 82a and the insulating layer 83, and a magnetic layer 82c of a magnetic material is formed on the yoke portion layer 82a. The pole portion layer 82b is provided in a position including the position where the second medium facing surface 32 is to be formed. The magnetic layer 82c is provided in a position which is to be the inside of the winding of a thin-film coil to be formed later. The yoke portion layer 82a, the pole portion layer 82b and the magnetic layer 82c make up a bottom pole layer 82.

Then, an insulating layer 84 made of alumina, for example, is formed on the yoke portion layer 82a in a region where the thin-film coil is to be formed. The thin-film coil 85 of copper, for example, is formed on the insulating layer 84. Then, an insulating layer 86 is formed to fill the spaces between the windings of the thin-film coil 85. The insulating layer 86 may be, for example, a resist layer or a spin-on-glass (SOG) film of coating glass.

Then, an insulating layer 87 made of alumina, for example, is formed to cover the entire surface. The insulating layer 87 is polished by chemical mechanical polishing (CMP), for example, so that the pole portion layer 82b and the magnetic layer 82c are exposed.

On the insulating layer 87 and the pole portion layer 82b, an insulating layer 88 made of alumina, for example, is formed for defining throat height. A recording gap layer 89 is then formed over the entire surface. A portion of the recording gap layer 89 located on top of the magnetic layer 82c is etched to form a contact hole 89a for making a magnetic path. Then, a top pole layer 90 of a magnetic material is formed to extend from top of the pole portion layer 82b to the position of the contact hole 89a. The top pole layer 90 is magnetically connected to the magnetic layer 82c through the contact hole 89a. The magnetic pole portion of the top pole layer 90 (the portion opposed to the pole portion layer 82b with the recording gap layer 89 in between) defines the track width of the recording head.

The recording gap layer 89 is dry-etched using the magnetic pole portion of the top pole layer 90 as a mask. Further, the pole portion layer 82b is etched partially. A trim structure shown in FIG. 64 is thereby obtained. The etching of the pole portion layer 82b is performed such that the top surface of the etched portion of the pole portion layer 82b is located higher than the top surface of the thin-film coil 85. By etching the pole portion layer 82b as described above, it becomes possible to prevent occurrence of insulation defects in the insulating layer 87 covering the thin-film coil 85. Then, an insulating layer 91 made of alumina, for example, is formed on the entire surface, and the top surface thereof is flattened typically by chemical mechanical polishing.

On the insulating layer 91, a bottom shield layer 92 of a magnetic material is formed. Then, a bottom shield gap film 93 of an insulating material such as alumina is formed on the bottom shield layer 92. An MR element 94 for reproduction is then formed on the bottom shield gap film 93. A pair of electrode layers 95 are then formed on the bottom shield gap film 93. The electrode layers 95 are electrically connected to the MR element 94. Then, a top shield gap film 96 of an insulating material such as alumina is formed on the bottom shield gap film 93, the MR element 94, and the electrode layers 95. The. MR element 94 is embedded in the shield gap films 93 and 96.

The MR element 94 may be an element utilizing a magnetosensitive film that exhibits magnetoresistivity, such as an AMR element, a GMR element or a tunnel magnetoresistive (TMR) element.

A top shield layer 97 of a magnetic material is then formed on the top shield gap film 96. An overcoat layer 98 made of alumina, for example, is formed on the top shield layer 97.

As necessary, with the support plate 63 bonded onto the overcoat layer 98, the bottom surface of the second wafer 60 may be lapped to thereby remove at least part of the second wafer 60. Finally, electrode pads to be connected to the thin-film magnetic head element 23 are formed on the bottom surface of the second wafer 60 or the bottom surface of the insulating layer 81. The second wafer 60 is to become the substrate portion 24 shown in FIGS. 61 and 62. The greater part of the insulating portion 25 shown in FIGS. 61 and 62 is the overcoat layer 98.

The thin-film magnetic head element 23 comprises a reproducing head and a recording head (induction-type electromagnetic transducer). The reproducing head includes the MR element 94 for magnetic signal detection, and the bottom shield layer 92 and the top shield layer 97 for shielding the MR element 94. Portions of the bottom shield layer 92 and the top shield layer 97 on a side of the second medium facing surface 32 are opposed to each other, with the MR element 94 interposed between these portions of the bottom and top shield layers 92 and 97.

The recording head includes the bottom pole layer 82 and the top pole layer 90 magnetically coupled to each other and including magnetic pole portions that are opposed to each other and located in regions on a side of the second medium facing surface 32. The recording head further includes: the recording gap layer 89 provided between the magnetic pole portion of the bottom pole layer 82 and the magnetic pole portion of the top pole layer 90; and the thin-film coil 85 at least part of which is disposed between the bottom pole layer 82 and the top pole layer 90 and insulated from the bottom and top pole layers 82 and 90.

The effect of the slider 20 according to the embodiment will now be described. In the step of producing the element section 22 of the embodiment, the recording head (induction-type electromagnetic transducer) and the reproducing head including the MR element 94 are formed in this order on one of the surfaces of the second wafer 60. According to the embodiment, the process up to the step of forming the thin-film coil 85 may be common for reproducing heads having different track widths and recording heads having different throat heights and different track widths. In the process of forming the thin-film magnetic head element 23, the time required for the steps following the formation of the thin-film coil 85 is relatively short.

Many customers of thin-film magnetic heads order the track width of a reproducing head and the throat height and the track width of a recording head that suit their own products. However, if thin-film magnetic heads that meet the specifications required by a customer are manufactured after an order is received, it would be difficult to supply the products in a short time after the receipt of the order.

According to the embodiment, half-finished products having gone through the manufacturing steps as far as the step of forming the thin-film coil 85 of the thin-film magnetic head element 23 may be mass-produced in advance to keep a good stock. Then, upon and in accordance with requests from customers, the remaining part of the thin-film magnetic head elements 23 may be formed to complete the thin-film magnetic head element 23. Therefore, according to the embodiment, it is possible to supply the sliders 20 having the thin-film magnetic head element 23 that meets the specifications required by each customer in a short time after receipt of an order. In addition, the half-finished products may be checked for defects, and only those with no defects may be used to produce the sliders 20. As a result, according to the embodiment, the yield of the sliders 20 can be improved.

To form a reproducing head and a recording head in this order on one surface of the wafer as the conventional technique, a number of steps are performed after forming an MR element. Therefore, in this case, the MR element could be destroyed due to electrostatic discharge in the steps following the formation of the MR element. In contrast, according to the embodiment, the recording head and the reproducing head are formed in this order on one of the surfaces of the second wafer 60, so that the number of steps after the formation of the MR element 94 is small. It is therefore possible to prevent the MR element 94 from being destroyed with electrostatic discharge.

Meanwhile, a problem as described below arises in the case where the sliders are manufactured through the steps of: forming the recording head and the reproducing head in this order on one surface of the wafer; cutting the wafer into bars; forming the medium facing surfaces for each bar; and cutting the bar into individual sliders. In this case, as compared with the conventional case of forming the reproducing head and the recording head in this order on one surface of the wafer, the positional relationship between the reproducing head and the recording head is reversed in the resulting slider. Then, the recording and reproducing operations in a hard disk drive become different from the conventional operations.

To cope with this, according to the embodiment, the slider section 21 and the element section 22 are separately formed and then bonded to each other to complete the slider 20. In the step of bonding, the element section 22 is bonded to the slider section 21 such that the reproducing head is positioned closer to the slider section 21 than the recording head. As a result, according to the embodiment, while the recording head and the reproducing head are formed in this order on one surface of the second wafer 60 as described above, the positional relationship between the reproducing and recording heads in the slider 20 remains the same as that in the conventional sliders.

Thus, the embodiment makes it possible to provide the sliders 20 that meet the specifications required by customers in a short time, and to improve the yield of the sliders 20, with the positional relationship between the reproducing and recording heads in the slider 20 unchanged from that in the conventional sliders.

The element section 22 of the present embodiment may be used in place of the element section 22 of the first to third embodiments.

The remainder of the configuration, functions and effects of the present embodiment are the same as those of the first to fourth embodiments.

The present invention is not limited to the foregoing embodiments but may be practiced in still other ways. For example, the invention may be applied to a thin-film magnetic head dedicated to reading that has no induction-type electromagnetic transducer, a thin-film magnetic head dedicated to writing that has an induction-type electromagnetic transducer only, or a thin-film magnetic head that performs reading and writing with an induction-type electromagnetic transducer.

As in the foregoing, the slider of the thin-film magnetic head according to the invention comprises the slider section having the first medium facing surface and the air inflow end, and the element section having the second medium facing surface, the air outflow end and the thin-film magnetic head element. The slider section and the element section are bonded to each other to complete the slider. Thus, according to the invention, it is possible to mass-produce the slider section and the element section separately at a time. As a result, it is possible to manufacture the slider through a small number of manufacturing steps.

In the slider of a thin-film magnetic head of the invention, the slider section may have a substrate portion and a medium facing layer placed on the substrate portion, the first medium facing surface may be formed on the medium facing layer, the element section may have an insulating portion surrounding the thin-film magnetic head element, the substrate portion may have a hardness greater than that of the insulating portion, and, as the substrate portion and the medium facing layer are compared in hardness, the hardness of the medium facing layer may be closer to the hardness of the insulating portion. In this case, it is possible to prevent development of a difference in level between the first and second medium facing surfaces when they are lapped at the same time. As a result, the slider is allowed to fly lower.

In the slider of a thin-film magnetic head of the invention, the first medium facing surface may have a first surface closer to the element section, a second surface closer to the air inflow end, and a border portion located between the first and second surfaces. The second surface may be slanted against the first surface such that the first and second surfaces make a convex shape bent at the border portion. In this case, when the slider section comes into contact with the surface of the recording medium, the border portion makes the contact with the surface of the recording medium. As a result, it is possible to prevent the slider from sticking to the recording medium and to prevent a damage to the recording medium and the thin-film magnetic head element due to a collision between the slider and the recording medium, while attaining a reduction in magnetic space. Furthermore, since the slider section/element section joint portion of the slider does not contact the surface of the recording medium, it is possible to prevent breakage of the slider which could be caused by an external force applied by the recording medium to the slider section/element section joint portion of the slider.

According to the method of manufacturing a slider of the invention, the slider section having the first medium facing surface and the air inflow end, and the element section having the second medium facing surface, the air outflow end and the thin-film magnetic head element, are produced separately and are bonded to each other to complete the slider. Thus, according to the invention, it is possible to mass-produce the slider section and the element section separately at a time. As a result, it is possible to manufacture the slider through a small number of manufacturing steps.

In the method of manufacturing the slider of the invention, the slider section may have a substrate portion and a medium facing layer placed on the substrate portion, the first medium facing surface may be formed on the medium facing layer, the element section may have an insulating portion surrounding the thin-film magnetic head element, the substrate portion may have a hardness greater than that of the insulating portion, and, as the substrate portion and the medium facing layer are compared in hardness, the hardness of the medium facing layer may be closer to the hardness of the insulating portion. In this case, it is possible to prevent development of a difference in level between the first and second medium facing surfaces when they are lapped at the same time. As a result, the slider is allowed to fly lower.

The method of manufacturing the slider of the invention may further comprise the step of lapping the first and second medium facing surfaces so as to flatten the first and second surfaces, after the step of bonding the slider section and the element section to each other. In this case, the first and second medium facing surfaces are flattened even if precision in the alignment of the slider section and the element section is low at the time of bonding these sections.

The method of manufacturing the slider of the invention may include, after the step of bonding the slider section and the element section to each other, the step of lapping the first medium facing surface so as to allow the first medium facing surface to have a first surface closer to the element section, a second surface closer to the air inflow end, and a border portion located between the first and second surfaces, and to allow the second surface to slant against the first surface such that the first and second surfaces make a convex shape bent at the border portion. In the slider manufactured by this method, when the slider section comes into contact with the surface of the recording medium, the border portion makes the contact with the surface of the recording medium. As a result, it is possible to prevent the slider from sticking to the recording medium and to prevent damage to the recording medium and the thin-film magnetic head element which could be caused by a collision between the slider and the recording medium, while attaining a reduction in magnetic space. Furthermore, since the slider section/element section joint portion of the slider does not contact the surface of the recording medium, it is possible to prevent breakage of the slider which could be caused by an external force applied by the recording medium to the slider section/element section joint portion of the slider.

In the method of manufacturing the slider of the invention, the induction-type electromagnetic transducer for recording and the magnetoresistive element for reproduction may be formed in this order on one of surfaces of the wafer in the step of producing the element section, and the slider section and the element section may be bonded to each other such that the magnetoresistive element is disposed closer to the slider section than the induction-type electromagnetic transducer in the step of bonding the slider section and the element section to each other. In this case, part of the induction-type electromagnetic transducer for the thin-film magnetic head element may be formed in advance, and the remainder of the thin-film magnetic head element may be completed upon and in accordance with requests from customers. It is thereby possible to provide sliders that meet the specifications required by each customer in a short period of time.

Obviously many modifications and variations of the present invention are possible in the light of the above teachings. It is therefore to be understood that within the scope of the appended claims the invention may be practiced otherwise than as specifically described.

What is claimed is:

1. A slider of a thin-film magnetic head comprising:

a slider section having a first medium facing surface that faces toward a rotating recording medium and an air inflow end; and an element section having a second medium facing surface that faces toward the recording medium, an air outflow end, and a thin-film magnetic head element, wherein:

the first medium facing surface has concavities and convexities for controlling the orientation of the slider section while the recording medium is rotating;

the slider section and the element section are bonded to each other such that the air inflow end and the air outflow end are disposed on opposite sides with the first and second medium facing surfaces in between;

the first medium facing surface has a first surface closer to the element section, a second surface closer to the air inflow end, and a border portion located between the first and second surfaces, wherein the second surface is slanted against the first surface such that the first and second surfaces make a convex shape bent at the border portion; and regardless of whether the recording medium is rotating or at rest, the slider section is in contact with the surface of the recording medium at the border portion, and the first surface and the second surface slant against the surface of the recording medium such that the element section and the air inflow end are off the recording medium.

2. A slider of a thin-film magnetic head according to claim 1, wherein:

the slider section has a substrate portion and a medium facing layer placed on the substrate portion;

the first medium facing surface is fanned on the medium facing layer;

the element section has an insulating portion surrounding the thin-film magnetic head element;

the substrate portion has a hardness greater than that of the insulating portion; and as the substrate portion and the medium facing layer are compared in hardness, the hardness of the medium facing layer is closer to the hardness of the insulating portion.

3. A slider of a thin-film magnetic head according to claim 1, wherein the second surface and the surface of the recording medium form an angle of 30° or smaller while the recording medium is rotating.

4. A slider of a thin-film magnetic head according to claim 1, wherein the first surface and the second surface form an angle of 30° or smaller.

5. A slider of a thin-film magnetic head according to claim 1, wherein the first medium facing surface has a recess formed in a region including the border portion.

6. A slider of a thin-film magnetic head according to claim 1, wherein the second medium facing surface is disposed farther from the recording medium than the first surface of the first medium facing surface is.

7. A slider of a thin-film magnetic head according to claim 1, wherein the thin-film magnetic head element comprises a magnetoresistive clement for reproduction and an induction-type electromagnetic transducer for recording, the electromagnetic transducer being disposed farther from the slider section than the magnetoresistive element is.

* * * * *